US007147235B2

(12) United States Patent
West

(10) Patent No.: US 7,147,235 B2
(45) Date of Patent: Dec. 12, 2006

(54) WHEELED FOOTBOARD SPORT CONVEYANCE

(76) Inventor: Keith Howard West, 18512 Rampart Loop SE., Yelm, WA (US) 98597

( * ) Notice: Subject to any disclaimer, the term of this patent is extended or adjusted under 35 U.S.C. 154(b) by 116 days.

(21) Appl. No.: 10/412,855

(22) Filed: Apr. 14, 2003

(65) Prior Publication Data

US 2004/0200651 A1 Oct. 14, 2004

(51) Int. Cl.
*B62M 1/00* (2006.01)
(52) U.S. Cl. .............................. 280/87.042; 280/11.19; 280/87.041
(58) Field of Classification Search ............ 280/87.01, 280/87.041, 87.042, 11.221, 275, 11.233, 280/276, 11.25, 283, 11.19, 277, 284, 286, 280/11.2, 87.043, 11.27, 11.28, 842; 180/209, 180/219, 21
See application file for complete search history.

(56) References Cited

U.S. PATENT DOCUMENTS

| 138,018 | A | * | 4/1873 | Gregg ...................... 280/11.19 |
| 275,482 | A | * | 4/1883 | Gregg ...................... 280/11.19 |
| 336,600 | A | * | 2/1886 | Tennent ................... 280/11.19 |
| 1,393,813 | A | * | 10/1921 | Muck ...................... 280/11.19 |
| 2,430,037 | A | * | 11/1947 | Vincent ................. 280/11.209 |
| 3,700,059 | A | | 10/1972 | Sutton |
| 3,992,029 | A | * | 11/1976 | Washizawa et al. ........ 280/221 |
| 4,076,266 | A | | 2/1978 | Krausz |
| 4,133,402 | A | | 1/1979 | Soo hoo |
| 4,151,892 | A | | 5/1979 | Francken |
| 4,225,147 | A | | 9/1980 | Lowery |
| 4,394,028 | A | * | 7/1983 | Wheelwright ............ 280/11.19 |
| 4,445,699 | A | | 5/1984 | Darasko |
| 4,700,962 | A | * | 10/1987 | Salmon ..................... 280/220 |
| 4,709,937 | A | * | 12/1987 | Lin et al. ............... 280/11.209 |
| D302,993 | S | | 8/1989 | Heilig |
| 4,991,861 | A | | 2/1991 | Carn |
| 5,020,621 | A | | 6/1991 | Martin |
| 5,040,812 | A | | 8/1991 | Patin |
| 5,169,166 | A | | 12/1992 | Brooks |
| 5,232,235 | A | | 8/1993 | Brooks |
| 5,251,934 | A | * | 10/1993 | Gates ......................... 280/842 |
| 5,257,671 | A | | 11/1993 | Watkins |
| 5,330,214 | A | | 7/1994 | Brooks |
| 5,364,120 | A | * | 11/1994 | Shimansky ................. 280/650 |
| 5,401,055 | A | | 3/1995 | Pham |
| 5,474,314 | A | | 12/1995 | Lehman |
| 5,513,865 | A | | 5/1996 | Brooks |

(Continued)

FOREIGN PATENT DOCUMENTS

FR  86 09323  6/1986

(Continued)

*Primary Examiner*—Christopher P. Ellis
*Assistant Examiner*—Bridget Avery

(57) ABSTRACT

A steerable wheeled sport conveyance is disclosed employing a unique diamond shaped footprint especially adapted for riding at relatively high speeds over various types of terrain. A first set of singular in-line steering wheels are rotatably mounted on the opposing ends of an elongated frame in a manner that also allows one or both of them to pivot on a vertical axis, and a second set of parallel wheels are mounted in an opposing manner across the longitudinal tilt axis of the conveyance. The opposing parallel wheels are attached to corresponding struts, which in turn are independently pivotably mounted near the longitudinal centerline of the frame, and are rotatable in a plane perpendicular to the rotationary plane of the two sets of wheels. Side to side tilting motions of the frame relative to the opposing struts creates vertical displacements between them, thus providing the steering forces that are conveyed and connected to the axles of one or both of the in-line steering wheels.

20 Claims, 31 Drawing Sheets

U.S. PATENT DOCUMENTS

| | | |
|---|---|---|
| 5,544,919 A | 8/1996 | Tinkler |
| 5,551,717 A | 9/1996 | De Courcey Milne |
| 5,794,955 A | 8/1998 | Flynn |
| 5,860,657 A | 1/1999 | Kroher |
| 5,868,408 A | 2/1999 | Miller |
| 5,904,218 A * | 5/1999 | Watkins ............... 180/209 |
| 5,950,754 A | 9/1999 | Ondrish |
| 5,975,229 A | 11/1999 | Hosada |
| 5,997,018 A | 12/1999 | Lee |
| 6,089,592 A | 7/2000 | Negus |
| 6,123,348 A | 9/2000 | Miller |
| 6,193,276 B1 | 2/2001 | Sottile |
| 6,874,795 B1 * | 4/2005 | Sung ............... 280/11.223 |
| 6,926,294 B1 * | 8/2005 | Lewis ............... 280/87.042 |
| 6,938,907 B1 * | 9/2005 | Hamy ............... 280/87.042 |

FOREIGN PATENT DOCUMENTS

| | | |
|---|---|---|
| FR | 88 00281 | 1/1988 |
| FR | 88 14823 | 11/1988 |

* cited by examiner (90° CCW)

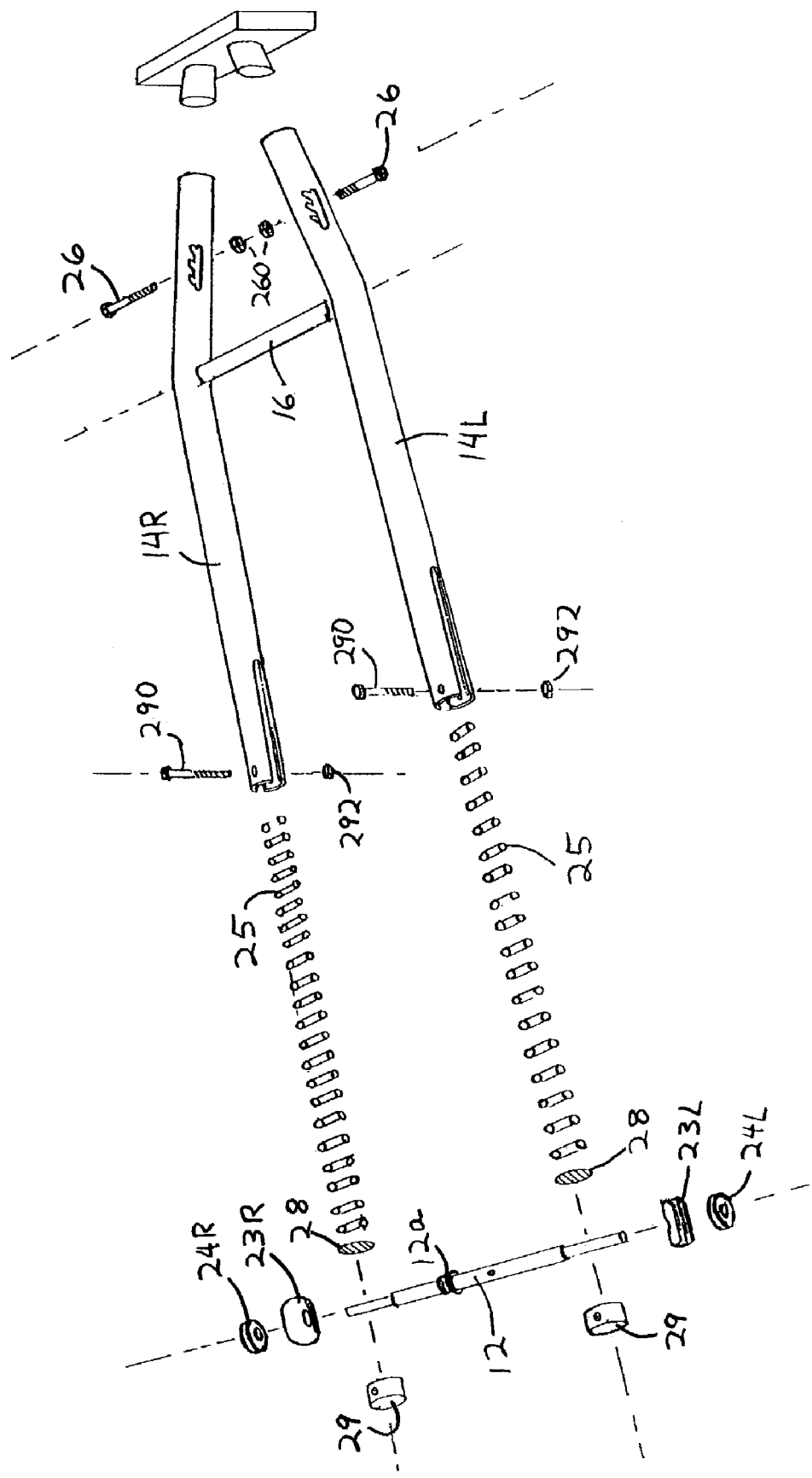

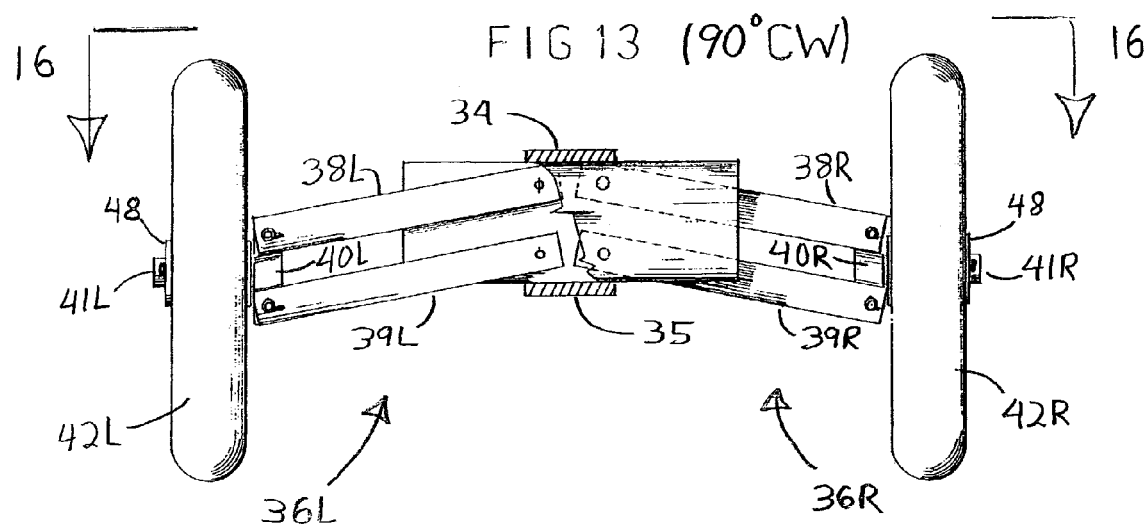
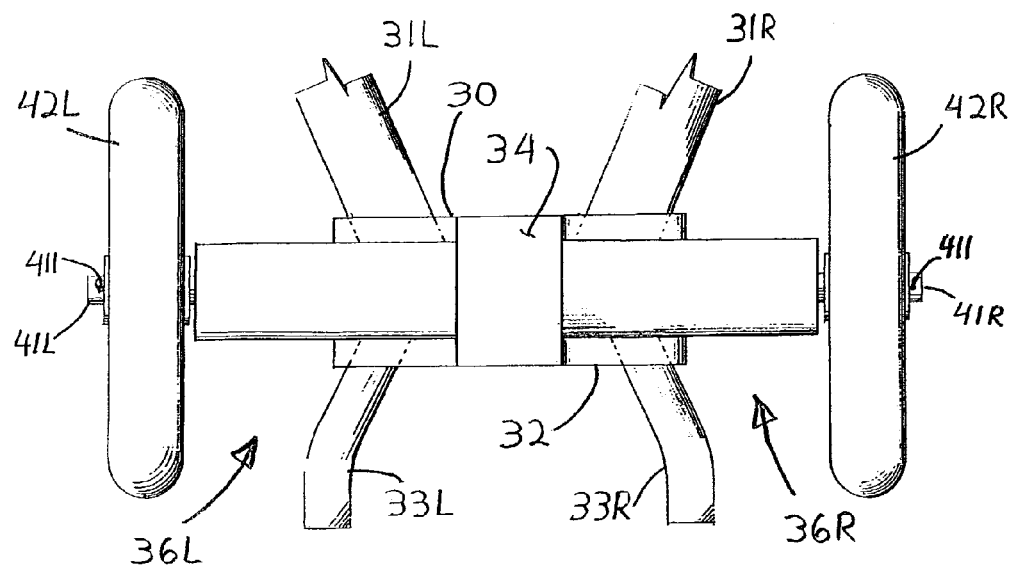

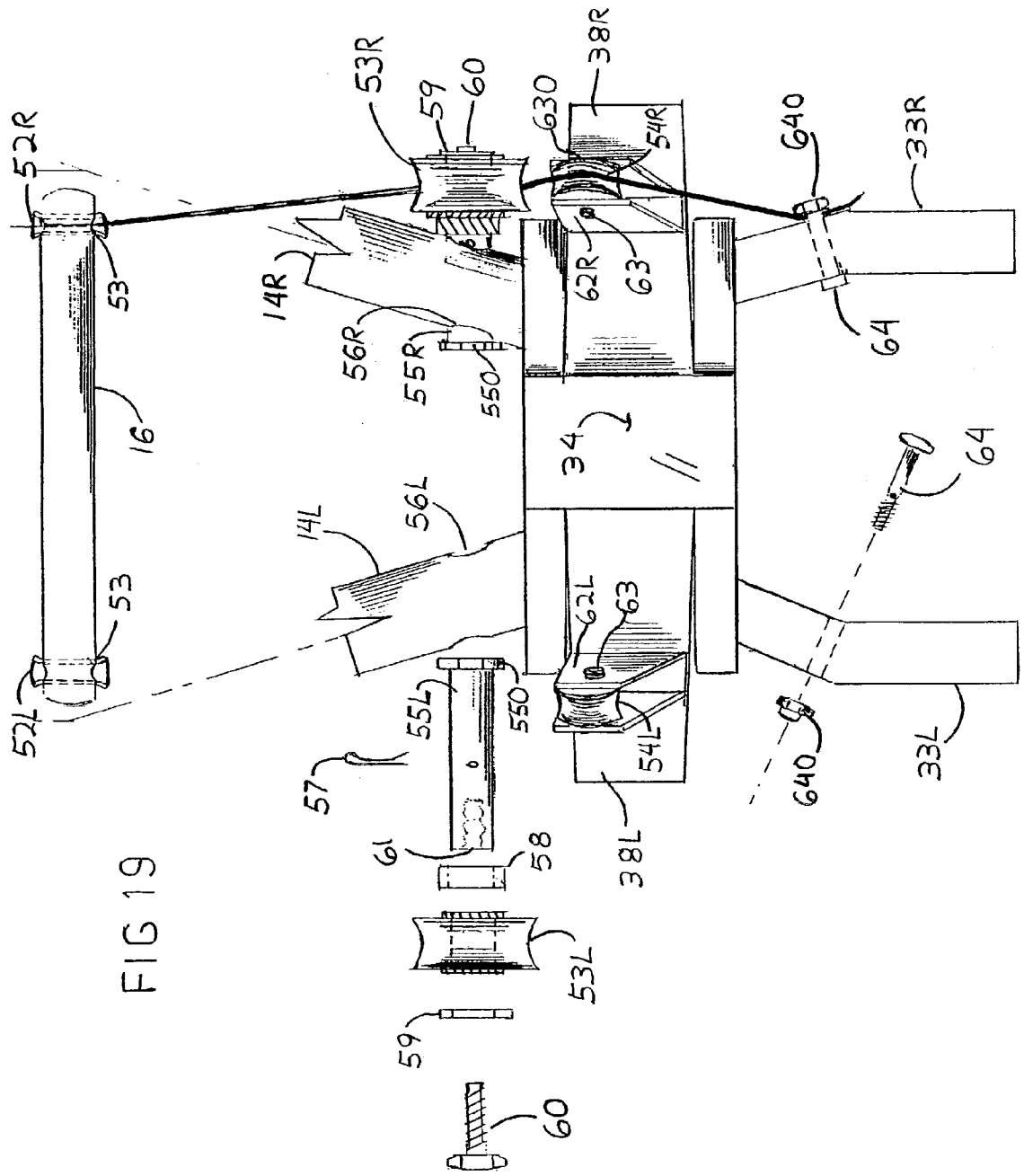

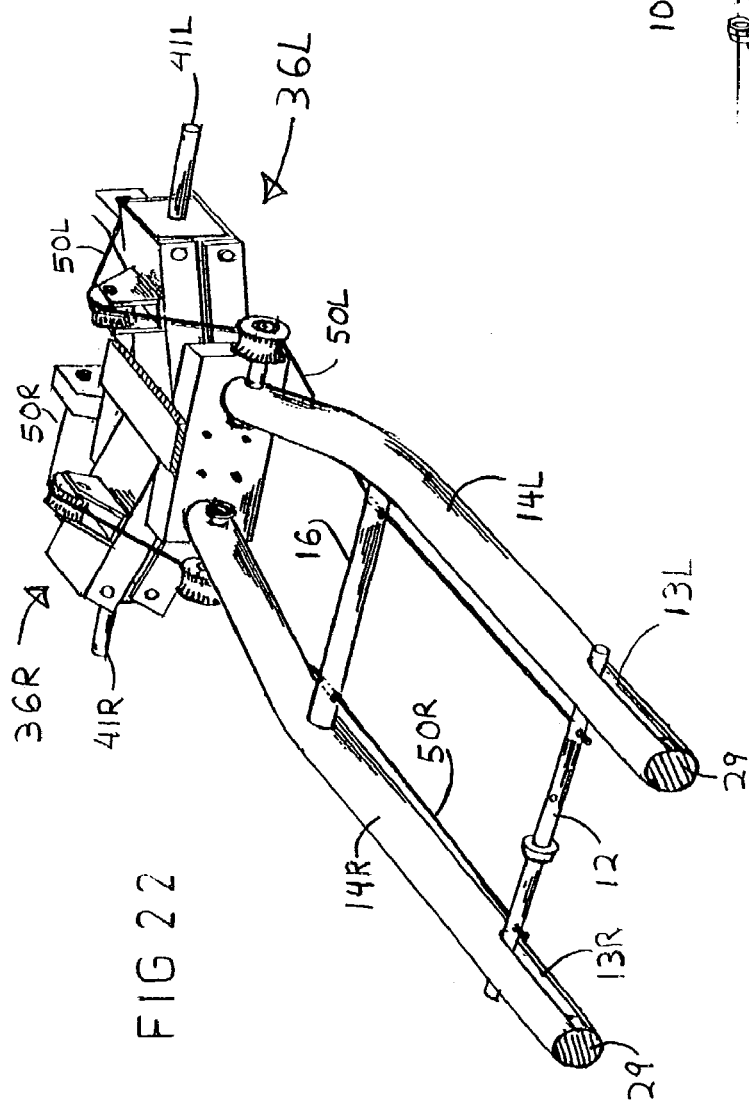
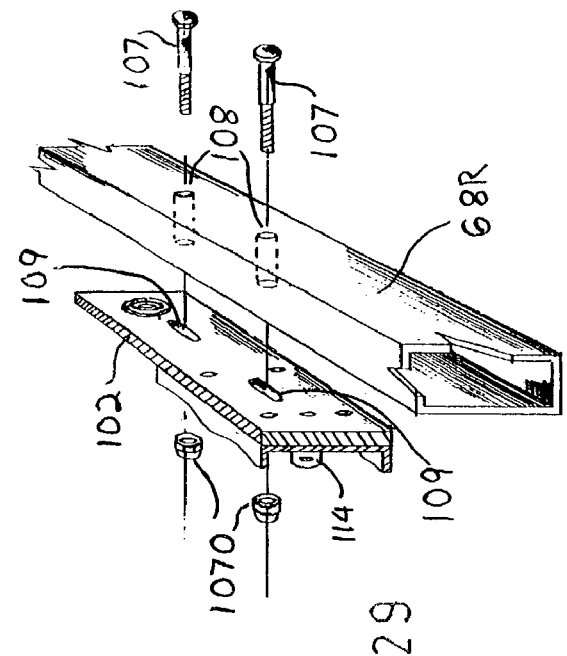
FIG 22
FIG 29

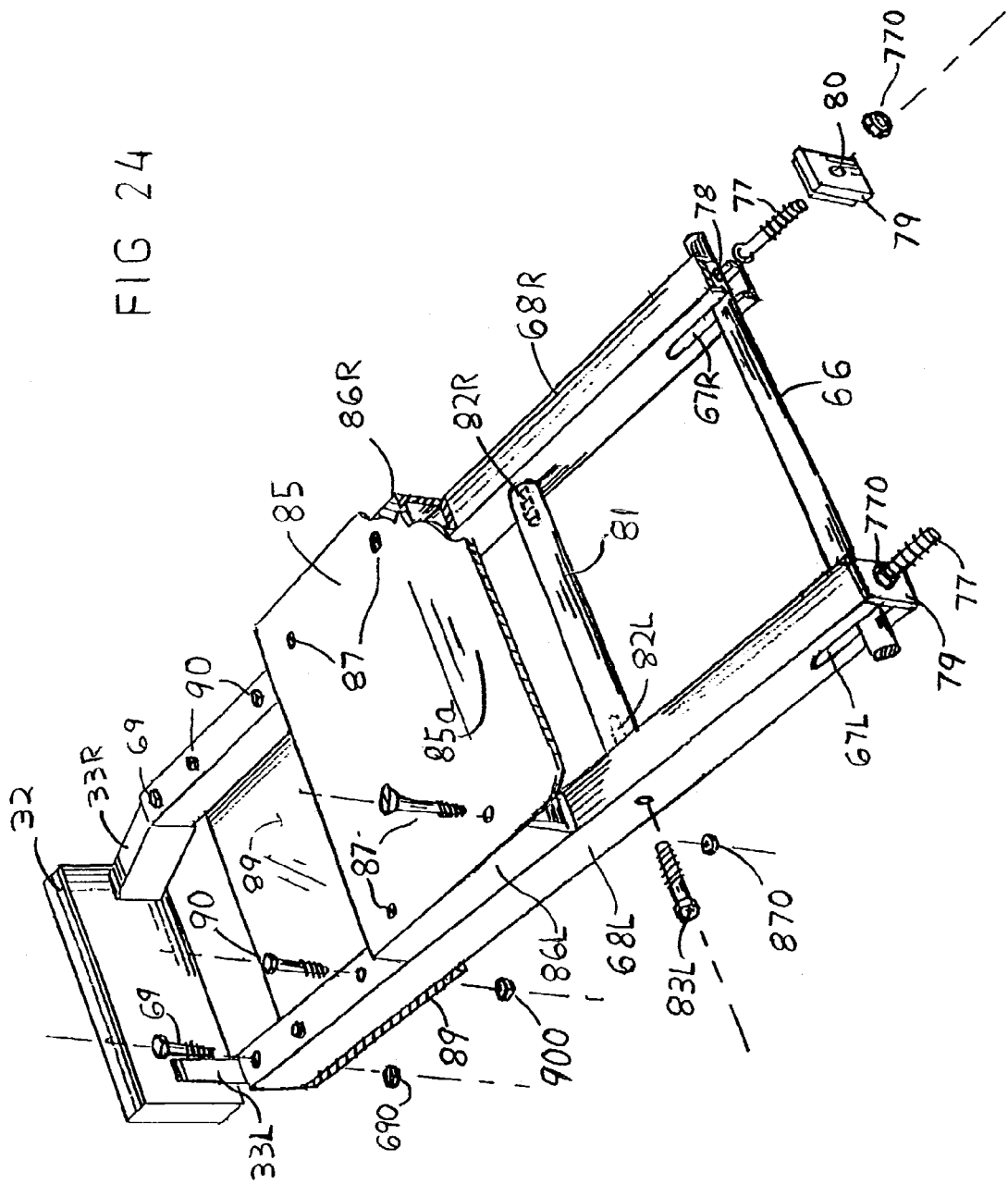

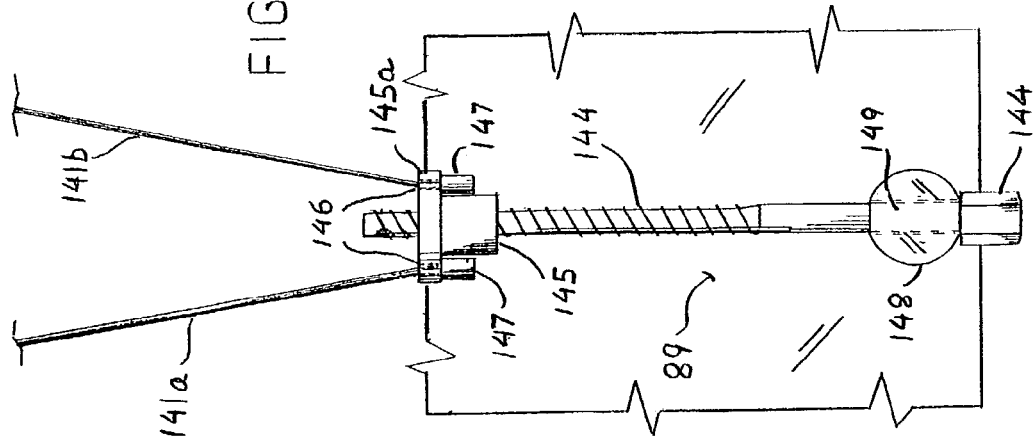
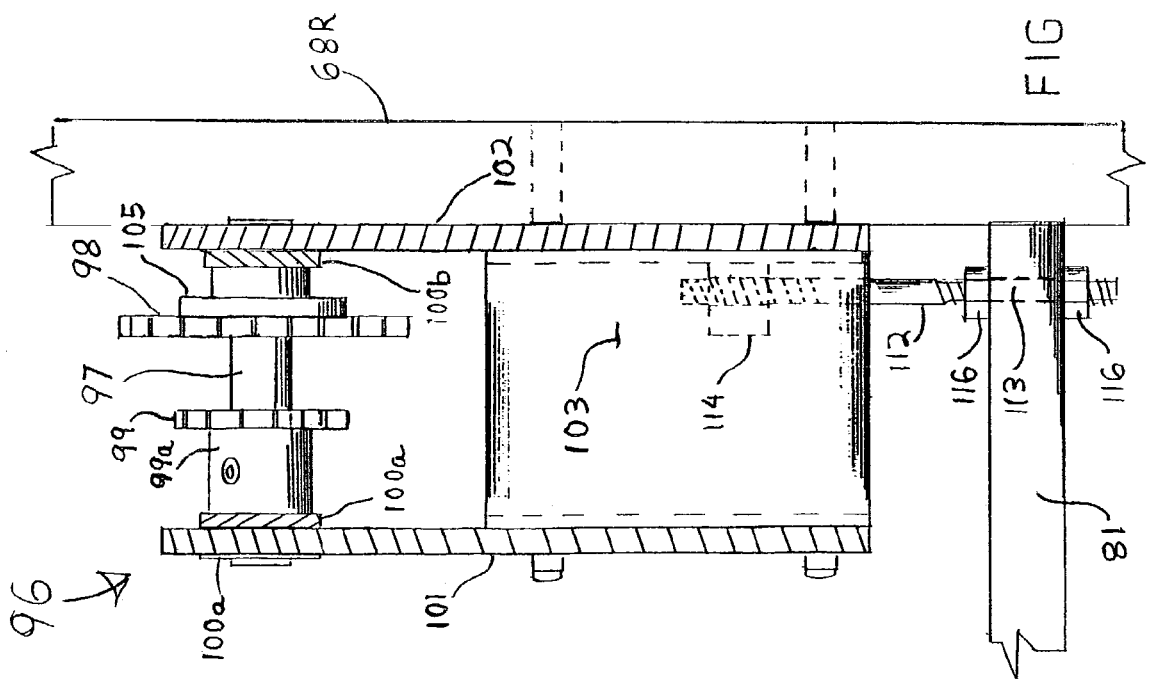

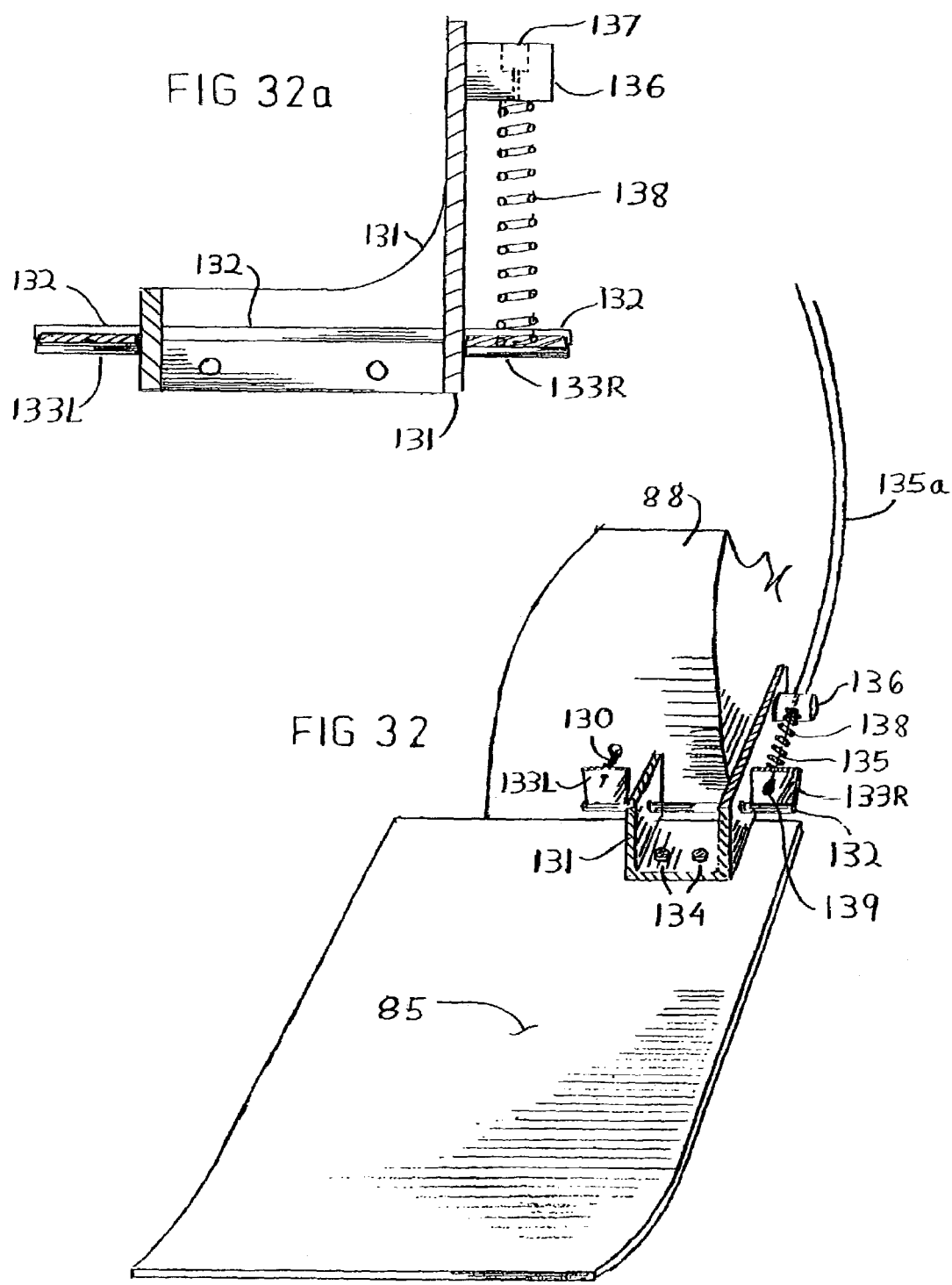

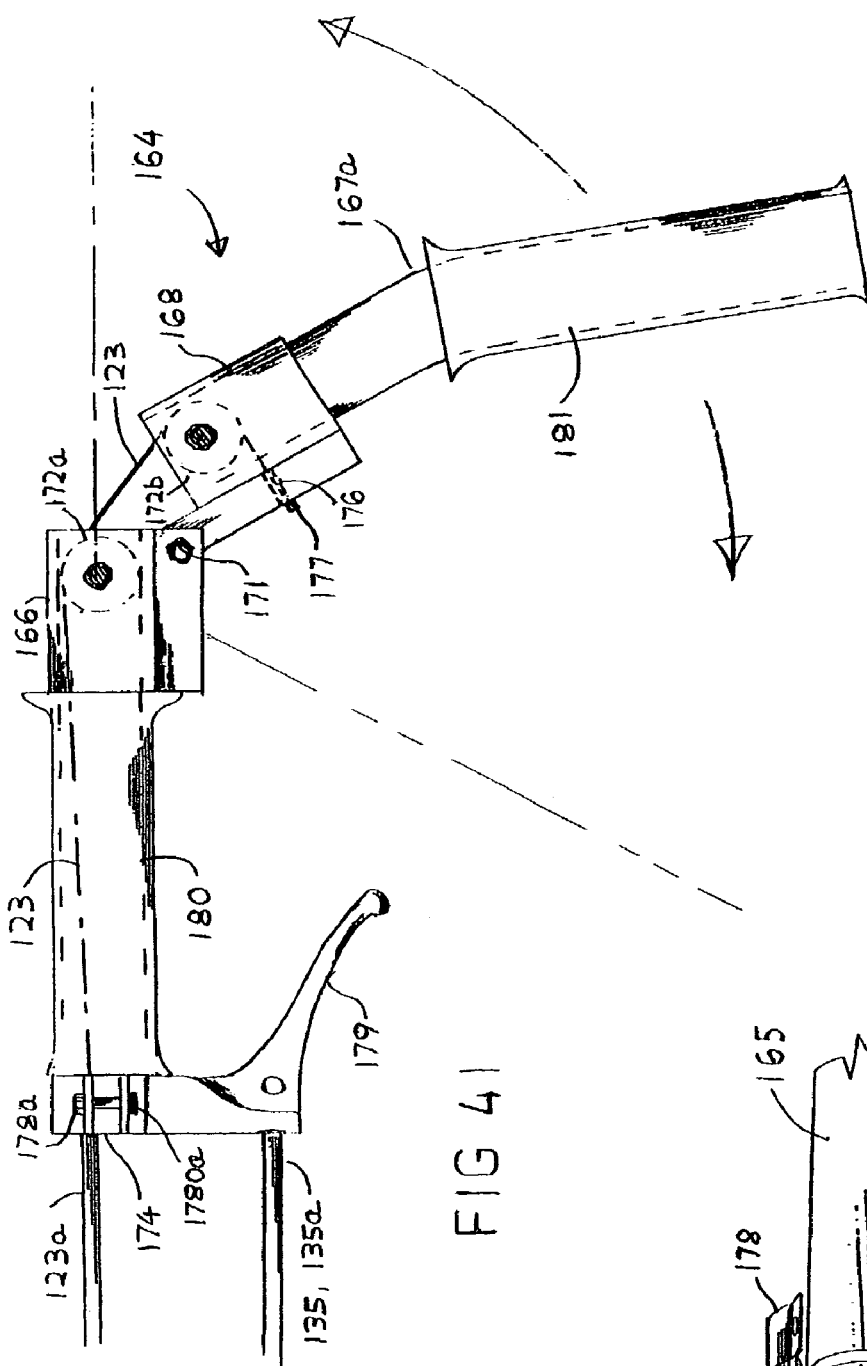
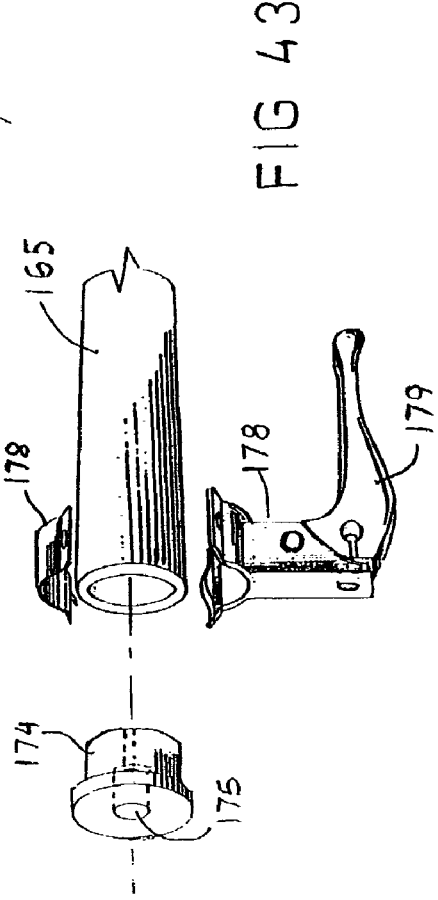
FIG 41
FIG 43

WHEELED FOOTBOARD SPORT CONVEYANCE

FIELD OF INVENTION

This invention relates to a sport conveyance, and is more particularly concerned with a conveyance of the type having land wheels, with or without motor propulsion, and adapted to carry the rider after the manner of a skateboard or all terrain board.

BACKGROUND OF THE INVENTION

Steerable wheeled boards such as skateboards and all terrain boards (ATBs) are widely used for sport, recreation and transportation. Generally these wheeled boards are steered by means of a rider shifting his weight and causing the board to tilt, thereby imparting steering forces to the wheels. The amount of turn is controlled by the amount of tilt. The traditional skateboard consists of a board—commonly called a 'deck', mounted on top of two sets of small solid wheels located at the front and rear. Though functional, the skateboard's inherent design limits its range of operation to smooth, hard surfaces and relatively slower speeds. To compensate for this, a new type of board came into existence. Larger wheeled boards, commonly referred to as ATBs, or mountainboards, generally use larger pneumatic wheels spaced farther apart on stout elongated decks, which raise ground clearances and lengthen wheel bases allowing operation on surfaces considerably rougher than those suitable for traditional skateboards. However, the emergence of ATBs has created a new set of concerns for riders. The ride is usually faster and rougher, and the abilities to steer, stop, stay on and quickly dismount the board have become issues of great concern.

The wheeled board prior art does not teach the features and advantages of the Applicant's steering and control design, braking mechanism or binding components. U.S. Pat. No. 5,997,018 to Lee (1999) discloses an ATB with four pneumatic wheels attached to an elongated deck, and narrow tubular foot binders. The rectangular 'footprint' of this ATB, outlined by the wheel placement when viewing from above, is not conducive to good handling or maneuvering, and can create severe wobbling tendencies at moderate to high speeds. Lee's binding tubes cross over the tops of the riders feet, making it difficult to exercise the quick dismounts that become necessary when traveling at higher speeds over rougher terrain. Lee also employs a one handed braking device, limiting the braking force of the ATB to whatever pressure a typical rider can muster from the use of that one hand. U.S. Pat. No. 5,975,229 to Hosada (1999) discloses a similar four wheeled conveyance with motor propulsion. U.S. Pat. No. 5,169,166 (1992), U.S. Pat. No. 5,232,235 (1993), U.S. Pat. No. 5,330,214 (1994), and U.S. Pat. No. 5,513,865 (1996), all to Brooks, disclose further variations where the wheels of the board are able to lean in correspondence with the tilt of the deck, but again utilizing the same rectangular footprint. U.S. Pat. No. 5,551,717 to Milne (1996) discloses a three-wheeled conveyance board that positions two wheels at the front and one at the rear of an elongated deck, and U.S. Pat. No. 5,950,754 to Ondrish (1999) discloses a similar three-wheeled board with motor propulsion. Although the triangular footprint of the three-wheeled design is an improvement over ATBs with the rectangular type footprint, the core issues of steering and handling, braking ability, and safe but effective binding systems are still not adequately addressed. Other conveyance boards using only two wheels can also be found in the prior art. U.S. Pat. No. 4,445,699 to Darasko (1984) discloses a design that imparts rotary motions supplied by a riders foot into steering forces, and U.S. Pat. No. 4,991,861 to Carn et al. discloses a more conventional design that uses board tilt and rider lean to impart steering forces. While this approach does provide some advantages, they are overshadowed by the design's lack of stability and control.

The braking and binding components disclosed in the wheeled board prior art also fails to anticipate the applicant's designs. In U.S. Pat. No. 4,076,266 to Krausz (1978), a one handed brake design is disclosed. A similar one handed device can be seen in U.S. Pat. No. 6,123,348 to Miller (2000). The problem with this approach is the braking force required to stop an ATB is often greater is than the force the rider can apply with one hand. Other boards that employ foot operated brakes require the riders to adjust their footing during the ride, which can seriously compromise the riders ability to simultaneously steer or control the board. A binding feature disclosed in U.S. Pat. No. 5,544,919 to Tinkler (1996) provides foot supports located at opposite ends of a skateboard deck, prohibiting the ability of a rider to quickly regain his or her balance, or 'feet first' attitude after a forced ground or ariel dismount of the board, as does the binding feature seen in U.S. Pat. No. 6,193,276 to Sottile et al. (2001). U.S. Pat. No. 6,089,592 to Negus (2000) discloses a skateboard harness assembly that adheres the rider to the board in a loose and unpredictable manner.

SUMMARY

In accordance with the present invention a wheeled footboard sport conveyance that can be controlled safely and effectively at higher speeds and over irregular terrain.

Objects and Advantages

Several Objects and Advantages of the present invention are:

(a) To provide a wheeled sport conveyance that provides a stable and controllable ride at moderate to high speeds over varying types of terrain.

(b) To provide a wheeled sport conveyance that is resistant to 'wobbling', or 'flipping' when riding at moderate to high speeds over varying types of terrain.

(c) To provide a wheeled sport conveyance that is readily adaptable to and works well with motor propulsion.

(d) To provide a wheeled sport conveyance that steers from a single in-line front wheel and is powered by a single in-line rear wheel, eg., a motorcycle.

(e) To provide a wheeled sport conveyance wherein the steering assembly and linkage also works to absorb shocks.

(f) To provide a steering and design and assembly that improves the handling and control of a sport conveyance when cornering.

(g) To provide a steering design and assembly that improves the handling and control of a sport conveyance when 'jumping', or performing airborne maneuvers (h) To provide a wheeled sport conveyance that locates a higher percentage of its overall weight in the center, allowing greater balance and control during ground and airborne maneuvers.

(i) To provide a wheeled sport conveyance that provides strong enough binding support for a rider to stay secured to the board when desired, yet free enough binding support to allow the rider to quickly dismount when desired.

(j) To provide a braking device that can effectively slow down and stop an all-terrain wheeled sport conveyance.

Further objects and advantages are to provide a four wheeled sport conveyance that converts to or 'rides on' three wheels during many maneuvers, that allows all four wheels to work independently of one another, that can be easily picked up and handled, that has a frame that is mechanically adjustable to suit the varied weights of different riders, that has foot gripping components that are mechanically adjustable to fit the varying shoe sizes of different riders, and that allows the rider to maintain balance when quickly accelerating or decelerating. Still further objects and advantages will become apparent from a consideration of the ensuing description and drawings.

BRIEF DESCRIPTION OF DRAWINGS

In the drawings, closely related figures have the same number but different alphabetic suffixes.

FIG. 5a is a side elevation of the front footplate.

FIG. 5b is an end view of the front footplate as viewed generally from line 5b—5b of FIG. 5a.

FIG. 11 is an exploded view of the front frame section and the front axle steering components thereof.

FIG. 13 is a cross-sectional broken away view of the strut assemblies taken along lines 13—13 of FIG. 3.

FIG. 16 is a top plan view of the center strut section as viewed generally along lines 16—16 of FIG. 13.

FIG. 19 is an enlarged top plan view of the steering and control components of the center strut section.

FIG. 22 is also a perspective view similar to FIG. 18 wherein the front axle is pitched to a fully retracted position.

FIG. 24 is a left side perspective view showing the basic frame components of the rear drive section.

FIG. 27 is an enlarged plan view of the jackshaft assembly.

FIG. 29 is a semi-exploded partial view of the jackshaft assembly and corresponding mounting surface of the rear frame arm.

FIG. 32 is a perspective view showing the lower throttle linkage of the sport conveyance.

FIG. 32a is an enlarged top plan view of the same throttle linkage shown in FIG. 32.

FIG. 35 is an enlarged partial view of the adjustment mechanism for the truss support system.

FIG. 41 is a top plan view of the control baton showing the brake handle rotated approximately halfway through its range of motion.

FIG. 43 is an enlarged partial view of the throttle handle and attached throttle mount and lever.

DESCRIPTION OF DRAWINGS

Figure 1:
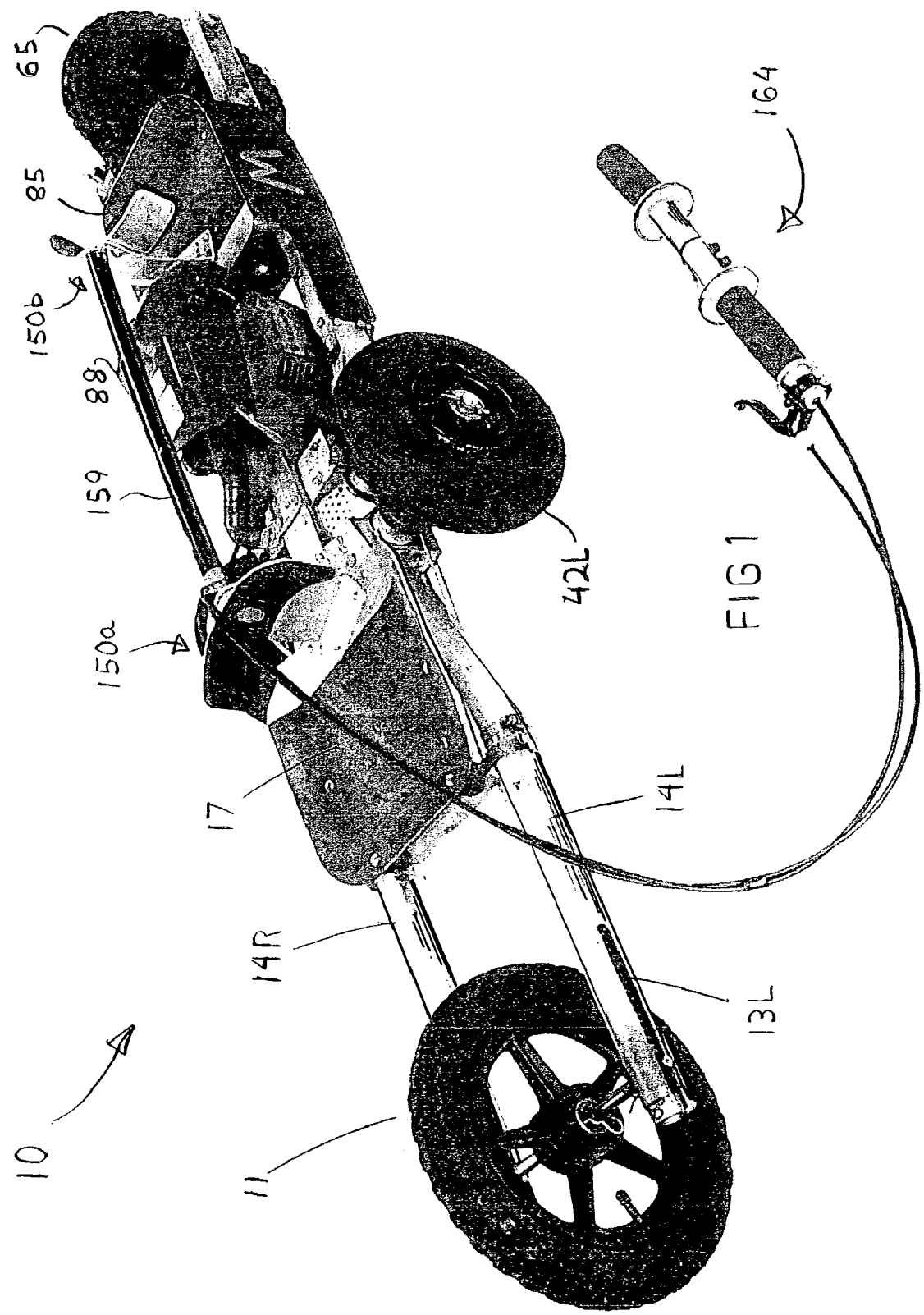
FIG. 1 shows in front perspective view, from above, one example of a sport conveyance in accordance with the present invention.
Figure 2:
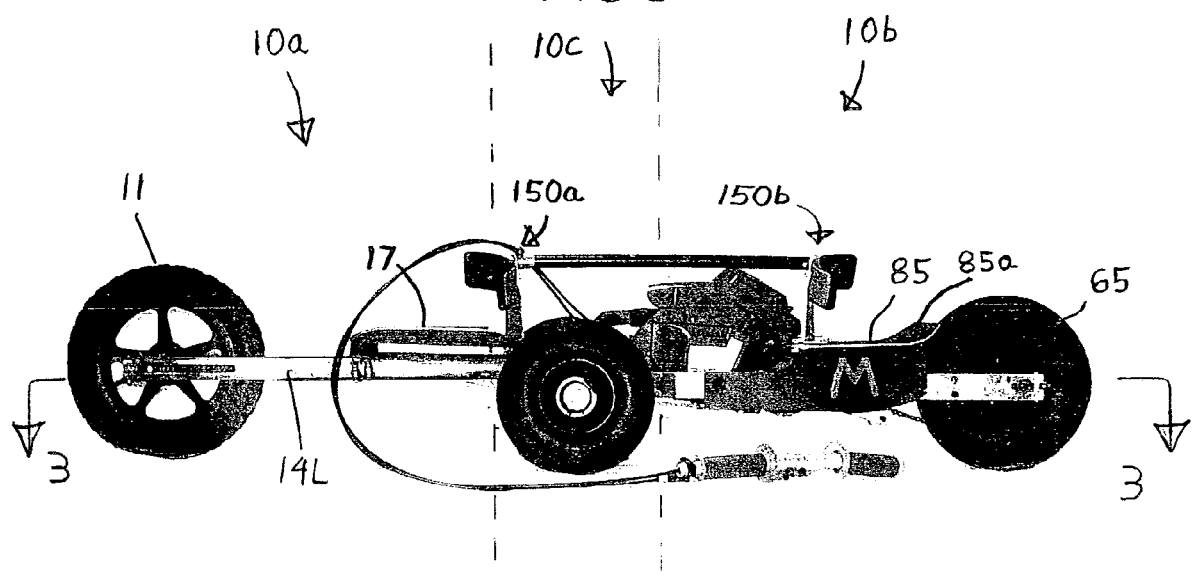
FIG. 2 is a side elevation of the sport conveyance.
Figure 3:
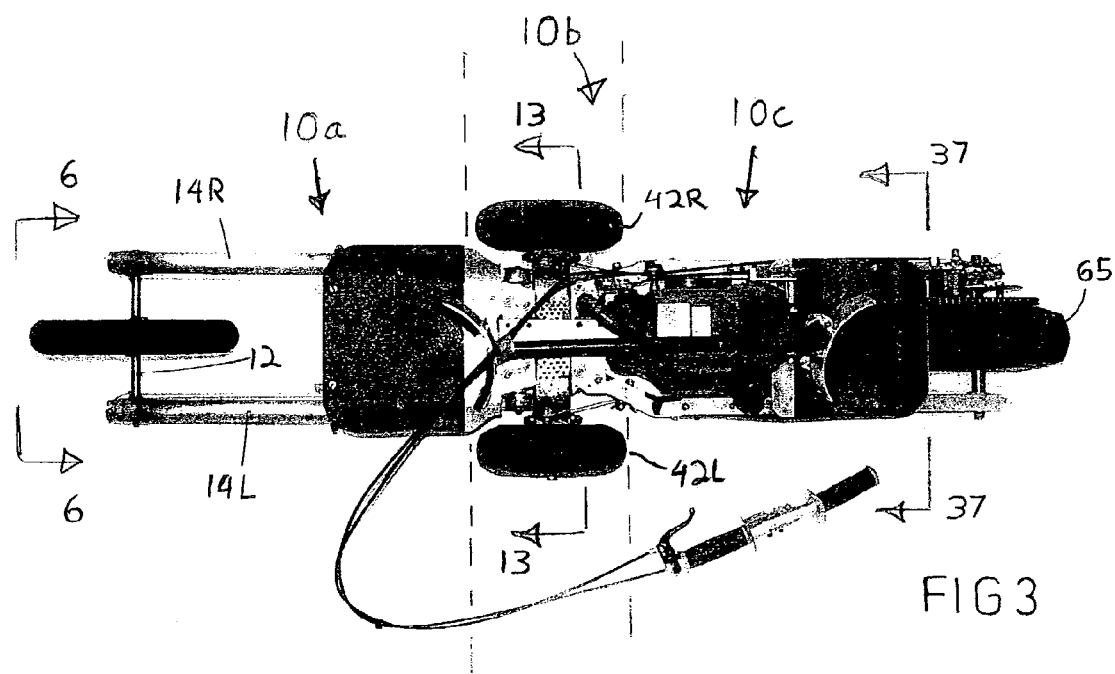
FIG. 3 is a top plan view of the sport conveyance of FIG. 2 as viewed generally from line 3—3 thereof.
Figure 4:
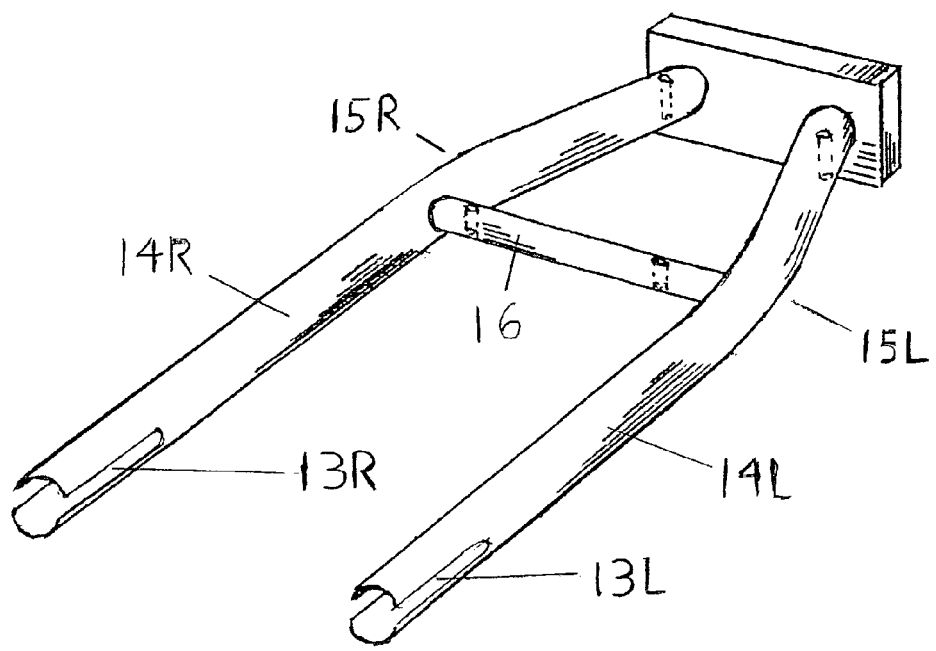
FIG. 4 is a perspective view of the forward frame section of the sport conveyance.

Referring now in detail to the drawings, a preferred embodiment of the present invention is illustrated in FIGS. 1–3. A wheeled sport conveyance 10 includes an overall chassis or frame structure that can be further subdivided into three sub-sections; a forward frame section 10a, a center strut section 10b, and a rear drive section 10c. Sections 10a, 10b and 10c are disposed conjunctively in sequence along a longitudinal axis from the front to the rear of conveyance 10. The structural frame components on the chassis of sport conveyance 10 are preferably composed of aluminum, steel or other high strength metal. Generally, frame sections 10a and 10b work together and are integral and complementary to the maneuverability and control of the sport conveyance.

The elements and details of forward frame section 10a are shown in FIGS. 1–11. On forward frame section 10a, a solid or pneumatic front wheel 11 is rotatably supported on front axle 12, which extends axially outward through aligned horizontal slots 13L and 13R located on the ends of longitudinal fork tubes 14L and 14R. Fork tubes 14L and 14R with slots 13L and 13R are horizontally aligned and centered with front axle 12, and extend rearward on a plane parallel to the ground, where they affix to center strut section 10b, as shown most clearly on FIG. 4. Fork tubes 14L and 14R are diametrical opposites of one another. At points 15L and 15R, the fork tubes bend inward towards each other and the longitudinal center axis of the conveyance, and are supported therein by interposed cross brace 16. Cross brace 16 is integrally secured to fork tubes 14L and 14R by means such as welding. A front footplate 17 is affixed to the aft portions of the front fork tubes at mounting locations 18a and to fork brace 16 at mounting locations 18b, as shown in FIGS. 5a and 5b. Aft footplate spacers 19 are interposed between front footplate 17 and fork tubes 14L and 14R, and forward footplate spacers 20 are interposed between footplate 17 and crossbrace 16. Forward footplate spacers 20 are of a longer length than rear spacers 19 thus creating an upward slope of footplate 17 towards the front of the conveyance, as shown in FIG. 5a. Perpendicular to the direction of that slope, FIG. 5b illustrates how the opposite side edges of the front footplate contour upward to form risers 17L and 17R, or slip resistant barriers. Preferably, the front footplate is made from light aluminum or steel plate wherein risers 17L and 17R are machine rolled, but alternatively, the front footplate may be constructed from plastic, wood, or composite, and the risers molded to form. Countersunk fastener holes located in the mounting positions of the front footplate allow fasteners 21 to nest flush with the surface of the footplate wherein fasteners 21 are secured by fastener nuts 210.

Figure 6:
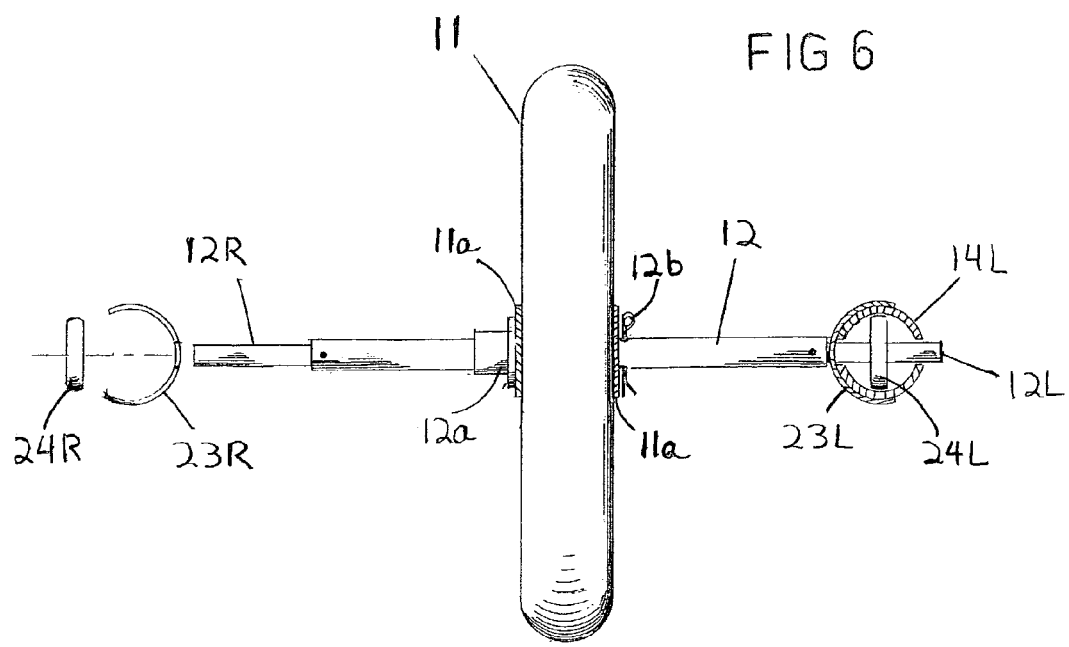
FIG. 6 is a front end view of the of the forward frame section as viewed from line 6—6 of FIG. 3
Figure 7B:
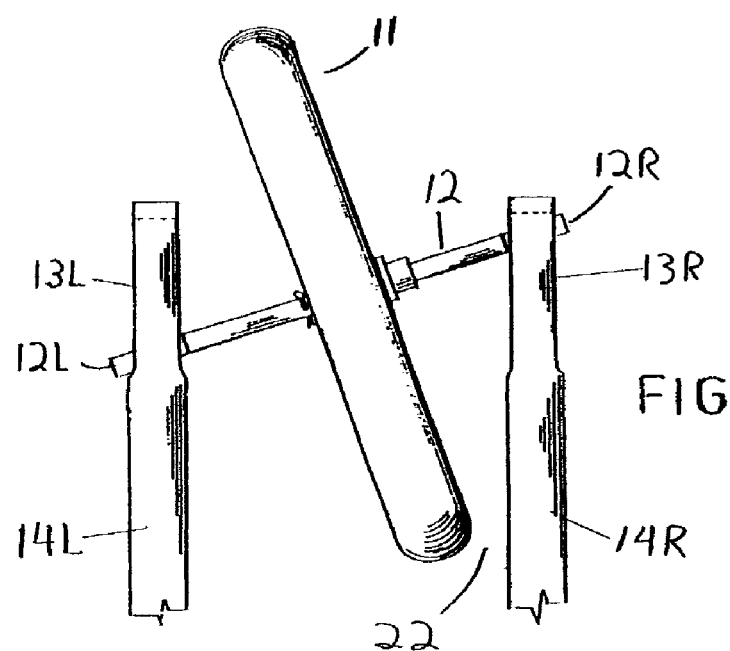
FIGS. 7a and 7b are top sectional views of the forward frame section.
Figure 7A:
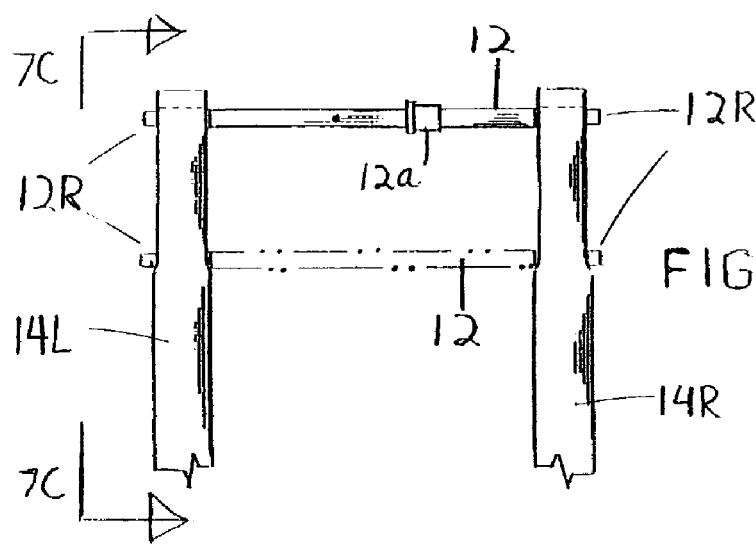
Figure 7C:
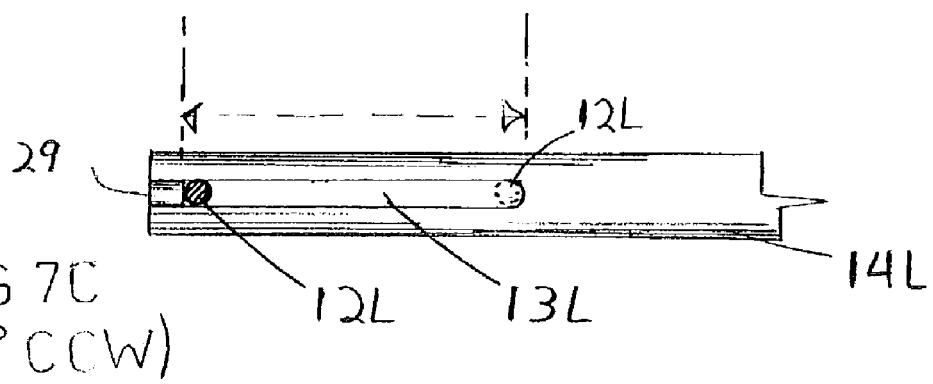
FIG. 7c is a side elevation of the forward frame section as take from line 7c—7c of FIG. 7b and rotated ninety degrees counterclockwise.
Figure 8:
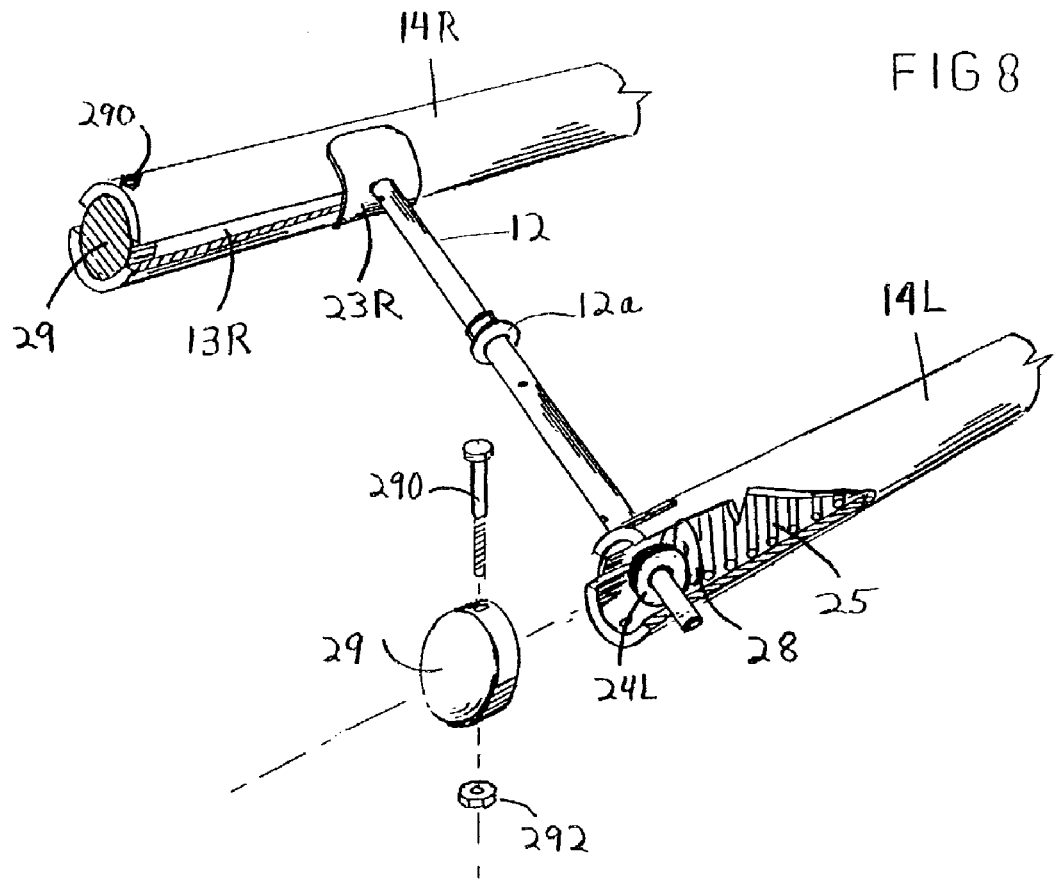
FIG. 8 is a perspective view showing the steering components of the front frame section.
Figure 12:
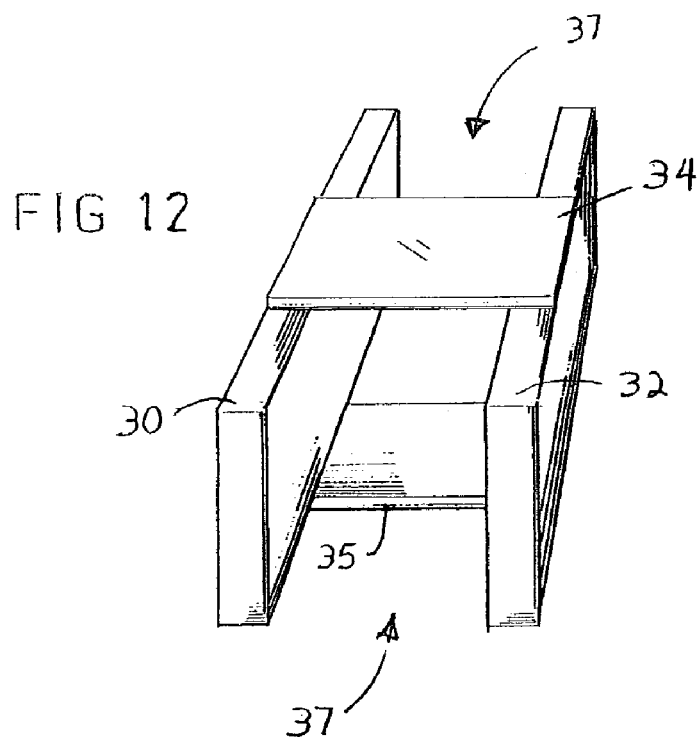
FIG. 12 is a perspective view showing the housing structure of the center strut section.
Figure 9:
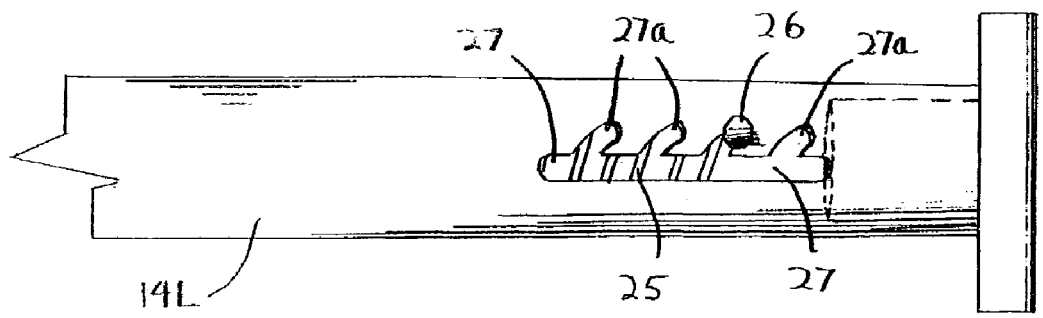
FIG. 9 is an enlarged partial side elevation of a fork tube showing a spring tensioner pin and adjuster slot.
Figure 10:
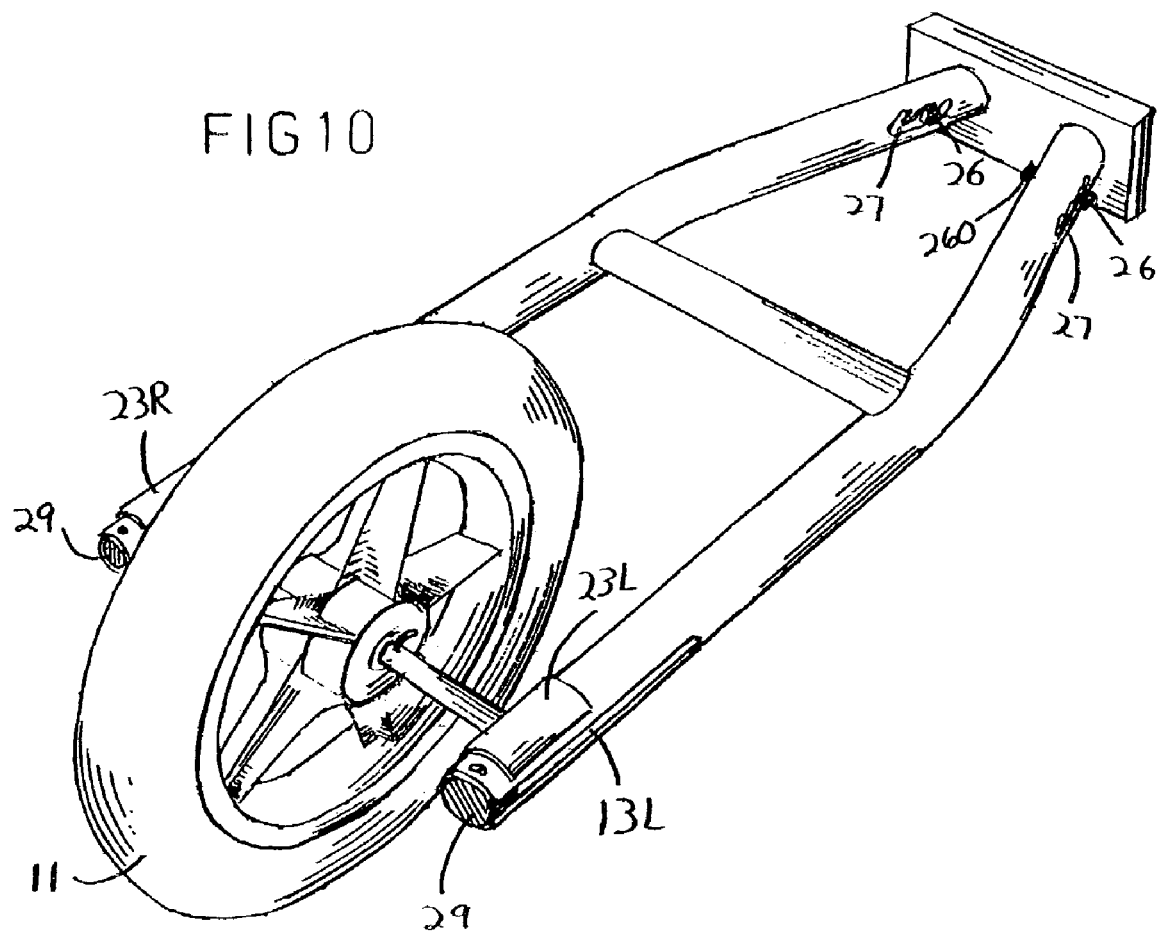
FIG. 10 is a perspective view of the front frame section showing the front wheel and steering axle assemblage loaded therein.

FIGS. 6–8 show more clearly the details of the front axle assembly. Front axle 12 is a cylindrical rod or shaft with stepdown cuts 12L and 12R milled on each end, forming a shaft with a larger diameter in the middle and smaller diameters on the ends, thereon as seen in FIG. 6. The length of stepdown cuts 12L and 12R are greater than the cross-sectional diameter of fork tubes 14L and 14R while the diameter of the stepdown cuts are slightly less than the width of axle slots 13L and 13R, thus allowing those portions 12L and 12R of axle 12 to slide anywhere, or 'float' within the longitudinal confines of axle slots 13L and 13R, as shown in FIGS. 7a–7c. The center portion of front axle 12 has a diameter larger than the width of axle slots 13 and a length equal to the span between fork tubes 14L and 14R, keeping front axle 12 centrally constrained therein, and allowing the opposite ends of the front axle to float horizontally in their respective axle slots both independently of or in tandem with one another. FIG. 7a shows in phantom a tandem float of the front axle wherein each step-cut end of axle 12 moves simultaneously with the opposite end along their respective axle slots, effectively changing the wheel base of the chassis, while keeping front wheel 11 (not shown) oriented in a straight-ahead position. In contrast, FIG. 7b shows a non-tandem float of axle wherein one end of the front axle moves independently of the other end. In this example, the left stepcut 12L portion of the front axle is disposed at the rear end of axle slot 13L in fork tube 14L, while the right stepcut portion 12R is disposed at the forward end of axle slot 13R in fork tube 14R. It is this inherent ability of the front axle to float independently within the opposing axle slots that helps to create the steering and control functions of this sport conveyance. With the front axle in this orientation, a rotatably attached front wheel 11 is oriented in a left turn vector.

An important mathematical relationship exists between the diameter of the front wheel, the length of the axle slots, and the distance between the fork tubes. One such geometric embodiment is shown in FIG. 7b, wherein front wheel 11 has a diameter of 30 cms, axle slots 13L and 13R a length of 16.5 cm, and a transverse distance between the innermost points of fork tubes 14L and 14R of 18.5 cms. In this embodiment, when the left end of the front axle is disposed at the aft end of the axle slot on fork tube 14L, the aft surface of the front wheel is disposed near the inside surface of fork tube 14R, creating a clearance gap 22. Conversely, a clearance gap 22 is also present on the opposite side when the front wheel is vectored to the full right position. Many alternative embodiments of sports conveyer 10 can be explored which may use different sizes front wheels, fork tubes, axles, and axle slots, however there is an inherent mathematical constant that must be maintained which can provide both a sharp turning vector for front wheel 11 and an adequate gap 22 of at least 10 cms. It has been noted that through the course of operation of the sport conveyance 10, front axle 12 can float through countless planar orientations within the confines of axle slots 13L and 13R, as dictated by the terrain and control of the rider, as illustrated in FIG. 7c.

On stepdown ends 12L and 12R of the front axle, fork tube sheaths 23 and fork runner bearings 24 interengage with fork tubes 14L and 14R, reducing friction and wear on the axle slots, the front axle and the fork tubes, aiding the aforementioned float process, as seen in FIG. 6. Fork sheaths 23L and 23R are circular washer type embodiments that are rolled or contoured so as to follow the same radial profile of the outside walls of fork tubes 14. At the center of each fork sheath 23L and 23L is a hole that is greater than the diameter of stepdown cuts 12L and 12R but less than the diameter of the larger center portion of front axle 12, thereby allowing fork sheaths 23 to freely slide over axle 12 until such point it reaches the end of its respective stepdown cut. A fork sheath 23 wraps around the outside of it's respective fork tube covering a span that is greater than one-half the circumference of the outside surface of that fork tube, keeping it affixed thereon in a cross sectional manner and yet allowing it to slide along the longitudinal axis of the fork tube. This allows fork sheaths 23L and 23R to act as friction reduction components between the abutting shoulders of the stepdown ends and the outside surface of it's respective fork tube, allowing the front axle to float more freely along the lengths of axle slots 13 as transverse side pressure is applied during steering and control maneuvers, illustrated most clearly in FIG. 8. Located adjacent to fork sheaths 23L and 23R on stepcuts 12L and 12R are fork runner bearings 24L and 24R. Like the fork sheaths, the inside diameter of runner bearings 24 accommodate the outside diameter of step-cut ends 12L and 12R, but are less than the larger diameter center portion of the front axle, allowing them to be rotatably positioned only on the stepcut ends. The outside diameter of a fork runner bearing 24 is less than the inside diameter of a fork tube 14, which allows it to nest in a primary orientation on a plane parallel with the longitudinal axis of the fork tube, and perpendicular to the ground. The outside diameter of a runner bearing 24 is preferably no less than ninety-five percent of the inside diameter of the fork tubes. The remaining five percent gap is a large enough clearance to prevent runner bearings 24 from getting jammed while floating in axle slots 13, yet is tight enough to keep the step-cut ends of the front axle from riding on the edges of the axle slots. As the weight of a rider bears down on conveyer 10 and front axle 12, that force is transferred from the front axle to runner bearings 24L and 24R, which then find little resistance in rolling back and forth along the upper and lower portions of the inner walls of fork tubes 14L and 14R, respectively, floating anywhere within the confines of axle slots 13. Just as fork sheaths 23 provide low friction buffers for lateral forces applied by the front axle 12 to fork tubes 14L and 14R during steering and control maneuvers, fork bearings 24 provide low friction buffers for the vertical forces created by gravity. In the example of FIG. 8, the front axle is oriented in a right turn configuration. The front wheel is omitted for clarity.

Reverting to FIG. 6, wheel bearings 11a of front wheel 11 are of a size that accommodates the larger diameter middle section of axle 12. Front wheel 11 is constrained to the center portion of axle 12 by a flange or protuberance 12a on axle 12 located on one side of the front wheel, and a clevis pin 12b located on the opposite side. Axle flange 12a is integrally secured to axle 12 such as by weld, while clevis pin 12b extends perpendicularly through a corresponding hole in axle 12. The interengaging sides of axle flange 12a, clevis pin 12b and wheel bearings 11a allow unrestricted rotational movement of front wheel 11 around axle 12, however will not allow the front wheel to slide traversely along front axle 12. Front wheel 11 can be removed from the front axle for repair or replacement by removing clevis pin 12b.

Referring now to FIGS. 8–11, cylindrical fork compression springs 25 are housed within fork tubes 14L and 14R, whose inside bores are of a diameter greater than the outside diameters of fork springs 25, thus allowing a freedom of movement during compressions and decompressions of fork springs 25 along the inside walls of fork tubes 14L and 14R. Fork springs 25 are abutted on their rearward ends by spring tension adjuster pins 26, shown in FIGS. 9 and 10, which protrude through adjuster slots 27 and bear against preselectable adjuster notches 27a. Adjuster notches 27a are spaced evenly and angled rearward off the lower sides of slots 27, which are located at the aft ends of the fork tubes. Tensioner pins 26 have a diameter slightly narrower than the widths of slots 27 and notches 27a, allowing a snug fit, and are secured in the selected notch settings by lock nuts 260 and the tension of fork springs 25. While still housed in fork tubes 14L and 14R, fork springs 25 extend forward in their respective fork tubes until they abut against front axle assembly runner bearing washers 28, which interface perpendicularly with their respective runner bearings 24L and 24R inside of fork tubes 14L and 14R, as seen most clearly on FIG. 8. Fork springs 25 are of a sufficient length and strength as to provide continual resistance to front axle 12, pushing the runner bearings 24 to their forward most position, abutting fork end caps 29. However, fork springs 25 cannot be so long and/or strong as to prevent front axle 12 from being able to float to the rearmost portions of axle slots 13. The tension of the fork springs can be adjusted by moving the aforementioned spring adjuster pins 26 along slots 27.

The full front wheel and axle assembly is simultaneously 'loaded' into fork tubes 14L and 14R by pushing the axle components against fork springs 25, thereby compressing them and providing spaces on the ends of the fork tubes for fork caps 29, which are affixed thereto by screws 290 and locknuts 292. With fork caps 29 in place, the front axle is locked within the confines of axle slots 13. An example of a 'loaded' front frame section 10a can be seen in FIG. 10. An exploded view of the front frame section is shown in FIG. 11.

Referring again to FIGS. 2 and 3, center strut section 10b works conjunctively with previously described section 10a to impart the steering and control forces of the sport conveyance. As shown in FIGS. 12–17, center strut section 10b includes a forward frame connecter plate 30 with front connecter stubs 31L and 31R, a rear frame connecter plate 32 with rear frame connecter stubs 33L and 33R, an upper splice plate 34, and a lower splice plate 35. The connecter stubs are shown most clearly in FIGS. 17a and 17b. Frame connecter plates 30 and 32 are preferably made from solid aluminum or steel plate with a thickness of at least 10 mms, and are set parallel and vertically even with one another in an orientation that is perpendicular to the longitudinal axis of the sport conveyance. Splice plates 34 and 35 are constructed out of the same material as connecter plates 30 and 32 but generally have thinner and narrower dimensions. Upper splice plate 34 is interposed above and between frame connecter plates 30 and 32, intersecting them perpendicularity at their center portions, wherein they are integrally secured by fasteners or welds. Similarly, the lower splice plate 35 is interposed below and between connecter plates 30 and 32, intersecting them at the center points of their lower edges. Frame components 30, 32, 34 and 35 join together to form a rigid structure that provides a secure 'housing' for strut wheel assemblies 36L and 36R by providing an open channel or space 37 between connecter plates 30 and 32.

As shown in FIGS. 13–16, a left wheel strut assembly 36L and right wheel strut assembly 36R are diametrically opposite embodiments that extend axially outward from one another in directions perpendicular to the longitudinal centerline of the conveyance, using the aforementioned channel 37 as a guide. It has been noted that similar to the left and right components of front frame section 10a, the components on left strut assembly 36L have the same part numbers as their opposing counterparts on the left strut assembly 36R. However, for ease of clarification, the 'L' and 'R' letter suffixes will be designated only when deemed necessary to the description of a particular component or group of components.

Figure 14A:
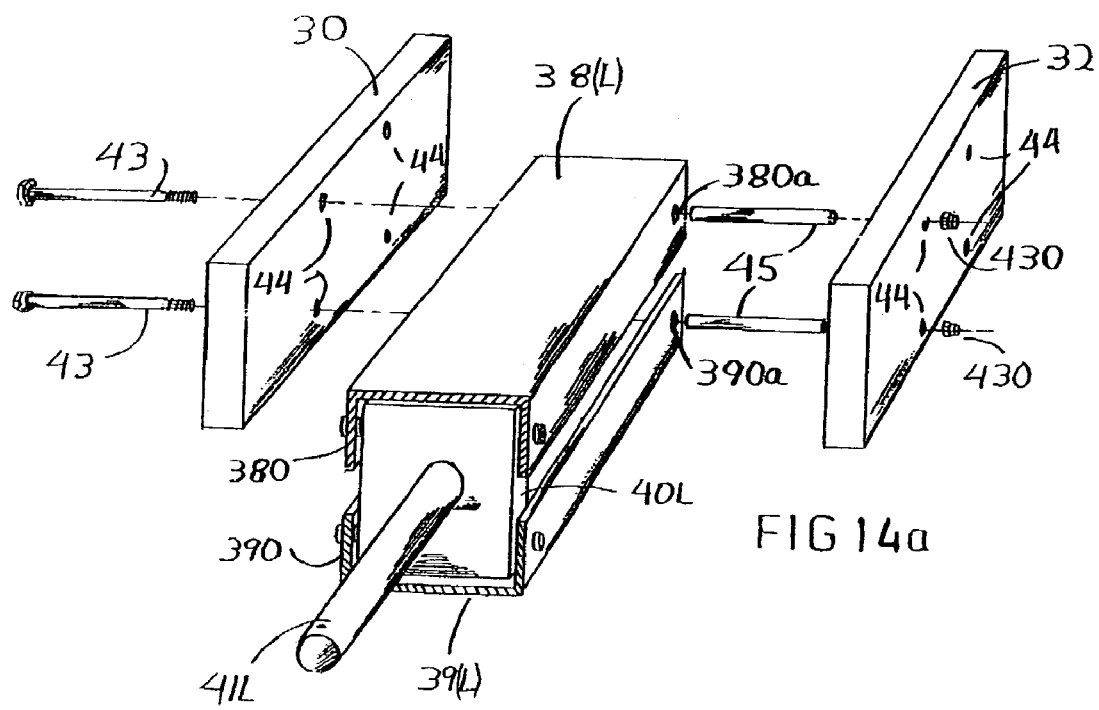
FIGS. 14a and 14b are enlarged semi-exploded perspective views of the left strut assembly.
Figure 14B:
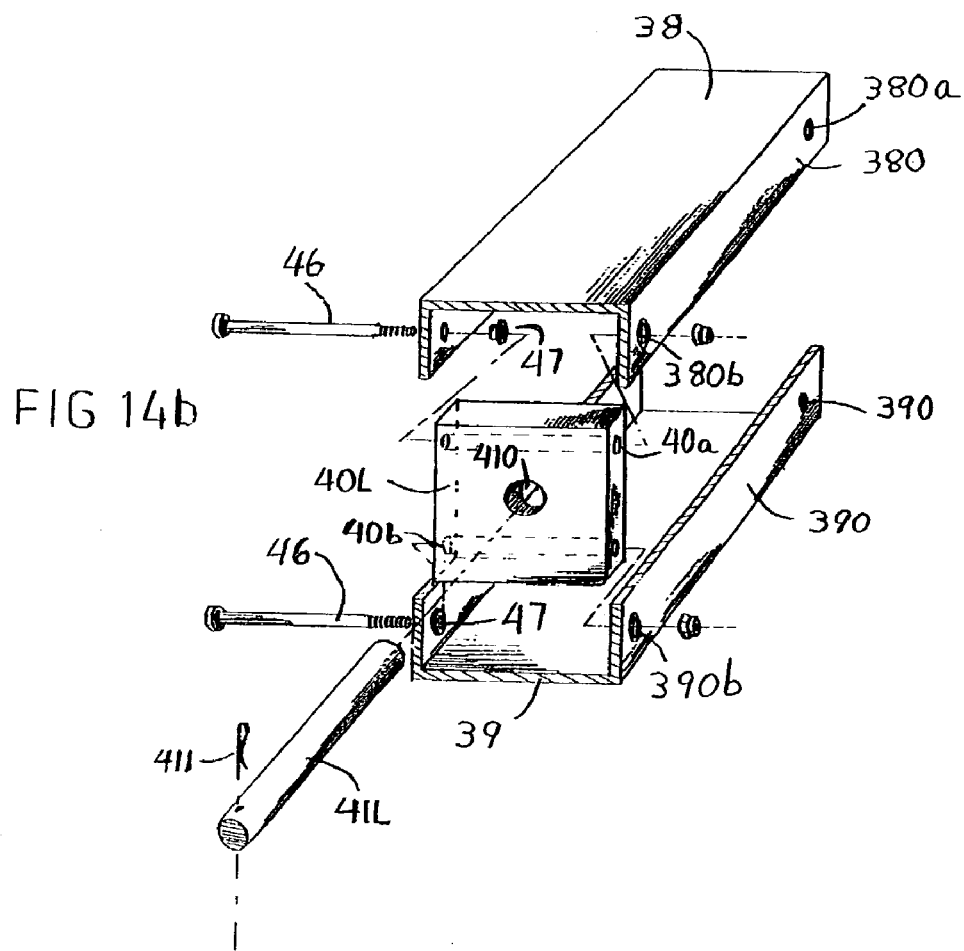
Figure 15:
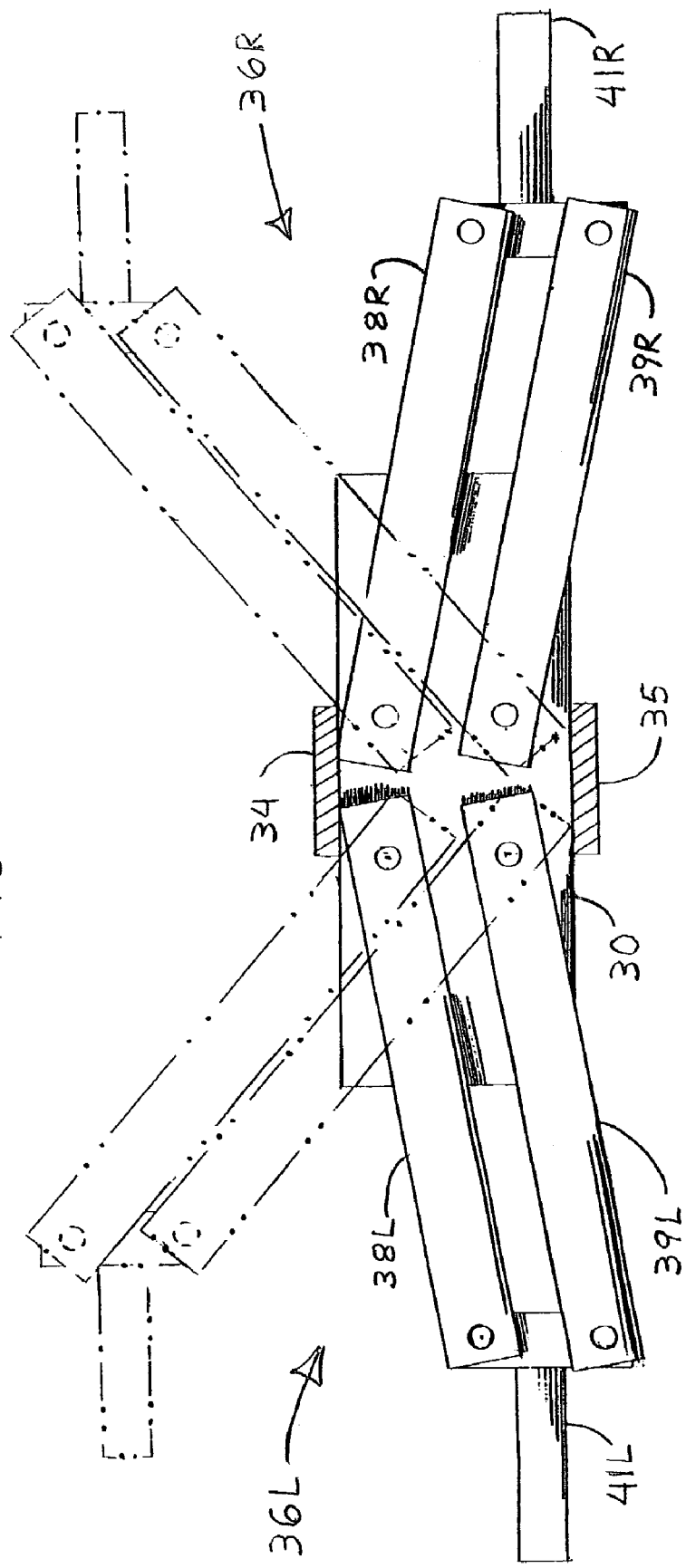
FIG. 15 is a phantom rear elevational view of the left and right strut assemblies showing the operation and range of motion thereof.

Strut assemblies 36L and 36R are each comprised of an upper strut leg 38, a lower strut leg 39, a support wheel axle hinge plate 40, and a support wheel axle 41. Support wheels 42L and 42R are rotatably mounted on axles 41L and 41R, respectively. A left wheel strut assembly is illustrated in FIGS. 14a–14c. Strut legs 38 and 39 are preferably constructed out of extruded or formed aluminum or steel U channel with a cross-sectional width that corresponds to the distance between connecter plates 30 and 32, or the width of channel 37. Upper strut leg 38 is oriented inside of channel 37 with sidewalls 380 extending down, and conversely lower strut leg 39 is oriented with side walls 390 extending up. Strut legs 38 and 39 of strut assemblies 36L and 36R are then rotatably mounted in channel 37 by a pair of strut pivot pins 43 that extend axially through matching holes 44 in connecter plates 30 and 32, and through adjacent holes 380a and 390a located in the respective sidewalls of strut legs 38 and 39. Preferably, pivot pin holes 380a and 390a are lined with pin bushings 45, which possess an inside diameter complimentary to the outside diameter of hinge pins 43, and are interposed between the sidewalls of the strut legs. Generally, pivot pins are hardened steel bolts that are threaded on one end and secured into place by locknuts 430. Rotatably mounted near the outside ends of upper strut leg 38 and lower strut leg 39 and between their respective opposing sidewalls is a support wheel hinge plate 40. Hinge plate pins 46 extend axially through mounting holes 380b in sidewalls 380 and holes 390b in sidewalls 390, and pass through hinge plate pivot holes 40a and 40b which are horizontally line drilled at the upper and lower portions of hinge plate 40, as seen most clearly in FIG. 14b. Holes 380b and 390b in are preferably fitted with steel strut bushings 47, whose inside bores correspond to and engage with hinge pins 46 allowing the strut legs and hinge pins counterrotate without imparting significant wear on one another. Each strut bushing 47 includes a bushing flange disposed on the ends of the strut bushings that face one another across the insides of their respective strut legs while being affixed in their respective sidewalls, wherein they are abutted to the inside surfaces of those sidewalls, as illustrated most clearly in FIG. 14b. The width of a hinge plate 40 corresponds to the distance between the inner exposed surfaces of the bushing flanges, allowing the hinge plate to nest inside in a snug but not overly tight fit. The thickness of a hinge plate 40 is enough to resist a fatiguing of the metal around hinge pin holes 40a and 40b as hinge pins 46 counter rotate therein. The height of hinge plate 40 is dependent on the vertical separation of hinge pin holes 40a and 40b therein, which is in turn dependent on and equal to the vertical separation of the pivot pin holes 44 in connecter plates 30 and 32.

Pivot pin holes 44 in the connecter plates are spaced far enough apart vertically to give strut legs 38 and 39 enough separation to 'swing', or rotate up and down in unison while staying generally parallel to each other. As shown in phantom in FIG. 15, an upward swing of strut assemblies 36L and or 36R brings strut legs 38 and 39 continually closer together until contact is made between sidewalls 380 and 390, at which point the upward swing of the rotating assembly(s) stops. In the present invention, a swing stroke of forty five degrees or more is preferred. The vertical distances between upper and lower pivot pin holes 44 in connecter plates 30 and 32 are equal to the distance between upper and lower hinge pin holes 40a and 40b in hinge plate 40, and the lateral distances between pivot pin holes 380a and 380b along the sidewalls 380 of upper strut leg 38 are the same as holes 390a and 390b in sidewalls 390 of lower strut leg 39. As a result, the planar orientation of hinge plate 40 always remains parallel to a vertical axis struck perpendicularly from the surface plane of the sport conveyance, turning the strut assembly into a 'floating parallelogram'. Extending out axially in a direction perpendicular to the outer surface of hinge plate 40L and 40R are support wheel axles 41L and 41R, which are cylindrical solid rods integrally secured by weld to hinge plates 40L and 40R at mounting holes 410. Rotatably mounted on support wheel axles 41 are solid or pneumatic support wheels 42L and 42R, which are held in place by a cotter or clevis pin 411 that extends through holes located at the end of each support axle 41. The outside diameter of the support axles correspond to the inside diameter of support wheel bearings 48, as shown in FIG. 16. Strut assemblies 36L and 36R are mounted separately on the left and right sides of the sport conveyance, allowing them to swing up and down in an independent manner as dictated by the attitude of the conveyance and the terrain there beneath.

Figure 17A:
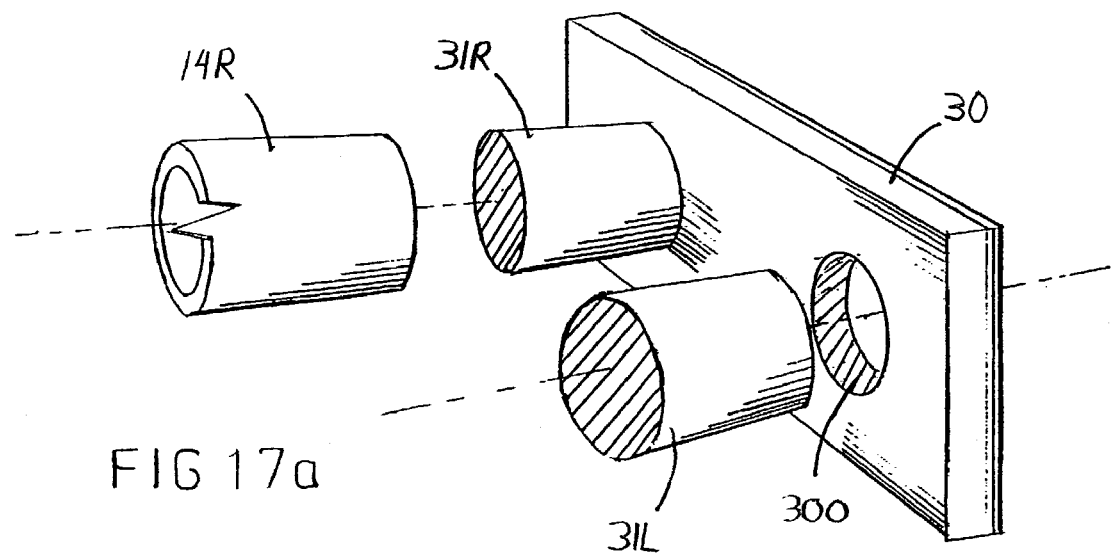
FIGS. 17a and 17b are enlarged perspective views of the connecter plates and their respective connecter stubs.

Center strut section 10b is in essence a self contained structure, and the rigidity it creates along the longitudinal axis of the conveyance provides a solid 'bridge' to which fork section 10a and drive section 10c can integrally mount, as shown in FIGS. 16 and 17. Splice plates 34 and 35 are preferably centered and vertically aligned with the longitudinal axis of the sport conveyance. On the forward side of frame connecter plate 30, front connecter stubs 31L and 31R angle outward from each other and the longitudinal centerline of conveyance 10 while extending a short distance forward from connecter plate 30. Front connecter stubs 31 are preferably cylindrical rods or tubes that protrude at their aft ends through stub holes 300 in connecter plate 30, wherein they are integrally secured by welds, as shown in FIG. 17a. The inside diameters of fork tubes 14L and 14R correspond to the outside diameters of front connector stubs 31, and are affixed thereon by weld or fastener. Alternatively, fork tubes 14 may themselves slide into corresponding mounting holes 300 and be integrally secured therein by welds.

Figure 17B:
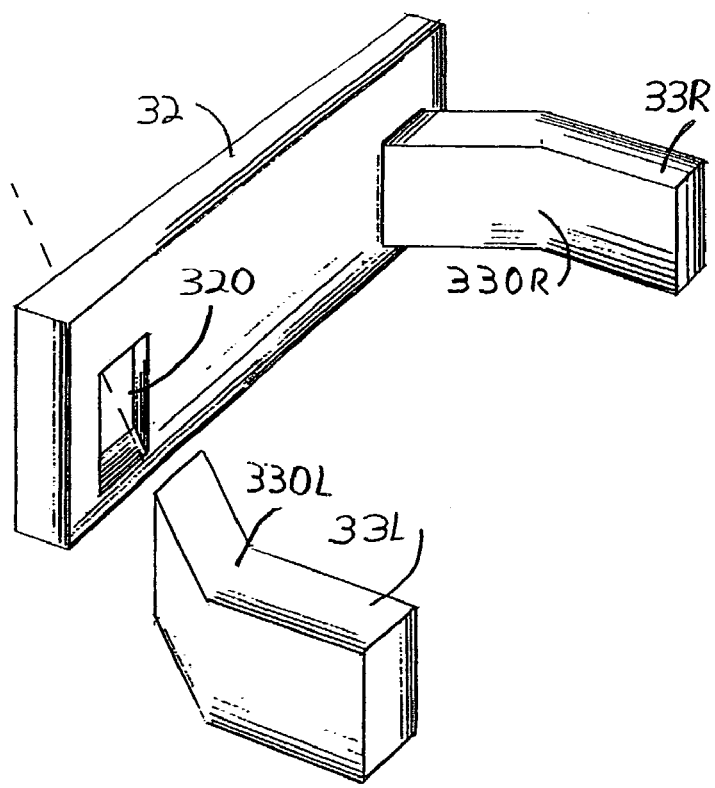

Referring now additionally to FIG. 17b, on the aft side of rear connecter plate 32, rear connector stubs 33L and 33R angle outward from each other and the longitudinal centerline of the conveyance while extending a short distance rearward from connecter plate 32. In the preferred motorized embodiment of the sport conveyance, rear connecter stubs 33 are solid rectangular metal extrusions that protrude at their forward ends through rear plate stud holes 320 wherein they are integrally secured by welds. At points 330L and 330R, rear connecter stubs 33L and 33R bend inward until they are parallel with the longitudinal axis of the conveyance. The degree of bend at points 330L and 330R may vary according to the size and application of the conveyance, as well as the type of power plant being used thereon.

Figure 18:
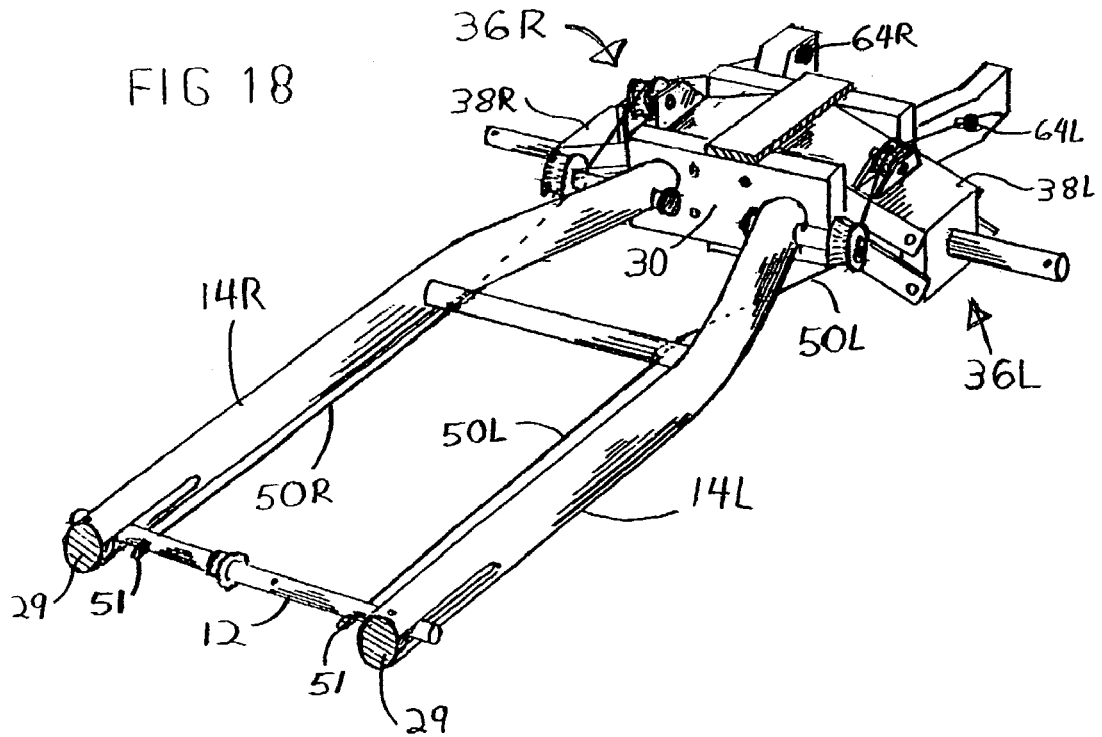
FIG. 18 is a perspective view of the front frame section as attached to the center strut section, and the interworking steering and control relationship therein.

FIGS. 18–22 illustrate how the left strut assembly 36L and right strut assembly 36R maintain a cause and effect relationship with the components of left fork tube 14L and right fork tube 14R, respectively, through the use of control lines 50L and 50R. Control lines 50L and 50R are generally made from high strength steel cable with a pulling capacity of at least 150 kg and a width not greater than 5 mms. As is the case with the left and right strut assemblies, the left fork tube 14L and its components are diametric opposites of the right fork tube 14R and its components. FIG. 18 shows how control lines 50 are interconnected between the end portions of front axle 12 and their respective strut assemblies. Control line holes 50L and 50R are located on each end of the larger diameter portion of front axle 12, adjacent to fork sheaths 23L and 23R (not shown), respectively. The forward end of control lines 50 extend through their respective holes in front axle 12, and are anchored thereon by cable ferrules 51. Control lines 50L and 50R then extend rearward in a direction generally parallel to the straight portions of the fork tubes passing through steel guide tubes 52L and 52R located in holes 53 in fork brace 16, as shown most clearly in FIG. 19. The control lines then angle slightly downward to cross underneath the portions of the fork tubes that adjoin front plate connecter 30. From there, control lines 50L and 50R then pass underneath control line pulleys 53L and 53R respectively, then are guided up and over control line bushings 54L and 54R, and are finally anchored to the center strut section at rear connecter studs 33L and 33R.

Control line pulleys 53 are rotatably mounted on a pulley rods 55L and 55R which extend axially through rod holes 56L and 56R in fork tubes 14L and 14R in a direction parallel to the sidewalls of the strut legs. A pulley rod 55 is preferably a solid cylindrical steel rod with a diameter of at least 10 mms, and is held in place on its respective fork tube by a rod flange 550 disposed on the inner ends of pulley rods 55, and clevis or cotter pins 57 disposed on the other ends of rods 55. Cotter pins 57 extend through holes which are adjacent to and abut the outer surfaces of the fork tubes. A control line pulley 53 is preferably a wide bearing with an inside diameter that corresponds to the diameter of pulley rod 55, and an outer diameter that is generally at least twice the size of the inside diameter. The outer surface element of a control line pulley 53L or 53R has a concave surface portion wherein is tracked a control line 50L or 50R, respectively. A spacer bushing 58 prohibits the rotating pulleys 53 from sliding over and contacting fork tubes 14, and pulley washers 59 prevent the pulleys from sliding off the ends of their respective pulley rods. A pulley washer 59 has an outside diameter larger than the inside diameter of a control line pulley. Pulley washer 59 is affixed to the outside end of pulley rods 55 by a pulley washer bolt 60 which screws into a threaded hole 61 that extends inward from the outside end of pulley rods 55. Control line roller bushings 54L and 54R are rotatably mounted to the inside of their respective channel bracket 62L or 62R, which in turn is integrally secured to the top surface of left upper strut leg 38L or 38R by fastener or weld. A bushing bracket 62 is disposed laterally across each upper strut leg 38 in a location that lines roller bushings 54L and 54R up with its respective control line pulley in a vector that is parallel to the longitudinal axis of the conveyance, as illustrated in FIG. 19. A bushing bolt 63 extends axially through the center of a control line bushing 54 and adjacent holes in the sidewalls of bushing bracket 62, and is held therein by locknut 630. The rearward end of a control line 50 then passes through a hole in a portion of a control line anchor bolt 64 that is adjacent to the outside surface of rear connecter stubs 33L or 33R, and is anchored thereon by locknuts 640.

Figure 21:
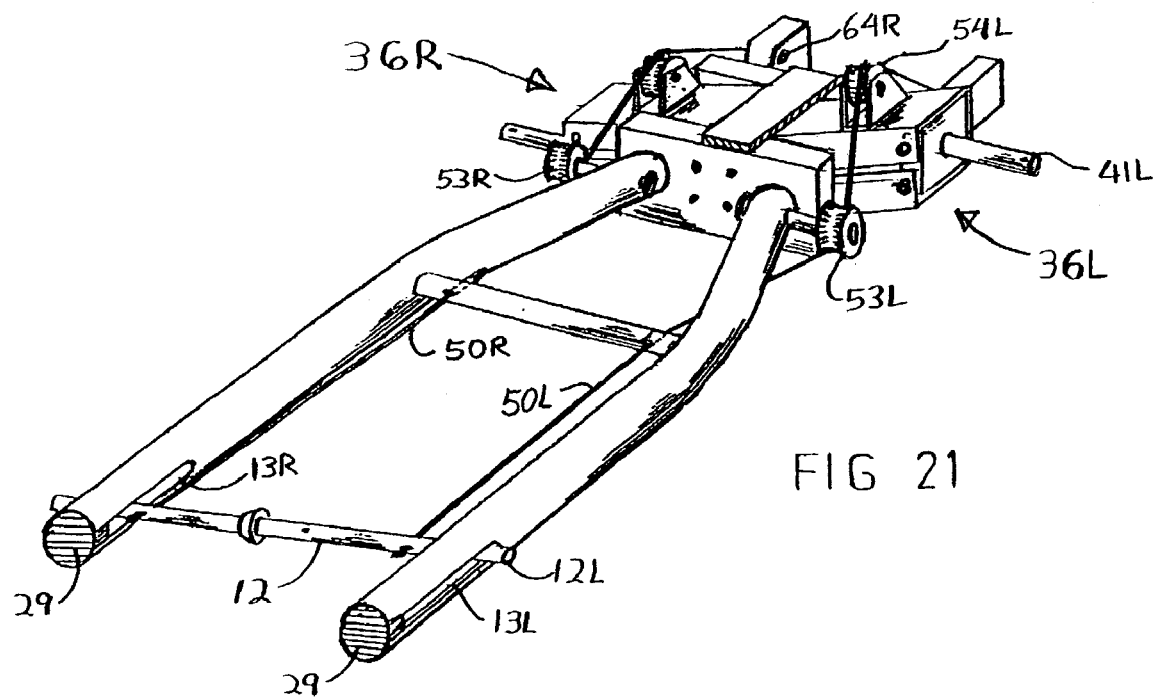
FIG. 21 is a perspective view similar to FIG. 18 wherein the front axle is pitched in a left turn attitude.
Figure 20:
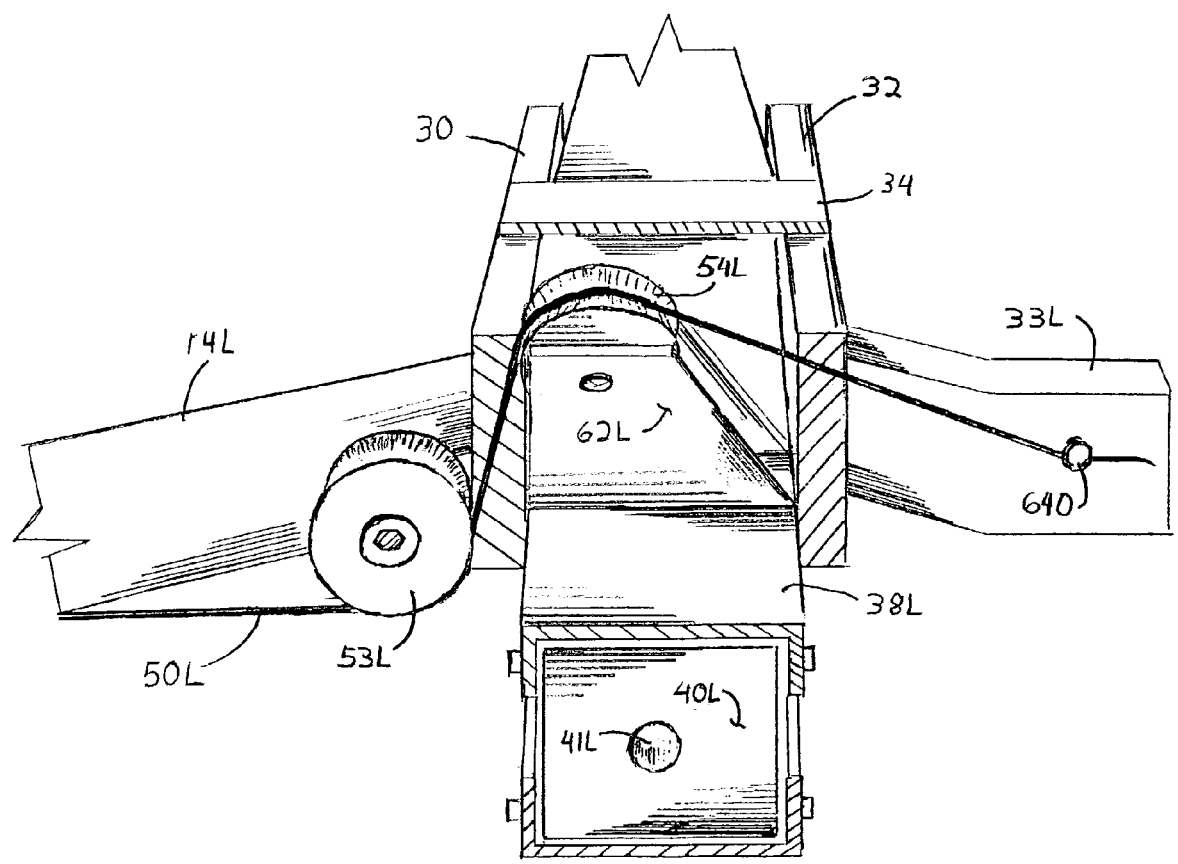
FIG. 20 is an enlarged sectional view of the left strut assembly and corresponding steering and control components

FIGS. 18, 21 and 22 show some of the various interactive positioning of front axle 12 relative to strut assemblies 36L and 36R via control lines 50L and 50R. FIG. 18 shows a relaxed, or static orientation of the steering and control elements of the sport conveyance. A continual outward pressure exerted on front axle 12 by the compression springs housed within opposing fork tubes 14L and 14R effectively push each end of the front axle against its respective fork cap 29. This lengthens the distance between the front mounting points of control lines 50L and 50R on the front axle and their respective rear mounting points at mounting bolts 64L and 64R. As the slack inherent in each control line is tightened, the portions of those control lines that engage the top surfaces of strut legs 38L and 38R at bushings 54L and 54R force the swingable strut assemblies 36L and 36R to rotate downward until such point that the upward and inner end portions of strut legs 38L and 38R contact the underside of top splice plate 34, as most clearly in FIG. 13. When this contact is made, the left and right strut assemblies are at their full rest position, and the respective support wheels 42L and 42R that are attached thereon raise the center portion of the conveyance to an attitude that allows the longitudinal axis of the front fork tubes to run parallel to the ground, as can be seen in FIG. 2. In the example shown in FIG. 21, a left turn attitude is illustrated. The right strut assembly remains in its static orientation. However, an upward pressure is applied to support wheel axle 41L on the left strut assembly which forces control line bushing 54L to engage with and pull upon the rear portion of control line 50L. Since control line 50L is secured at its rearmost end by an anchor bolt 64, the slack must be taken upon the opposite end. This is accomplished by a compressing of the left fork spring 25 along the inside of fork tube 14L. As the left strut assembly is rotated upward, the forward end of control line 50L pulls rearward, bringing with it the left portion of the front axle on which it is anchored. Ideally, as the left stepcut end 12L of the front axle is pulled to the rearmost portion of axle slot 13L, the swing of the left strut assembly simultaneously reaches its greatest angle of rotation. This action is enabled by the control line pulley 50L, which, as best shown in FIG. 20, forces the control line to ride underneath it before extending up and over bushing 54L. Preferably, pulley 53L and bushing 54L are located as close to each other as possible, wherein the portion of the control line that runs between them is on a plane nearly parallel to vertical plane of rotation of the strut assembly.

Because of a pulley 53L or 53R, for every increment of upward or downward swing movement of its respective strut assembly, a near equal increment of forward and aft movement of the front axle along axle slots 13 can be expected, thus maximizing the efficiency of the system. When the aforementioned upward pressure on the left strut assembly via support axle 41L is released, the force of the left fork spring decompressing simultaneously pushes the left portion of the front axle and the left strut assembly back to their static positions. For a right turn attitude of the front axle, the orientations of the left and right strut assemblies are simply reversed. FIG. 22 shows an orientation wherein an upward pressure is applied to both the left and right strut assemblies. In this example, both the left and right end portions of the front axle are pulled inward along axle slots 13. The importance of this action will be explained hitherto.

FIGS. 23–32, disclose the rear drive section 10c of the sport conveyance. In the preferred motorized embodiment of the conveyance, a solid or pneumatic rear drive wheel 65 is rotatably supported on rear axle 66, which extends axially outward through aligned horizontal slots 67L and 67R located on the aft ends of longitudinal frame arms 68L and 68R. Rear axle 66 is a solid aluminum or steel shaft with a diameter that corresponds to the size of bearings within the hub of rear wheel 65. Frame arms 68L and 68R are rectangular aluminum or steel tubes wherein slots 67L and 67R are horizontally aligned and centered with rear axle 65, and wherein they extend forward on axes that are parallel to the ground and each other, mounting then on rear connecter studs 33L and 33R, as shown in FIG. 24. The inside dimensions of the frame arms 68 correspond to the outside dimensions of rear connecter stubs 33 allowing the former to slide over the latter until the bend points of the connecter studs are reached. Rear stud bolts 69 and locknuts 690 secure the frame arms to the connecter stubs.

Figure 25A:
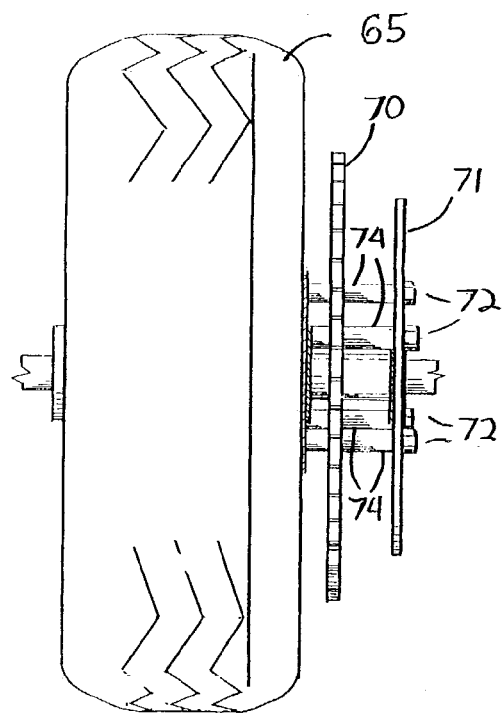
FIG. 25a is a perspective view of the rear drive wheel.
Figure 25B:
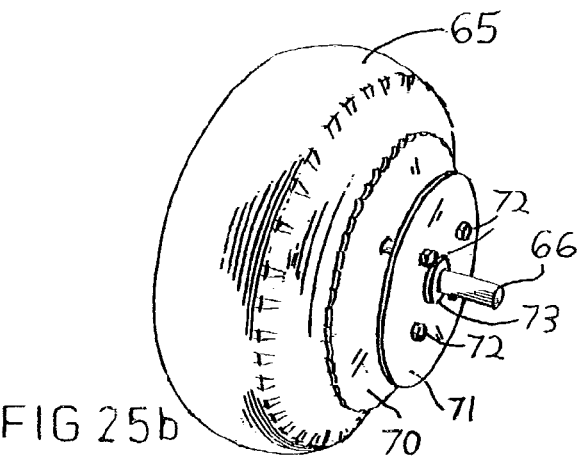
FIG. 25b is a rear elevational view of the rear drive assembly.
Figure 26:
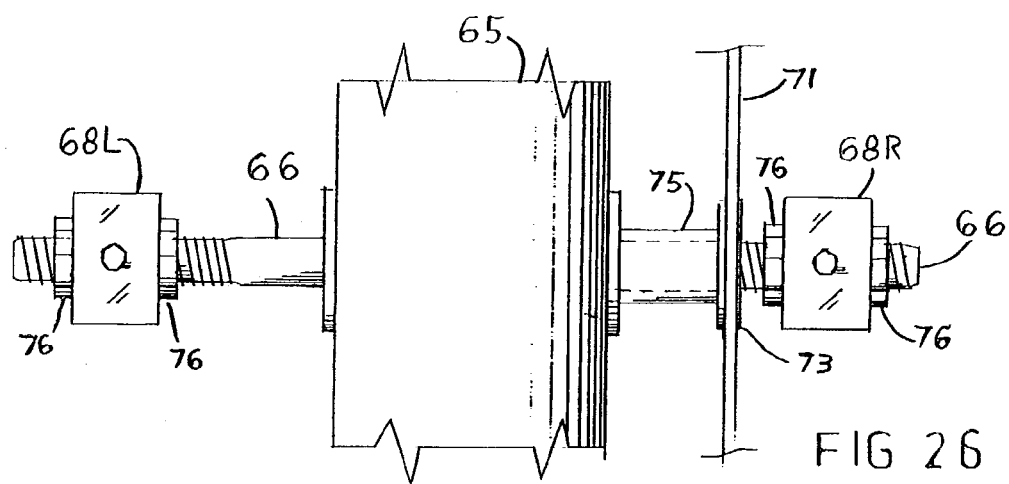
FIG. 26 is an enlarged rear elevational view of the rear drive wheel as mounted on the rear drive section of the sport conveyance.

Adjacent to one side of rear wheel 65 on rear axle 66 is disposed a rear wheel counter sprocket 70 and a brake disc 71, which are mounted on the hub of rear wheel 65 by hub bolts 72, as shown in FIGS. 25a and 25b. At the center of brake disc 71 is a disc bearing 73 that corresponds to the diameter of rear axle 66, and is rotatable thereon. Sprocket spacer bushings 74 keep a fixed distance of separation between counter sprocket 70 and drake disc 71. As shown in FIG. 26, a rear axle spacer 75 is disposed on rear axle 66 between the right hub of rear wheel 65 and the left surface of disc bearing 73, keeping the rear wheel in a central position along rear axle 66 that is equidistant from the inside surfaces of frame arms 68L and 68R. Axle spacer 75 is integrally secured to the rear axle by bond or weld. Rear axle locknuts 76 are disposed on the threaded end portions of the rear axle and bear against each side of the slots of frame arms 68L and 68R, securing the rear axle in place. Referring again to FIG. 24, the adjuster mechanism for the rear wheel is disclosed. Threaded rear wheel adjuster bolts 77 extend axially through wheel adjuster holes 78 located near each end of the rear axle, and through adjacent holes 80 in endcap(s) 79. A lock nut 770 bears against the outside surface of it's respective endcap to further secure the rear axle in the desired setting along the length of rear axle slots 67L and 67R.

A sway bar 81 is interposed transversely between rear frame arms just forward of the rear wheel. Sway bar 81 is preferably a solid metal rod with threaded fastener holes 82L and 82R on each end and a length equal to the distance between inner apposing walls of frame arms 68L and 68R. Sway bar bolts 83L and 83R extend axially through adjacent holes in the frame arms and thread into fastener holes 82, securing the sway bar therein.

A rear footplate 85 is mounted on top of and across frame arms 68L and 68R forward of rear wheel 65, and on top of rear footplate risers 86L and 86R. Rear footplate risers 86 are tapered hollow block type elements, preferably made from plastic or lightweight metal, that slope upward as they extend rearward along the top surfaces of frame arms 68L and 68R. Countersunk threaded fastener bolts 87 simultaneously affix rear footplate 85 and footplate risers 86 to the rear frame arms by extending through holes located adjacently in the footplate, riser blocks and frame arms, where they are secured thereon by locknuts 870. The rear portion of footplate 85 contours upward forming a contour riser 85a, or slip resistant barrier. Similar to front footplate 17, rear footplate 85 is made from light aluminum or steel plate wherein riser 85a is machine rolled, but alternatively, the footplate may be constructed from plastic, wood, or composite, and riser 85a molded to form.

Figure 23:
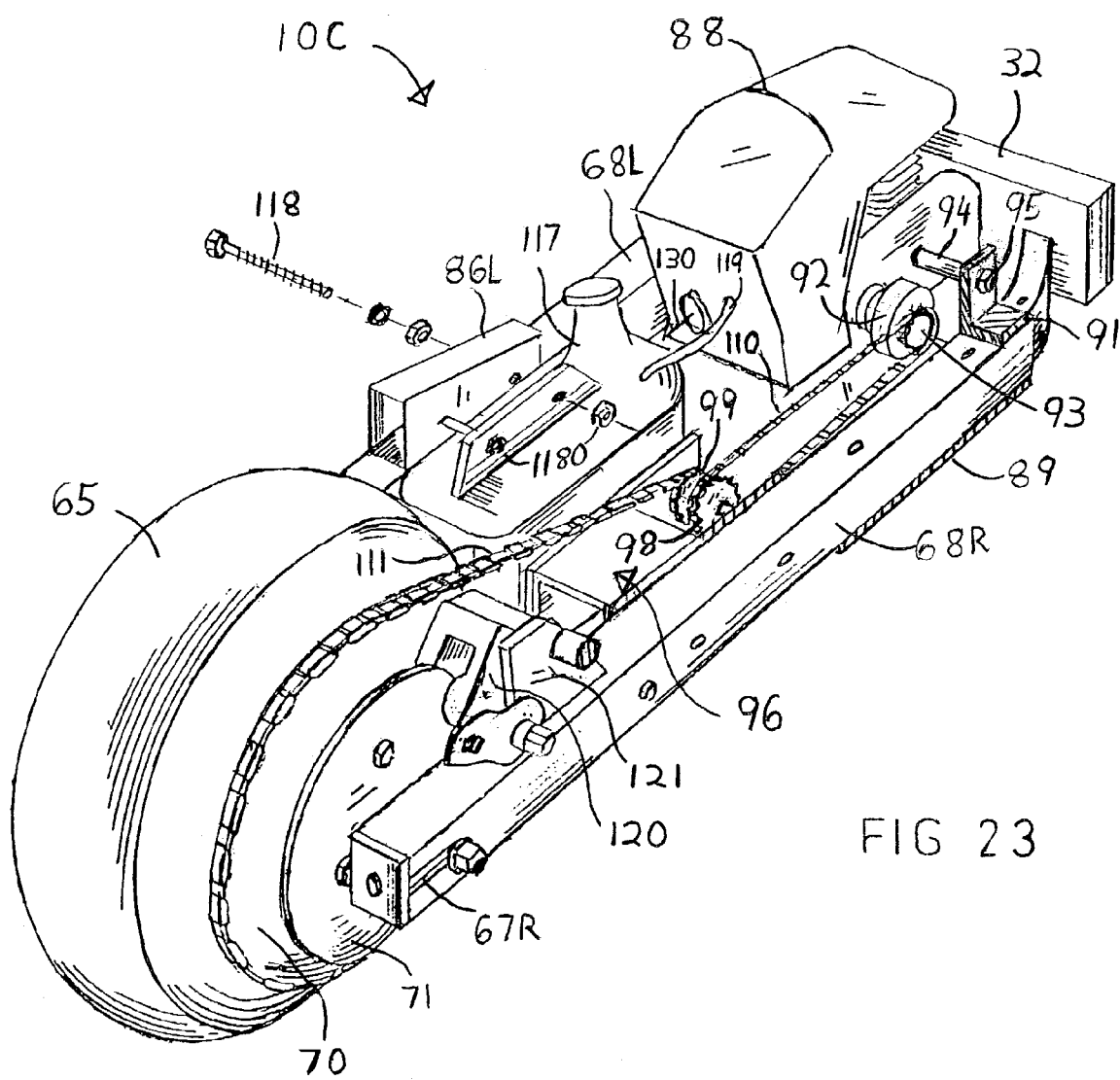
FIG. 23 is a right side perspective view showing the rear drive section of the sport conveyance.

Referring again to FIG. 23, a preferred embodiment of the present invention includes an engine or powerplant 88 disposed on the forward portion of rear frame section 10c, directly behind rear frame connecter plate 32, and between the rear frame arms. Powerplant 88 is preferably a commercial two or four stroke internal combustion engine with an efficient power to weight ratio, but alternatively powerplant 88 may be electrically based. Powerplant 88 is affixed to an engine mounting plate 89, which is in turn interposed beneath and between the lower edges of the frame arms and affixed thereon by screw fasteners 90 and locknuts 900, as shown in FIG. 24. Engine mounting plate 89 is generally an aluminum or steel plate and is readily adaptable to mount a variety of powerplants. Frame arms 68L and 68R are far enough apart to allow the preferred engine 88 to nest between them and attach to the top surface of engine plate 89. For different engine applications, the dimensions and angles of rear connecter stubs 33L and 33R, as shown most clearly in FIGS. 16–17, can be altered during the manufacturing process to change the resulting distance between the frame arms. In such a case, some dimensions of rear frame components mentioned heretofore would have to be changed accordingly. In the present invention, a commercial two stroke engine is used which requires a lateral span of 18 cms between frame arms. The span of engine mounting plate 89 in this embodiment is 23 cms, or 18 cms plus the combined widths of the two frame arms. An engine mounting bracket 91 is integrally secured to one of the frame arms, preferably on the side common to a clutch drum 92 and engine sprocket 93 on engine 88, thereon as seen in FIG. 23. In the present invention, the clutch drum 92 and engine sprocket 93 are disposed on the right side of engine 88 and adjacent to frame arm 68R. Engine bracket 91 is welded to the top of frame arm 68R in a location forward of clutch drum 92, and an engine anchor bolt 94 is secured thereon by engine mount nut 95.

Figure 28:
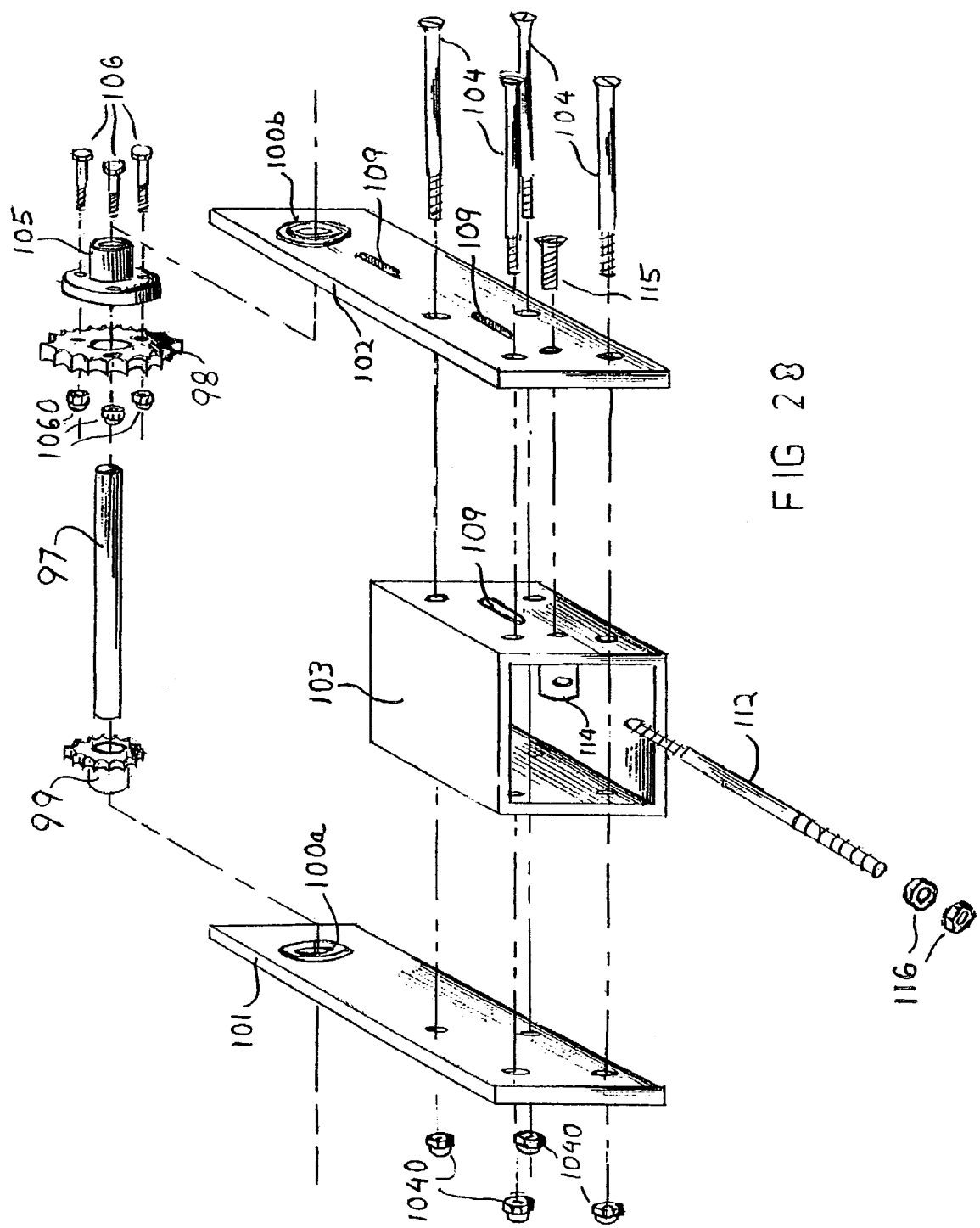
FIG. 28 is an exploded view of the jackshaft assembly.

Referring now to FIGS. 23 and 27–29, a jackshaft assembly 96 is disclosed. A jackshaft 97 extends axially through a drive sprocket 98, a transfer sprocket 99, and shaft bearings 110a and 100b. The jackshaft 97 is generally a hardened cylindrical steel rod with a diameter that corresponds to the size of shaft bearings 100, which are disposed opposite of one another in the forward portions of jackplates 101 and 102. The rear portions of the jackplates 101 and 102 are affixed to the opposite sides of a jack plate body 103 by countersunk screw fasteners 104, which extend through pre-aligned holes in the three adjoining components, and are secured thereon by lock nuts 1040, as shown in FIG. 28. Jack plates 101 and 102 are aluminum or steel flat bars with a thickness of at least 6 mms and a wide enough cross section to receive the outside diameters of shaft bearings 100. Jack plate body 103 is generally an extruded or formed rectangular tube with a length that is less than half of the length of the jackplates and a height that is equal to the width of the jackplates. The width of jack body 103 provides enough separation between the apposing jack plates and shaft bearings 100 that the drive sprocket 98 and transfer sprocket 99 can be mounted adjacent to each other on jackshaft 97 with enough distance from each other and the shaft bearings next to them to ensure the effective operation of the assembly. The smaller transfer sprocket 99 has the same pitch as the counter sprocket 70 on rear wheel 65. Transfer sprocket 99 with its shoulder hub 99a is affixed to jackshaft 97 generally by weld, but alternatively may be mounted by set screw or keyway. The larger drive sprocket 98 has the same pitch as engine sprocket 93, and is mounted to a universal sprocket hub 105 by bolts 106 and locknuts 1060. Sprocket hub 105 in turn is integrally secured to jackshaft 97 by weld. Drive sprocket 98 may be removed off sprocket hub 105 and replaced by sprockets with varying amounts of teeth to modify the gear ratio of the jackshaft assembly. The length of the jackshaft 97 is equal to the overall distance between the opposite outside surfaces of shaft bearings 100a and 100b in jackplates 101 and 102.

The jackshaft assembly 96 is disposed on the inside or left surface of frame arm 68R, directly behind the clutch drum 92 of engine 88. Jack shaft assembly mounting bolts 107 extend axially inward through mount holes 108 in frame arm 68R and adjacent horizontal slots 109 in jackplate 102, where they are secured by lock nuts 1070, thereon as seen in FIG. 29. Jack plate slots 109 are generally at least 25 mms in length. With the jackshaft assembly secured in place, the drive sprocket 98 is lined up behind the engine sprocket 93 on an axis parallel to frame arm 68R and is linked thereto by an engine chain 110, as seen in FIG. 23. Engine chain 110 has the same pitch as the engine and drive sprockets. The transfer sprocket 99 is disposed either to the left or right of the drive 98 sprocket on jackshaft 97, depending on the powerplant being used and the placement of the engine sprocket thereon. In the present invention with the preferred engine, the transfer sprocket is disposed on the left side of the drive sprocket. The position of transfer sprocket 99 on the jackshaft is in line distally with rear drive sprocket 70, and the two sprockets are linked together by rear wheel chain 111. The jack shaft with the engine and transfer sprockets mounted thereon is freely rotatable within shaft bearings 100a and 100b. The drive sprocket 98 cannot be so large as to allow the corresponding engine chain 110 to come in contact with the jack body 96 behind it, or the rear footplate 85, which is disposed above it. As shown in FIG. 27, the outside shoulders of transfer sprocket 99 and sprocket hub 105 abut the inside surfaces of the shaft bearings 100a and 100b, restricting lateral, or left and right directional movements of the jack shaft, engine sprocket and transfer sprocket within those bearings.

The engine chain 110 may be tightened or loosened by adjusting the position of the jack shaft assembly forward or aft in relation to the engine sprocket. As seen in FIGS. 27 and 28, a threaded engine chain adjuster rod 112 extends axially through an anchor hole 113 in sway bar 81 and fits into a threaded hole in an anchor stud 114, which is integrally secured by a fastener 115 to the right inner sidewall of jack body 103. A pair of adjuster nuts 116 disposed on opposite sides of sway arm 81 turn clockwise or counterclockwise on adjuster rod 112 to lengthen or shorten the longitudinal distance between the sway arm and the jack shaft assembly, thus changing the distance between engine sprocket 93 and drive sprocket 70. The jackshaft assembly can move forward and aft along its mounting surface on frame arm 68R within the parameters set by jack plate mounting slots 109. When chain adjuster rod 112 has tightened the engine chain to the desired tension, jackshaft mounting bolts 107 and locknuts 1070 can be duly tightened.

Referring again to FIG. 23, a plastic or metal fuel tank 117 is located in the rear frame section 10c, interposed between frame arm 68L and jackshaft assembly 96, and underneath the rear footplate. Fuel tank 117 is mounted on footplate riser 86L by threaded bolts 118 which extend axially through holes in the riser and the corresponding mounting holes located in the web of fuel tank 117. Locknuts 1180 secure the fuel tank in place. A fuel line 119 extends up from a sealed hole in the top of the fuel tank and connects to the engine carburetor.

Figure 31:
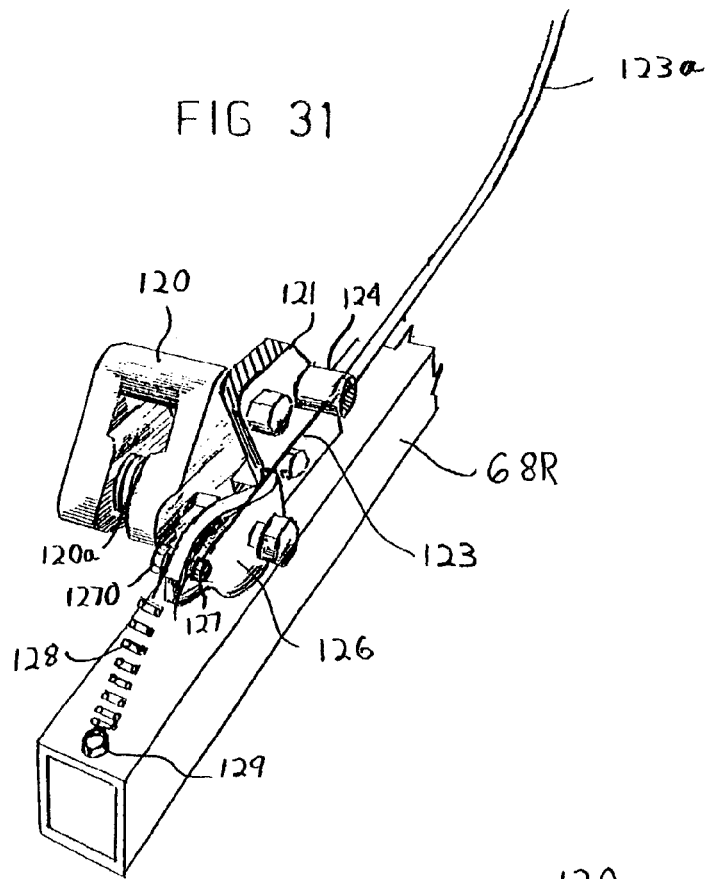
FIG. 31 is a perspective view of the rear disc brake showing the operational components therein.
Figure 30:
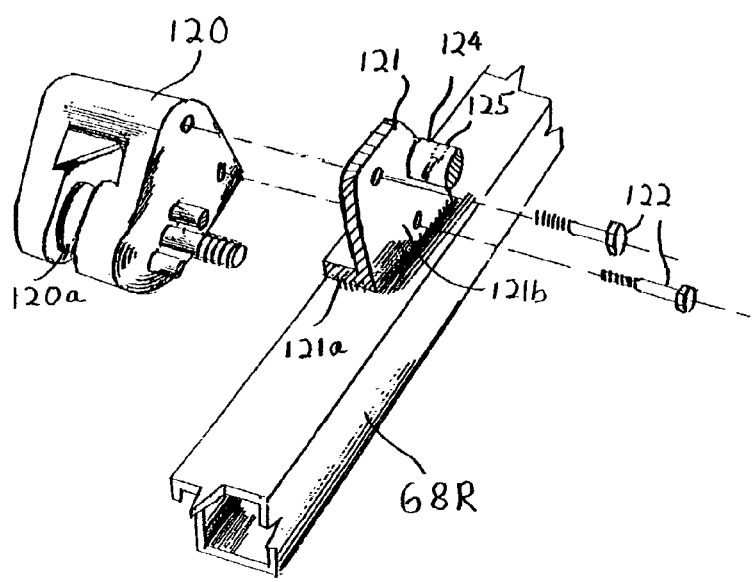
FIG. 30 is a semi-exploded perspective view of the rear disc brake and mounting bracket.

A universal disc brake unit 120 is affixed to a brake bracket 121, which is in turn secured by fastener or weld to the top surface of the rear portion of frame arm 68R, adjacent to brake disc 71, as shown in FIGS. 23, 30 and 31. A lower flange 121a on brake bracket 121 abuts the top of the frame arm, and an upstanding flange 121b is oriented on a vertical plane that is parallel with brake disc 71. The body or housing of the disc brake unit is affixed to the inside surface of upstanding flange 121b by threaded brake mounting bolts 122 that extend axially through holes in brake bracket 121 and thread into corresponding holes in disc brake unit 120, as shown in FIG. 30. Inherent in the body of the disc brake unit are protruding jaw elements which are positioned on each side of the brake disc. Located on the inner surfaces of the jaw elements are brake pads 120a, which interengage the brake disc during slowing and stopping maneuvers of the conveyance. The disc brake unit 120 is activated by a sheathed brake cable 123. A short cylindrical brake cable stop 124 is secured to the outside surface of brake bracket 121 by fastener or weld. As shown additionally on FIG. 31, a piloted cable hole 125 bored transversely through cable stop 124 receives and abuts a brake cable sheathing 123a that surrounds brake cable 123, but allows the cable itself to extend axially through to a brake lever 126 on disc brake unit 120, where it is secured thereon with a cable lock bolt 127 and nut 1270. A hole in cable lock bolt 127 receives both the aft end of the brake cable and the forward end of a brake spring 128, which in turn extends a short distance rearward and connects to the aft end of frame arm 68R by a spring anchor screw 129.

FIGS. 23, 32a and 32b show throttle control elements of the sport conveyance. In the preferred motorized embodiment of the invention, a throttle 'trigger' pin 130 is connected distally from the throttle linkage located on the inside of engine 88. Generally, this trigger pin is located on the aft end of the engine, just above the top surface of rear footplate 85. A throttle trigger bracket 131 is disposed behind and to the right side of throttle pin 130 and on top of the forward portion of footplate 85. Throttle bracket 131 is a short section of metal channel with a wider base flange and narrower sidewalls, and a left cut-away section that matches the curvature of the right rear side of the engine casing, as seen in FIG. 32a. A steel throttle shaft 132 extends axially through matching holes in the apposing sidewalls of throttle bracket 131 and is rotatably mounted therein. The left and right ends of throttle shaft 132 extend well beyond the outside surfaces of the sidewalls of throttle bracket 131, leaving enough room for throttle paddles 133L and 133R to be integrally welded thereon. Throttle bracket 131 is affixed to footplate 85 in a position wherein the throttle shaft 132 is oriented perpendicular to the longitudinal axis of the conveyance. Throttle bracket screws 134 extend axially through mounting holes in the throttle bracket and adjacent threaded holes in the rear footplate, securing bracket 131 in place.

As shown in FIG. 32a, throttle paddles 131L and 131R are disposed on their respective ends of throttle shaft 132 in the same relative plane. A trigger hole bored in the middle of throttle paddle 133L receives the throttle trigger pin 130, and a similar hole in paddle 133R receives the aft end of throttle cable 135. A throttle cable stop 136 similar to brake cable stop 124 is secured by weld or fastener to the forward portion of the right sidewall of throttle bracket 131. A piloted hole 137 bored transversely through throttle cable stop 136 receives and abuts a throttle cable sheathing 135a that surrounds the throttle cable but allows the cable itself to extend axially through to a hole in throttle paddle 133R. Throttle cable 135 passes through the center of a throttle spring 138 that is interposed between cable stop 136 and throttle paddle 133R. A universal cable end 139 is affixed to throttle cable on the aft side of throttle paddle 133R.

Figure 34:
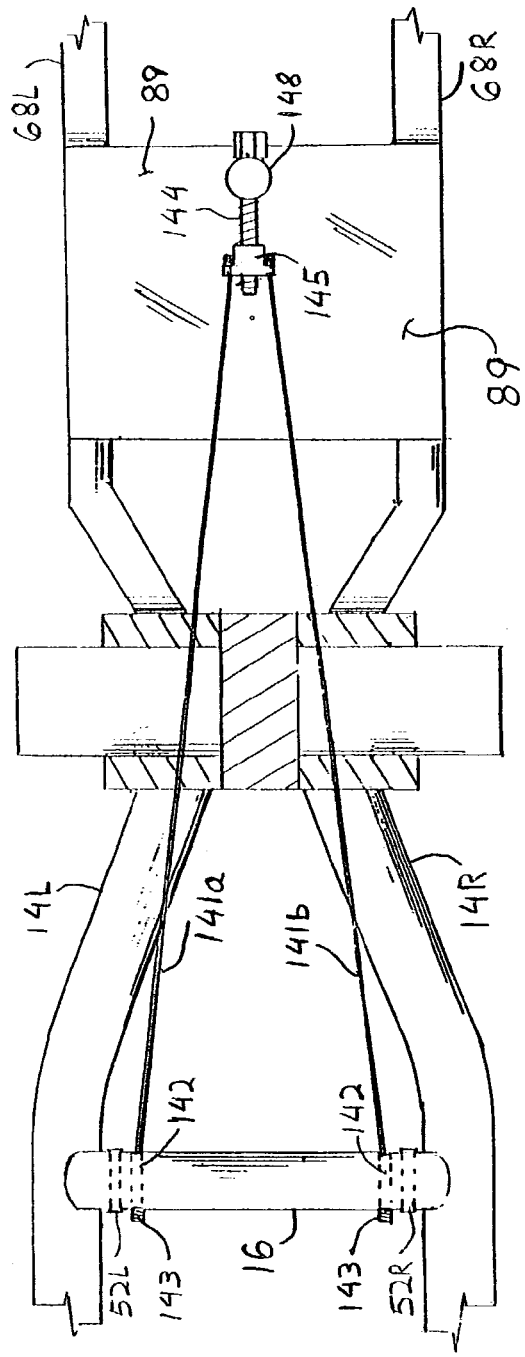
FIG. 34 is a bottom plan view of the truss system as viewed generally from line 34—34 of FIG. 33
Figure 33:
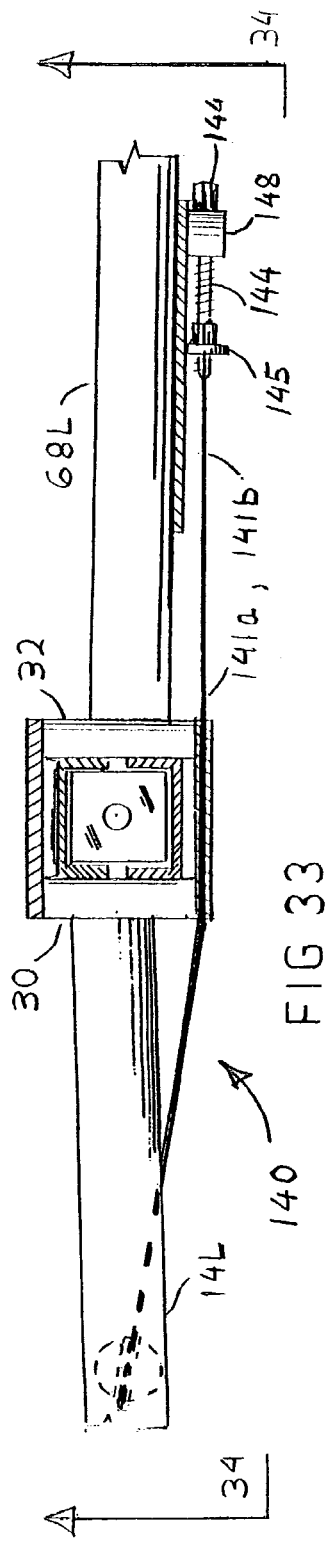
FIG. 33 is a partial side elevation showing the truss support system for the sport conveyance.

Underneath the chassis of the sport conveyance is disposed an adjustable truss support assembly 140, as shown in FIGS. 33–35. A pair of steel truss cables 141a and 141b are interposed between the fork brace 16 on front fork section 10a and the engine mounting plate 89 on rear frame section 10c, and are engaged at their approximate centers by the lower edges of connecter plates 30 and 32 of center strut section 10b. Two forward anchor holes 142 are located adjacent to control line guide tubes 52 in fork brace 16. Forward truss cable ferrules 143 anchor truss cables 141a and 141b on the forward side of fork brace 16. From there, each truss cable extends rearward at an angle that allows them to intersect at their aft ends, whereon they are affixed to a threaded truss line adjuster bolt 144 by way of a flanged anchor nut 145, as seen most clearly in FIG. 35. Two anchor nut holes 146 located on opposite sides of the anchor nut flange 145a on anchor nut 145 each receive the aft ends truss cables 141. Rear truss cable ferrules 147 anchor each truss cable aft of anchor nut flange 145a. An adjuster bolt anchor stub 148 is integrally secured by weld to the bottom surface of engine mounting plate 89. FIG. 35 illustrates how the truss line adjuster bolt 144 extends axially forward through an adjuster hole 149 in anchor stud 148 and threads into anchor nut 145, which can then be turned to effectively close the gap between anchor stub 148 and anchor nut 145 and pull taut truss lines 141a and 141b.

FIGS. 1–3 and 36–38 show the foot gripping or binding components for the sport conveyance. A front footgrip assembly 150a is disposed on the top surface of front footplate 17, and a diametrically opposite footgrip assembly 150b is disposed on the top surface of rear footplate 85. On footgrip assembly 150a, a grip support bracket 151a has a mountable base flange and an upstanding grip support riser. Similarly, footgrip assembly 150r (rear) has a diametrically opposite grip support bracket 151b. Grip support brackets 151a and 151b are generally constructed from extruded or formed aluminum angle, but alternatively, may be made from fiberglass, plastic, or composite and molded to form. The support riser portions of the grip support brackets extend near vertically upward on an axis that is generally perpendicular to the ground, but slightly less than perpendicular to the planar surfaces of the front and rear footplates, as seen in FIG. 2. The front and rear footgrip assemblies are disposed on their respective footplates in an opposing fashion wherein their lower base mounting flanges face away from each other. As the peripheral edges of the support risers extend upward they also slope inward towards the rider of the conveyance, as indicated by a phantom line in FIG. 37. With a common 'left side' mounting of the conveyance, the support risers slope towards the left. (In a less common right side mounting, the roles of the footgrip assemblies would be reversed, wherein footgrip assembly 150a would become footgrip assembly 150b, and visa versa, and the support risers would slope to the right of the conveyance). Generally the angle of slope for the support risers is less than 20 degrees off the vertical axis as struck from the plane of the corresponding footplate.

Figure 36:
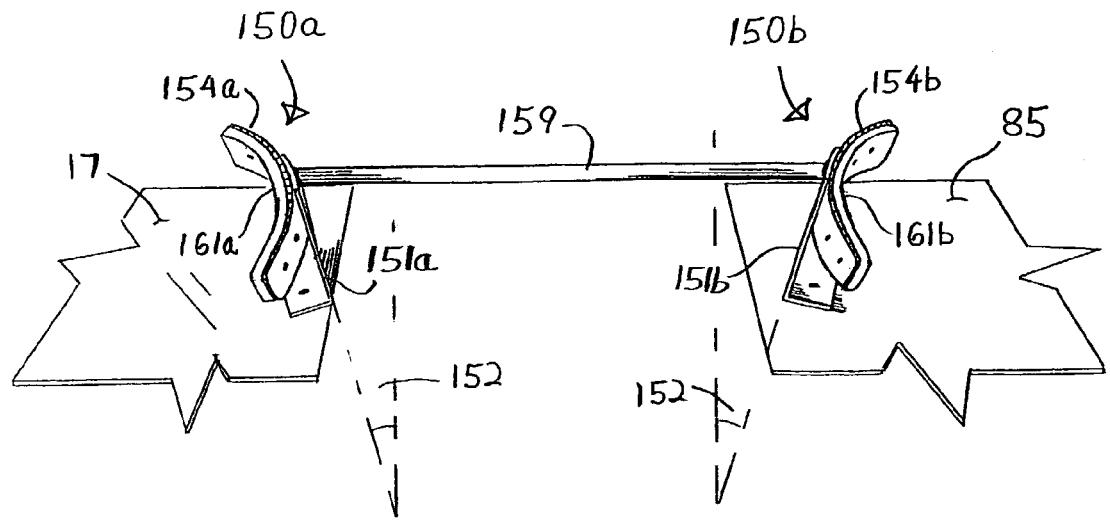
FIG. 36 is a perspective side elevation showing the foot-gripping system of the sport conveyance.
Figure 37:
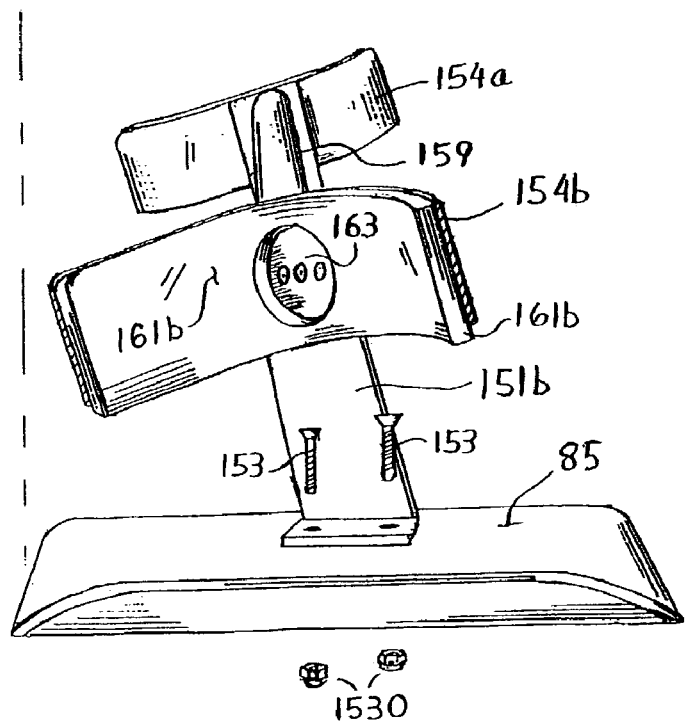
FIG. 37 is a rear cross-sectional view of the foot gripping components taken generally from line 37—37 of FIG. 3, and rotated 90 degrees clockwise.

The mounting positions of the footgrip assemblies on their respective footplates also have an angle 152, as indicated by phantom lines in FIG. 36. This orients the portions of the base flanges of support brackets 151a and 151b that are nearest to the rider closer to each other along the longitudinal axis of the conveyance than their opposite sides. This offset angle 152 is generally less than 20 degrees. The base flanges of brackets 151a and 151b are affixed to their corresponding footplates by footgrip anchor screws 153, which extend axially through adjacent holes in the base flanges and their respective footplates, and are secured thereon by locknuts 1530, as shown in FIG. 37. Semicircular grip bands 154a and 154b are attached transversely across the top portions of the vertical risers of support brackets 151a and 151b in an orientation that is perpendicular to slope illustrated in FIG. 37. The radial arc incumbent in each grip band is generally twice the radius of the lower ankle of a rider's leg. Grip bands 154 are preferably constructed from aluminum or metal strips that are machine rolled to contour, but alternatively, the grip bands may be made from fiberglass, plastic, or composite and molded to form.

Figure 38:
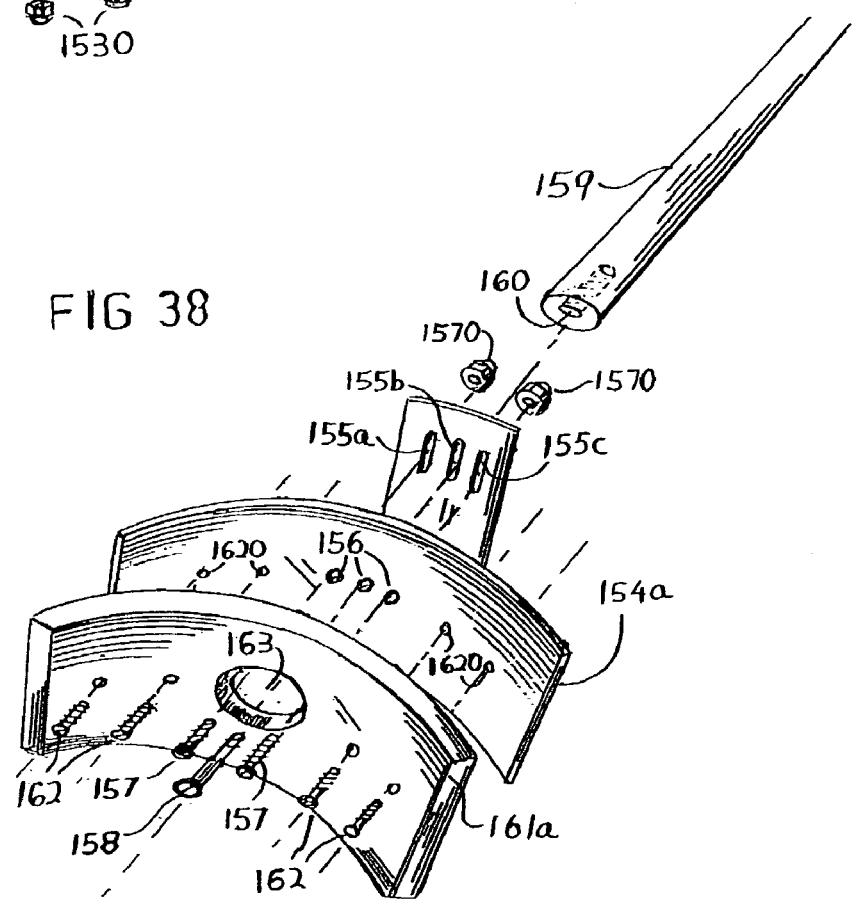
FIG. 38 is an enlarged exploded view showing one of the diametrically opposite footgrip elements.

The upper portions of the vertical riser elements of support brackets 151 are each embodied with a lateral concave surface that corresponds to the convex surfaces of its respective grip band. As shown in FIG. 38, three vertical mounting slots 155a, 155b and 155c are located in the top portion of each support riser, and three corresponding mounting holes 156 are located in the center portions of each grip band. Grip band screw fasteners 157 extend through the two outside mounting holes 156 and mounting slots 155a and 155c, affixing apposing grip bands 154a and 154b to their respective support risers in an orientation that has their contoured surfaces curving away from each other. On each footgrip assembly, two grip band lock nuts 1570 thread onto the two outside fasteners, securing the grip band in place. The middle screw fasteners 158 project through the center hole of each grip band and their adjacent middle support riser slots 155b and thread into the opposite ends of a support handle shaft 159, which is interposed between the upper portions of the opposing support risers. Handle shaft 159 is preferably a metal or plastic rod with a length that corresponds to the distance between the opposing support risers. The ends of handle shaft 159 are beveled at an angle that corresponds to offset mounting angle 152 shown on FIG. 36. Threaded handle shaft mounting holes 160 are located on the opposite ends of the handle shaft. The apposing middle screw fasteners 158 secure the shaft handle in place while simultaneously helping to affix the opposing grip bands to their respective support brackets.

Foot engagement pads 161a and 161b are attached to the inner concaved surfaces of their respective grip bands 154a and 154b, providing a layer of cushion between a riders feet and the portions of the grip bands that engage them. Foot pads 161a and 161b are generally flat rubber or neoprene sheets that are affixed to their respective grip bands by threaded footpad fastener screws 162 which extend axially through holes in footpads 161 and screw into adjacent threaded holes 1540 located in grip bands 154. The peripheries of the mounted foot pads are generally equal to the peripheries of their corresponding grip bands, with the exception of a foot pad access hole 163 bored in the center of each foot pad. Foot pad holes 163 provide access to the fastener screws that secure the grip bands to the support risers.

Figure 39:
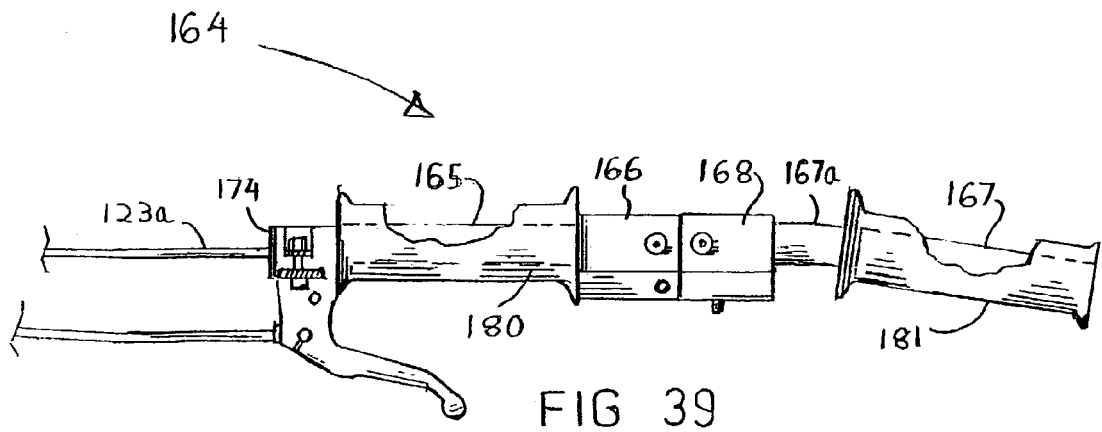
FIG. 39 is a semi broken away plan view showing the control baton for the sport conveyance and the throttle and brake handle located therein.
Figure 40:
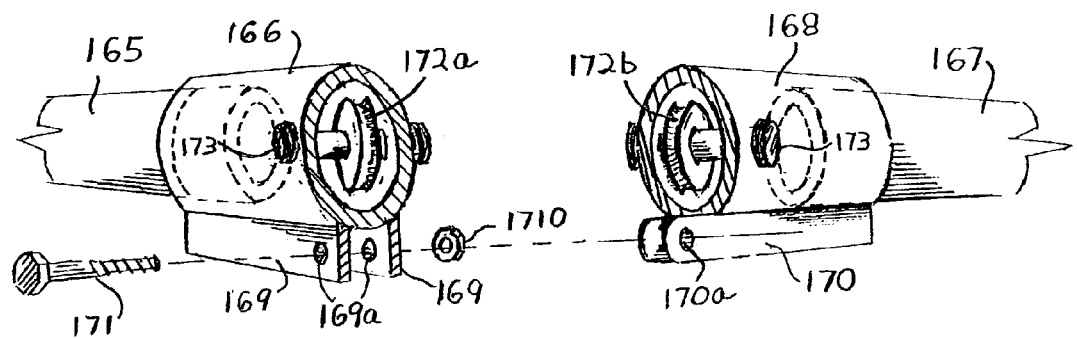
FIG. 40 is a perspective view showing the center portion of the control baton.

Referring now to FIGS. 39–43, a control baton 164 is disclosed. A longer and narrower tubular throttle handle 165 extends axially into a shorter and wider throttle handle end housing 166, and is affixed or bonded therein. Similarly, a brake handle 167 extends axially into a brake handle end housing 168 and is affixed therein. The widths of the throttle handle 165 and brake handle 167 are of equal diameter, as are handle end housings 166 and 168, which are then abutted together in the center portion of the control baton, as shown in FIG. 39. A pair of parallel hinge flanges 169, shown in FIG. 40, are disposed longitudinally along the lower portion of handle housing 166. The ends of hinge flanges 169 are generally flush with the abutting end of handle housing 166. The width of the space between hinge flanges 169 is equal to the width of a hinge arm 170, which is disposed longitudinally on the opposing lower end portion of brake handle housing 168. Generally, the heretofore mentioned handle, housing, and hinge components of the control baton are made from similar metal alloys, wherein hinge flanges 169 and hinge arm 170 are secured to their respective handle housings by weld. Alternatively, the throttle handle and brake handle with their respective housing and hinge components may be die-cast or injection molded as complete units. The hinge arm 170 extends a short distance into the space between hinge flanges 169, and is rotatably mounted therein by a threaded baton hinge pin 171 that extends axially through adjacent holes 169a bored in hinge flanges 169 and hole 170a in hinge arm 170, thus rotatably connecting the throttle handle to the brake handle. A locknut 1710 threads on to the hinge pin, securing it in place. The brake handle is downwardly pivotable relative to the throttle handle around hinge pin 171 in a unidirectional plane through a maximum rotation of 120 degrees, as illustrated in by phantom in FIG. 41. Preferably, the end portion of brake handle 167 has a small degree of downward bend, indicated at point 167a, that is biased to its rotational plane.

Figure 42:
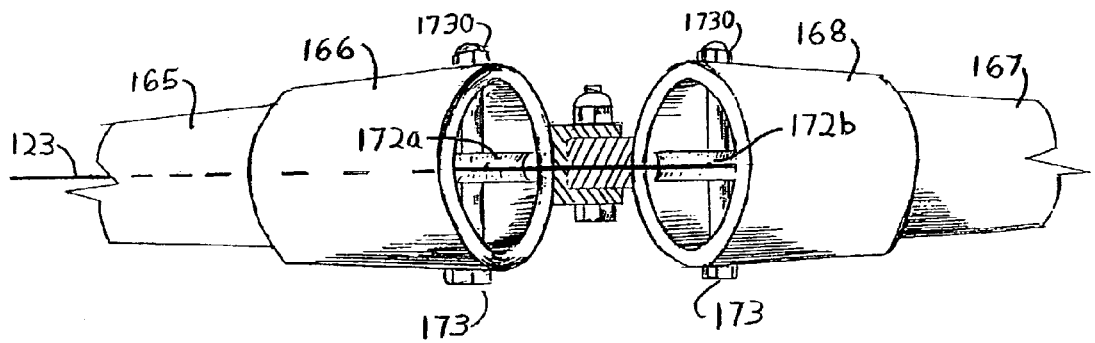
FIG. 42 is a cross-sectional view taken generally along line 42—42 of FIG. 41

Referring now to FIGS. 40 and 42, brake cable bushings 172a and 172b are rotatably mounted on the insides of housings 166 and 168, respectively, in orientations that are also in line with the rotational plane of the brake handle. Bushing mount pins 173 extend axially through holes bored in the opposing walls of housings 166 and 168 and the centers of brake cable bushings 172a and 172b. The threaded ends of brake bushing pins 173 receive bushing pin locknuts 173o, securing the bushing pins in place. Each brake cable bushing 172 has a concave or grooved element wherein can nest brake cable 123, and an outside diameter that is slightly less than the inside diameter of the handle end housings, whose inside walls keep the cable bushings centrally located on bushing pins 173. After extending outward and upward from its point of connection at disc brake 120 on the rear frame section of the sport conveyance, the brake cable 123 and sheathing 123a eventually reach a cable stop 174, located on the end of throttle handle 165, as seen most clearly in FIG. 43. A piloted hole 175 therein receives and abuts brake cable sheathing 123a, but allows the brake cable 123 to pass through, wherein it extends through the center of throttle handle 165 to cable bushings 172a and 172b, as shown most clearly in FIG. 41. As it continues, the brake cable contacts and rides the top concave surface element of cable bushing 172a, then crosses over to the top surface of cable bushing 172b. The brake cable then circles around and down the backside of cable bushing 172b, where it exits through a brake line anchor hole 176, which is located in brake hinge arm 170 on handle housing 168. A cable end or ferrule 177 is integrally secured to the end of the brake cable.

As the brake handle is forcefully rotated downward, the brake cable is pulled along the upper surfaces of the cable bushings, resulting in a displacement of the brake cable within sheathing 123a, forcing the other end of the brake cable, which is connected to brake lever 126 of disc brake 120, to be pulled inward accordingly, which in turn engages brake pads 1200 to brake disc 71. When the angle of pivot of the brake handle approaches 90 degrees, the corresponding movement of brake lever 126 is preferably enough to fully engage the disc brake. When the pivoting force is released, the brake spring 128 pulls the brake arm and the connected brake cable to its original position, which in turn rotates the brake handle back to a non-pivoted orientation.

A universal throttle mount 178 and lever 179 are disposed on the end portion of throttle handle 165, secured in place by mount bolt 178a and locknut 178oa. The throttle cable 135 extends outward and upward from its point of attachment at throttle paddle 133r, located on throttle bracket 131, eventually reaching the throttle mount 178 and lever 179 on control baton 164. Both the throttle cable and the control cable are of a long enough length to allow the control baton to be held at a substantial distance from the sport conveyance, as shown in FIG. 1. Generally, the sheathings of the brake cable and throttle cable are harnessed or taped together at intermittent points between the chassis of the conveyance and the control baton. A hand grip 180 is disposed on the throttle handle between housing 166 and universal throttle mount 178, and a hand grip 181 is disposed on the curved end of the brake handle.

Operation of the Invention

Figure 46:
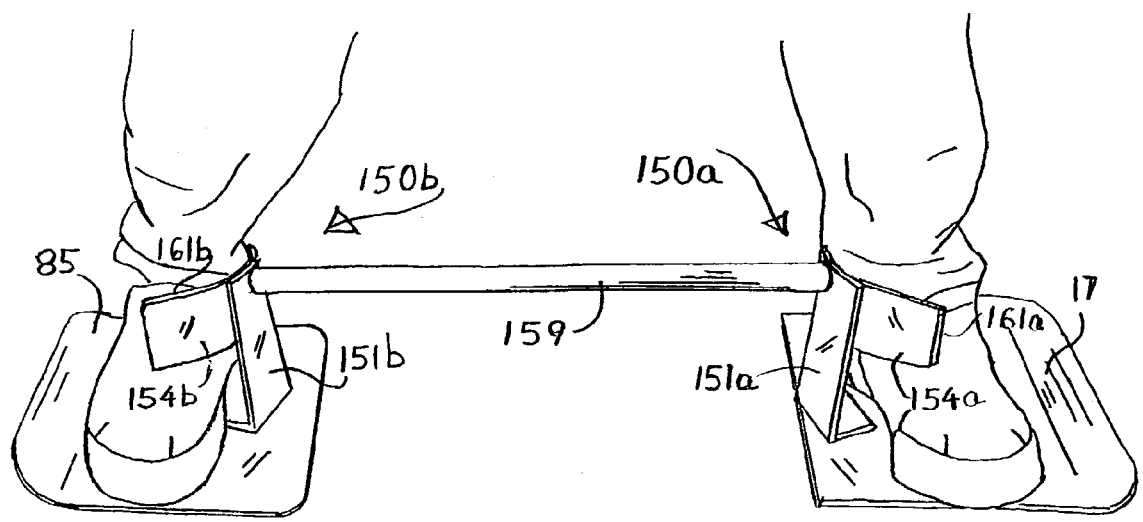
FIG. 46 is an elevational view showing the preferred method in which a rider's feet can interengage the footgrips of the conveyance.

To mount the conveyance, a rider must simply stand on the portions of footplates 17 and 85 that are outside of and adjacent to opposing footgrip assemblies 150a and 150b. Due to the slight outward and upward slope of both footplates, there is a natural inclination for the riders feet to inch downward towards each other until such point they come to rest against foot grip assemblies 150a and 150b, as shown in FIG. 46. The slight angle of outward lean inherent in grip brackets 151a and 151b coupled with the slope of their respective footplates forces the point of contact to occur between the lower portions of foot engagement pads 161 and the inside upper portions of the riders feet. The contour of grip bands 154a and 154b loosely resemble the inside contours of a rider's ankles and wrap a short distance around the tops of the rider's shoes. For optimum fitting, the rider's feet should simultaneously be in contact with the footplates and the foot engagement pads. Varying shoe sizes can be accommodated by adjusting the height of gripbands 154a and 154b relative to the footplates. As shown in FIG. 38, by loosening screw fasteners 157 and 158, the gripbands can be raised and lowered along brackets 151, utilizing slots 155, until the desired fit is achieved.

Although the prior art shows only 'static' gripping or binding conditions wherein a rider's feet are more or less 'pinned' on a given deck, the 'dynamic' gripping embodiment disclosed in the present invention requires the rider to put forth a small but constant force to achieve a binding effect. An inward pressure is applied to the opposing grip assemblies by the rider squeezing his or her legs and feet inward, and using that force to 'pinch' the grips between them. This vice type effect is analogous to using a thumb and finger to pick up a small object. When a quick dismount suddenly becomes necessary, the rider need only relax that pressure to render the binding effect dormant.

After repeatedly applying inward pressure to each opposing grip assembly, they may eventually start bending inward, partially negating the gripping effect. The grip support rod 159 interposed between them prevents that possibility, as the force then becomes isometric. Grip rod 159 is generally centered on both the longitudinal and lateral axes of the conveyance, making it a well balanced handle. With it, the conveyance can be easily picked up and carried. Additionally, because the span between the grip assemblies is generally where the powerplant is located, the grip rod acts as a protective roll bar therein.

Figure 48:
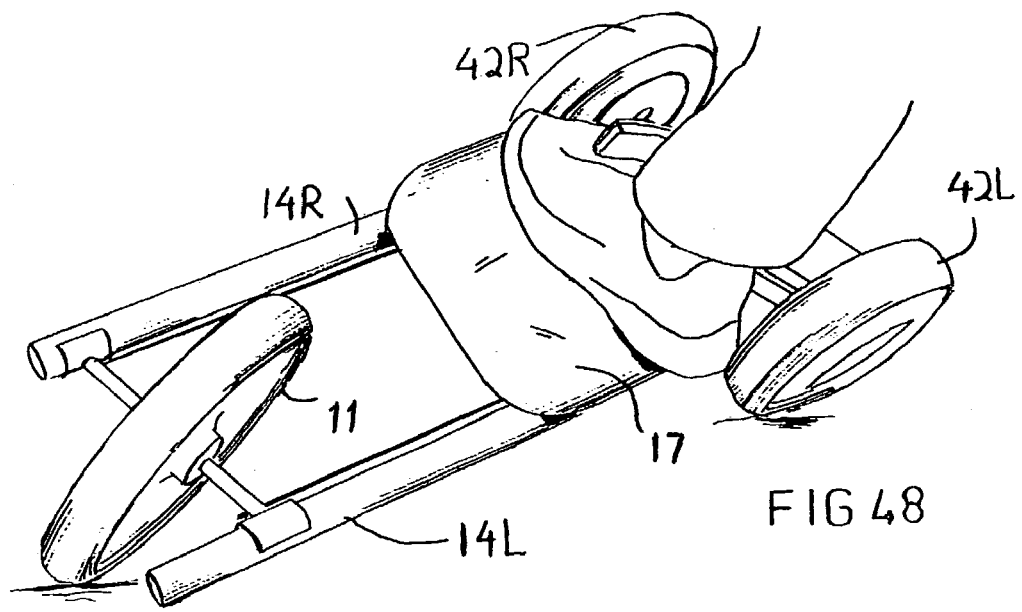
FIG. 48 is a top perspective view showing the front section of the conveyance as the rider leans it into a left turn.
Figure 47:
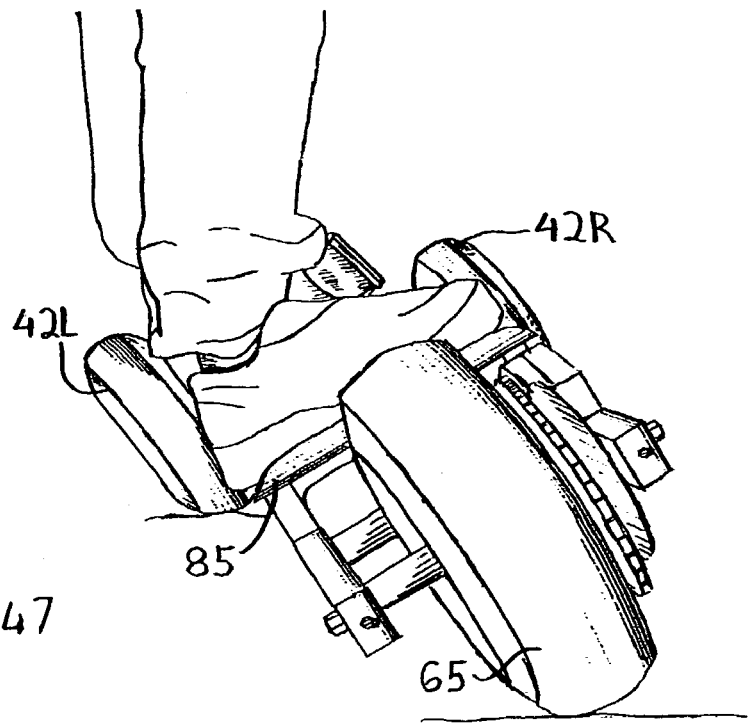
FIG. 47 is a rear elevational view of the sport conveyance as the rider leans it into a left turn.

Steering and control of the sport conveyance is achieved by the rider shifting his or her weight, or leaning to and fro in a manner that causes the conveyance to tilt accordingly. The rider in FIG. 47 is tilting the board left. As this happens, the weight of the rider forces the left support wheel 42L and the strut assembly 36L it's connected to to swing upward in a manner best shown and described in FIG. 21. The resulting effect is shown in FIG. 48, wherein left control line 50L has done its job and pulled inward the left side of front axle 12, thereby pitching the front wheel, and therefore the whole sport conveyance, into a left turn vector. Referring again to FIG. 47, it can be seen that while left support wheel 42L has swung upward relative to the planar surface of the conveyance (or put another way, the planar surface of the conveyance has tilted downward relative to the left support wheel), it has maintained the same angle of lean as rear wheel 65 and, though not shown in this view, front wheel 11. Although the present invention has four wheels, it's cornering characteristics and abilities are actually more similar to those of a two-wheeled bicycle or motorcycle, where only the front wheel both leans and turns, and the in-line rear wheel just leans. During this left turn maneuver on the present conveyance, the right support wheel 42R has become inconsequential, and in fact has lifted off the ground altogether. This in essence creates a three-wheeled vehicle wherein the front wheel leans and turns, and the other somewhat in-line side and rear wheels only lean. However, unlike the traditional two-wheeled vehicle that has a tendency to 'wash out' around corners, or have the wheels go out from under it, leaning into the 'third' wheel 42L of the present invention creates a gravitational pressure that, besides activating the left turn, simultaneously adds another leg of traction that all but prevents the conveyance from washing out. Of course, during right-hand turns, the roles of the support wheels are reversed, wherein right support wheel 42R is leaned on and activates the turn, and left support wheel 42L becomes inconsequential.

Figures 5A, 5B:
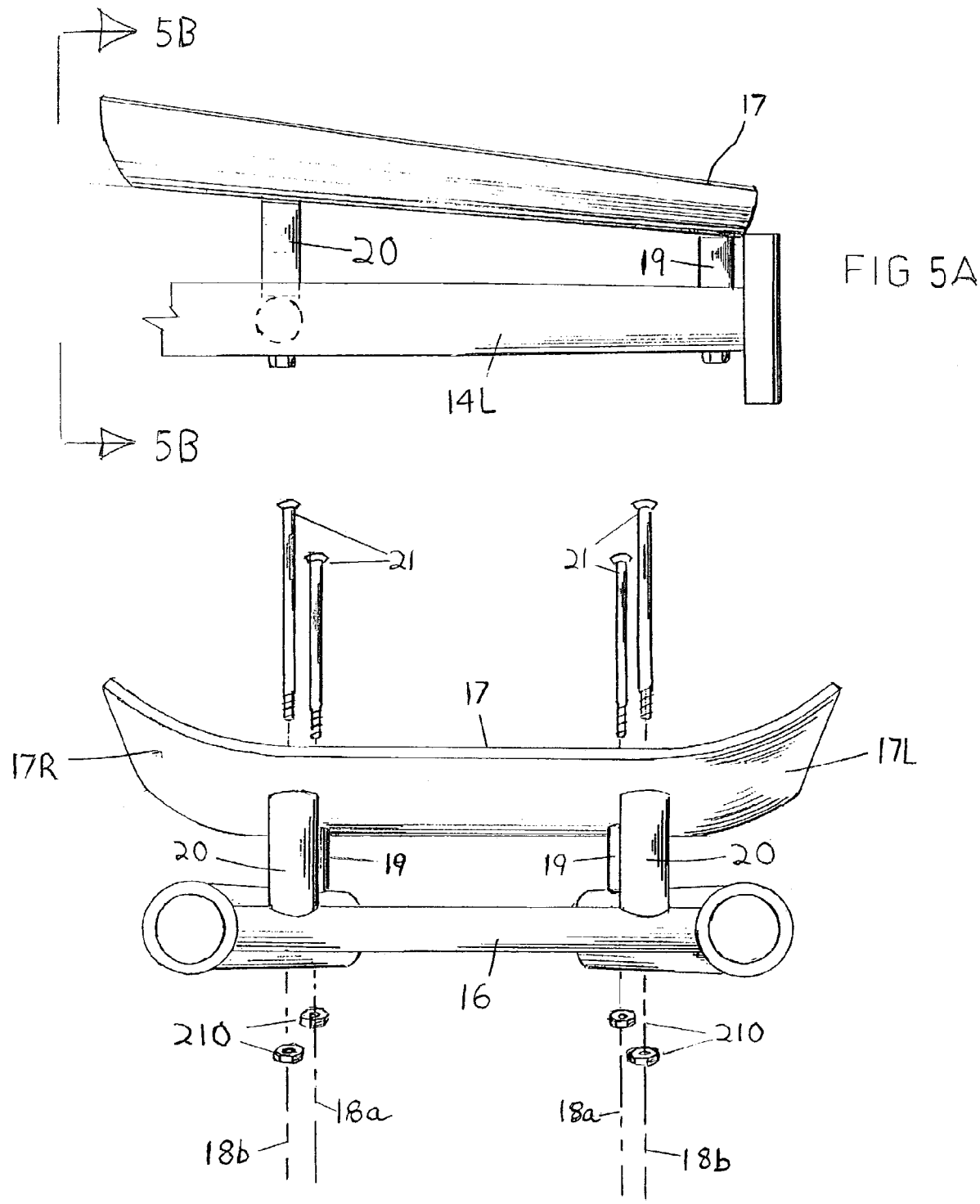

To amplify the gravitational leaning and turning force that the rider can exert on the support wheels, footplate spacers 19 and 20 lift the front footplate 17 to a slightly higher elevation relative to the longitudinal center of gravity of the conveyance, as shown in FIGS. 5a and 5b. Contoured risers 17L and 17R on the side edges of the footplate give the rider added leaning control. The rear footplate 85 is elevated by riser blocks 86L and 86R, as seen most clearly in FIG. 24.

The present invention utilizes a unique 'diamond' shaped footprint that allows it rapidly alternate between a nearly in-line three wheeler and a stable four wheeler. Cornering maneuvers mentioned above pitch the board into three wheeled attitudes. However, because riders generally go straight more than they turn, the conveyance spends a majority of it's time being rode in a four wheel fashion, where the support wheels and corresponding strut assemblies are independently juxtaposed in response to the type of terrain and the lean of a rider. As a rider makes countless lean adjustments during the course of a ride, control cables 50L and 50R are constantly pulled and relaxed as their respective strut assemblies swing up and down, as shown in FIGS. 18–22. Correspondingly, step-cut ends 12L and 12R of front axle 12 are constantly changing their location as they float within their respective axle slots 13, seen additionally in FIGS. 7a–7c During riding situations, both support wheels will often swing up together in unison, as when the steering control linkage and the strut assemblies are working to absorb shocks. As the sport conveyance travels forward over bumps in the road, the upcoming obstructions first come in contact with front wheel 11. Because of the craft's forward momentum, the axle components of the front wheel absorb some of the contact shock as they act against fork springs 25, and slide rearward in slots 13L and 13R, in a manner similar to a horizontal pogo stick. Because the inherent pressure on both control lines is simultaneously released, the strut assemblies are prone to swing upward to take up the slack, as illustrated in FIG. 22. This upward positioning of the strut assemblies primes their connected support wheels 42L and 42R to receive the same oncoming bump that henceforth has traveled past the front wheel. By the time the bump contacts the rear wheel, it's jolt effect is greatly reduced.

While performing airborne maneuvers, the present invention is again more closely related to a more agile two wheeled craft. Generally, when landing a jump, it is much easier to successfully plant two wheels that are in-line than it is to coordinate a landing of four wheels that are spread out in a rectangular footprint. Although the present conveyance does employ four wheels, it's inherent diamond shaped footprint, wherein there is a single rear wheel, a single front wheel and two parallel side wheels, allows a more stable, controllable and correctable landing. The handling and control of the sport conveyance, both on the ground and in the air, is also aided by the fact that a high percentage of its mass, or weight, is located in the center section. Both the left and right strut wheel assemblies are located between the rider's feet, as is the engine and most of the jackshaft assembly.

The sensitivity of the turning mechanism for the present invention can be adjusted to suit the varying weights and skill levels of different riders. By repositioning fork spring adjuster pins 26, best shown in FIGS. 9 and 10, into different adjuster notches 27a along slots 27, the tension on their respective fork springs that abut can be increased or decreased. This in turn affects the amount of pressure imposed on the floating front axle, which then dictates the ease in which the strut assemblies can swing upward. A lighter or more skilled rider may choose to move the adjuster pins rearward, lessening the spring tension and softening the steering, making it more responsive. Conversely, a heavier, or less experienced rider would generally choose a greater spring tension, preventing the conveyance from being overly responsive.

The strength and integrity of the overall chassis is aided and maintained by the truss support system 140. After repeated ridings, the center portion of the conveyance may eventually start to sag. As shown in FIGS. 33 and 34, two truss cables 141a and 141b pull taut from their attachment points on the front and rear portions of the frame. As they pass under connecter plates 30 and 32, a gap is created that presents a type of 'string and bow' effect between the truss cables and the main frame. To counteract any possible sagging in the mid section of frame, the truss line adjuster bolt 144, best shown in FIG. 35, can periodically be turned clockwise, further tightening the truss lines and raising the center portion of the conveyance. Generally, the correct tautness of truss lines 141a and 141b is achieved if, with a rider mounted, the conveyance is able to rest on a hard level surface and keep all four wheels in equal contact with the ground. As in the case of spring tensioner pins 26, the truss line adjuster bolt can also be used to 'tune' the conveyance, or adjust the chassis to fit a wide range of rider weights.

Figure 44:
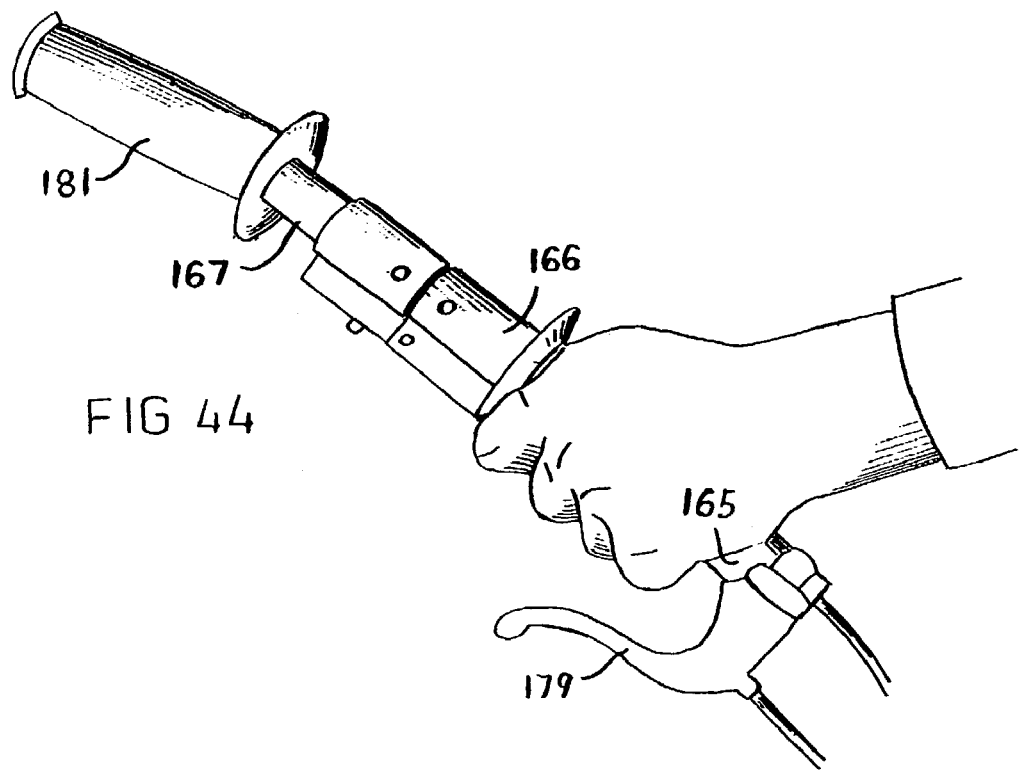
FIG. 44 is an enlarged view showing the preferred one-handed method of gripping and holding the control baton.
Figure 45:
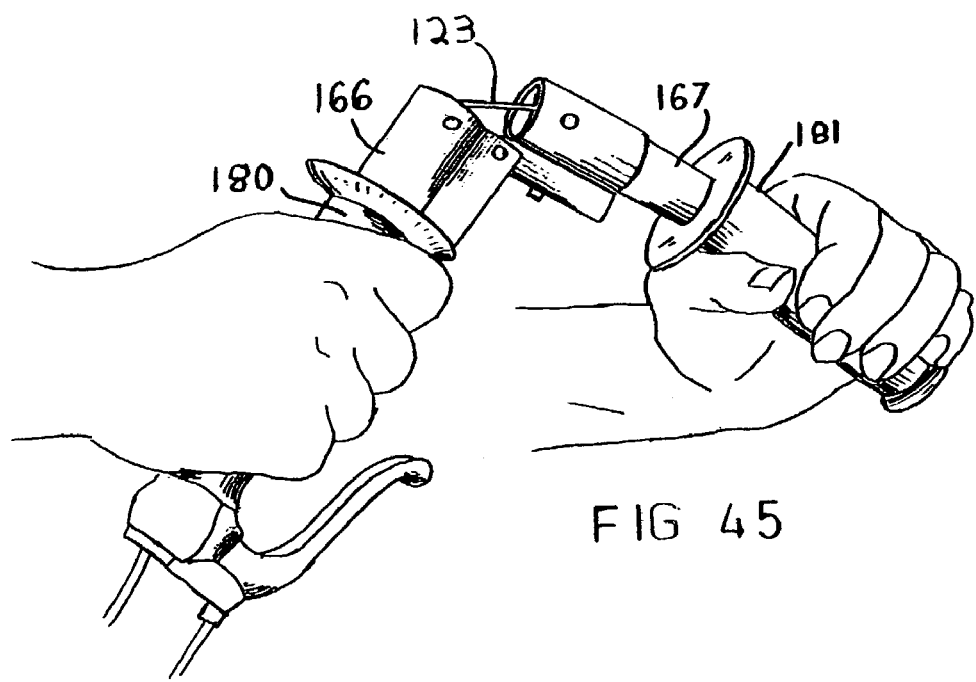
FIG. 45 is an enlarged view showing the preferred two-handed method of gripping and holding the control baton during braking maneuvers.

Conventionally, these types of boards have used a braking device wherein a small brake lever is mounted on some kind of shaft, and gripped and squeezed inward with a rider's fingers and hand. Due to the higher speeds and more aggressive riding styles perpetuated by the present conveyance, an equally aggressive braking method is employed. Through use of the control baton 164, shown in FIGS. 41–45, a rider is able to simultaneously use both hands and both arms to create and send a much higher amount of braking pressure to the braking device on the wheel. Generally, when accelerating or coasting on the sport conveyance, the control baton is held in one hand, as shown in FIG. 44. A rider grasps the hand grip 180 on throttle handle 165, holding the baton at it's base and letting the brake handle portion extend outward in the air. As the need to stop or slow down the conveyance arises, the rider's free hand can reach out and grasp grip 181 on brake handle 167, and use the full strength of his or her arms, forearms, and hands to rotate the brake handle portion of the control baton downward relative to the throttle handle section, as illustrated in FIG. 45 The small downward bend 167a on brake handle 167 orients the handle 167 in the direction of rotation, allowing the rider to make quick reactive braking responses. In the preferred motorized embodiment of the sport conveyance, the throttle lever 179 is mounted at the base of the throttle handle. In an alternative non-motorized embodiment, the throttle, mount and cable would be removed.

Again, because of the diamond shaped footprint inherent in the present conveyance, both the braking and throttle components need only be applied to the singular rear wheel, helping to keep the center of gravity along the craft's longitudinal axis and avoiding the awkward and unbalanced linkages necessary to connect to a set of axially displaced rear wheels, as has been used in the prior art. As shown in FIGS. 23 and 24, the rear wheel chain 111 can be adjusted by moving the rear wheel 65 along slots 67L and 67R, using locknuts 770 to loosen or tighten wheel adjuster bolts 77, which are distally connected to the ends of rear axle 66. FIGS. 23 and 27–29 show how the tension of the engine chain can be adjusted. Jackshaft mounting bolts 107 are loosened to allow the Jackshaft assembly 96 to slide along jackplate slots 109, shown best in FIG. 29. FIG. 30 illustrates how engine chain adjuster rod 112, through the use of adjuster nuts 116, is able to mechanically adjust the jackshaft assembly along frame arm 68R When the desired engine chain tension is achieved, the jackshaft is secured into place by both locknuts 1070 and adjuster nuts 116. In the course of maintaining or adjusting the chains on the conveyance, the engine chain is always adjusted before the rear wheel chain. FIGS. 2 and 24 show how the contoured riser 85a located on the aft end of rear footplate 85 provides a slip resistant barrier that helps keep the rear foot of the rider from sliding off the end of the footplate and on to the rear wheel.

ALTERNATIVE EMBODIMENTS

Figure 49:
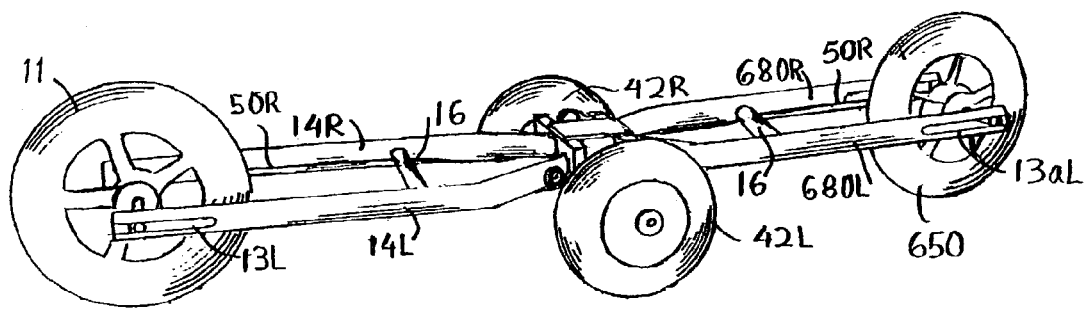
FIG. 49 is a perspective view showing an alternative non-motorized embodiment of the sport conveyance.
Figure 50:
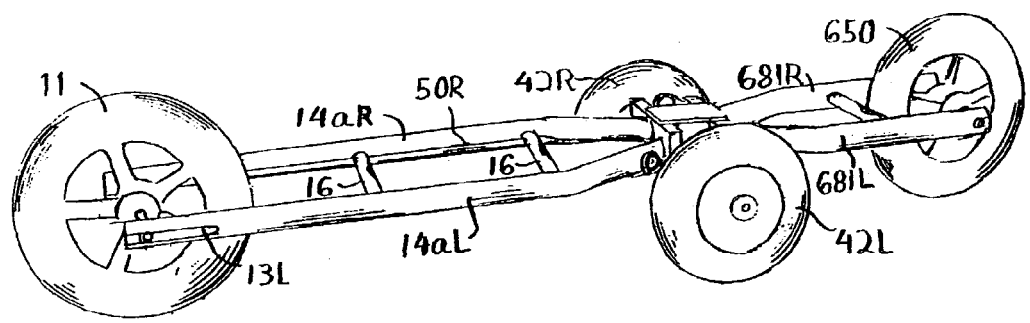
FIG. 50 is a perspective view showing an alternative non motorized embodiment wherein the two side support wheels are disposed in a more rearward location on the sport conveyance.
Figure 51:
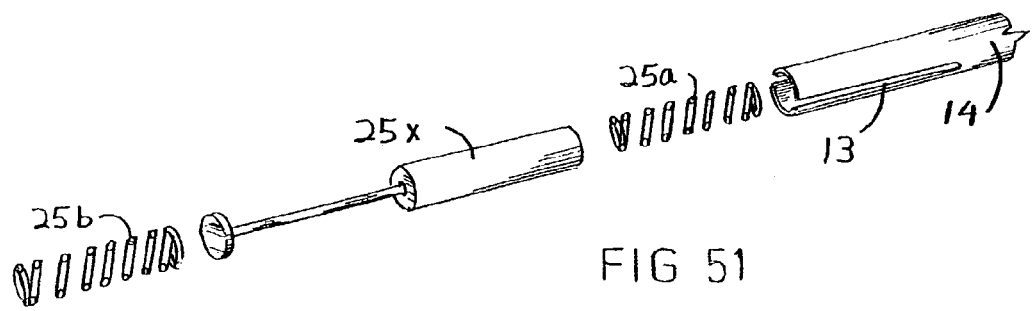
FIG. 51 is a sectional exploded view showing an alternative embodiment of the front fork spring(s).

Additional alternative embodiments of the sport conveyance are shown if FIGS. 49–51. FIG. 49 discloses a non-motorized embodiment wherein rear frame section 10c of the conveyance does not contain a powerplant, drive train, fuel tank, etc., but instead is replaced by a near mirror opposite of front frame section 10a of the preferred embodiment. Rectangular rear frame arms 68L and 68R of the preferred embodiment are replaced by round rear fork tubes 680L and 680R, which possess the same attributes and components as fork tubes 14L and 14R in front frame section 10a, including rear slots 13aL and 13aR and fork springs 25. Rear sway bar 81 is replaced by a fork brace 16, and is integrally secured therein by weld. In this embodiment, control lines 50 are not anchored on the rear frame arms, but instead extend all the way back to the axle of alternate rear wheel 650, which is a lighter and narrower alternative of rear drive wheel 65, used on the motorized embodiment, and in fact is identical to the front wheel in size and function. The routes of control lines 50 along and through the non motorized rear section of this alternative conveyance mirror the routes taken by the control lines through the front section. In this way, both the front and rear wheels are able to lean and turn at the same time, making this alternative embodiment ideal for riding down hills, maneuvering in relatively confined areas, or being pulled along on a beach or other open area behind a traction kite.

In the preferred embodiment, side support wheels 42L and 42R and strut assemblies 36L and 36R are disposed near the center of the sport conveyance. In alternative embodiments of the conveyance, the side support wheels and their respective strut assemblies can be positioned anywhere along the longitudinal axis of the conveyance. FIG. 50 shows the basic frame of an alternative non-motorized embodiment wherein the support wheels 42, along with their respective strut assemblies, are disposed in a more rearward location along the longitudinal axis of the conveyance. Such an embodiment would have a long front frame section wherein forks 14L and 14R would be replaced by longer versions 14aL and 14aR. An additional fork brace 16 is interposed between the alternate front fork tubes. The length of control lines 50 are sufficiently increased to match the increased length of the front frame section. Rear frame arms 68L and 68R in this embodiment are replaced by rear frame tubes 681L and 681R, which are generally shorter versions of front fork tubes 14L and 14R. Rear sway bar 81 is again replaced by a fork brace 16. In this embodiment, the rear wheel and axle remain fixed. This alternative embodiment of the sport conveyance would possess inherent steering and control characteristics that may be better suited to specific riding environments.

FIG. 51 discloses a alternative embodiment of the front fork section wherein some or all of the spring tension in the front forks could be aided and or replaced by an air or gas filled dampening device 25x. In the example of the fork shown, a single front fork spring 25 is divided into two smaller springs 25a, and interposed between them is the spring dampening device 25x. Such an embodiment could provide still further steering and control attributes.

While the conveyance and the operation thereof has been described heretofore in conjunction with the preferred embodiment, it will be understood that the description is intended to illustrate and not to limit the scope of the invention, which is defined by the following claims:

I claim:

1. A wheeled footboard sport conveyance with an elongated and substantially horizontal frame structure that includes a singular inline front wheel, a singular inline rear wheel, a set of opposing side wheels and a corresponding set of side wheel strut elements disposed traversely along the elongated frame structure at a point between the singular front wheel and the singular rear wheel, a set of opposing control line elements linking the side wheel strut elements with said singular front wheel, wherein vertical displacement of the opposing side wheels relative to the orientation of said elongated frame structure provide steering forces for said singular front wheel, comprising:

(a) said elongated frame structure having at least one planar surface area for supporting a standing rider, a plurality of opposing and substantially horizontal elongated frame elements disposed substantially parallel to the longitudinal axis of the wheeled footboard, a plurality of crossmember supports interposed traversely between the opposing elongated frame elements underlying and supporting said planar surface area, said opposing elongated frame elements being further disposed in equidistant manner from the longitudinal center line axis of said elongated frame structure;

(b) said singular front wheel being rotatably mounted on a center portion of a front axle that extends traversely between said opposing elongated frame elements substantially near respective forward end portions, said singular rear wheel being rotatably mounted on the center portion of a rear axle interposed traversely between the opposing frame elements substantially near respective rearward end portions;

(c) opposing left and right end portions of said front axle being movably attached to the forward end portions of said opposing frame elements by means for independent forward and rearward movement of the left and right end portions of said front axle within predetermined ranges;

(d) a means for biasing being disposed longitudinally within forward segments of said opposing frame elements and bearing against said left and right end portions of said front axial extrusion, whereby constant outward pressures uniformly hold said front axial extrusion substantially to forward ends of said predetermined ranges;

(e) said opposing side wheels being rotatably mounted to said elongated frame structure by the opposing side wheel strut elements in a manner that simultaneously provides a first action of independent vertical displacements of said opposing side wheels relative to said planar surface area of said elongated frame structure, and a second action of maintaining substantial angular coherence between said opposing side wheels and the singular end wheels, whereby all wheels of the footboard conveyance stay substantially perpendicular to said planar surface area and substantially parallel to each other throughout the full tilting range of said wheeled footboard;

(f) said set of opposing control line elements link respective opposing end portions of said front axial extrusion to said side wheel strut elements in a substantially continuous and consistent manner, wherein vertical displacement of said side wheel strut elements relative to said planar surface area directly results in measured horizontal displacement of said left and right end portions of said front axial extrusion;

(g) whereby said rider, while standing upright upon and tilting said planar surface area of said wheeled footboard, actuates said vertical displacement of said opposing side wheels and said corresponding struts elements; which further actuates said linear horizontal displacement of said left and right end portions of said front axial extrusion, thereby turning said singular front wheel and vectoring said wheeled footboard in the tilted direction, and conversely, by releasing tilting pressures, said means for biasing impels both the left end portion and the right end portion of said front axial extrusion substantially towards said forward ends of said predetermined ranges, to actuate the horizontal and vertical displacements in a reverse manner, thus permitting said wheeled footboard to revert to a substantially static straight ahead vector.

2. The wheeled footboard conveyance of claim 1 wherein the independent forward and rearward movements of said left and right end portions of said front axle are retained against a substantially static and fixedly oriented forward end frame structure.

3. The wheeled footboard conveyance of claim 1 wherein a set of side wheel axial mount elements is fixedly attached to said corresponding set of side wheel strut elements on their outermost portions, the side wheel axial mount elements extending outward away from each other in an orientation generally perpendicular to said longitudinal center line axis of said wheeled footboard, said side wheel strut elements having innermost portions rotatably mounted to opposing segments of said elongated frame structure, whereby upward and downward swinging motions of said side wheel strut elements are permitted about the axis of respective rotatable mountings.

4. The wheeled footboard conveyance of claim 1 wherein said opposing frame elements are of extruded tubular members, wherein said means for independent forward and rearward movements includes a plurality of aligned horizontally biased openings located in side walls of said forward end portions of the opposing tubular members, the aligned horizontal openings in said extruded tubular members being of sufficient height to receive said left and right end portions of said front axial extrusion, wherein said left and right end portions extrude axially through and are confined therein.

5. The wheeled footboard conveyance of claim 1 wherein the longitudinal orientation of said set of opposing control line elements is substantially parallel to said longitudinal axis of said wheeled footboard and generally parallel and horizontal to said means for biasing.

6. The wheeled footboard conveyance of claim 1, further including a propulsion motor disposed generally at a center portion of said elongated structure, the motor providing rotary drive forces, said rotary drive forces being mechanically transferred distally to said singular rear wheel.

7. The wheeled footboard conveyance of claim 1, further including a plurality of foot engaging elements, the foot engaging elements being affixed to said planar surface area, the locations of said foot engaging elements corresponding to the feet of said rider, said foot engaging elements securing the feet of the rider to the wheeled footboard.

8. The wheeled footboard conveyance of claim 1, further including an adjustable frame support element disposed on said elongated frame structure between the front wheel and the rear wheel, said adjustable frame support element providing a counteracting force for general gravitational fatigue pressures imposed on said elongated frame structure during use.

9. The wheeled footboard conveyance of claim 1, further including a braking device to slow and stop said wheeled footboard, said braking device being attached to said singular rear wheel.

10. The wheeled footboard conveyance of claim 4 wherein said means for biasing including a plurality of springs, wherein, the longitudinal orientation of said springs being substantially horizontal to and parallel with said longitudinal axis of said wheeled footboard.

11. The wheeled footboard conveyance of claim 4 wherein left and right end segments of said front axial extrusion including a left shouldering element and a right shouldering element located substantially adjacent to the respective aligned openings on said opposing tubular members, said shouldering elements allowing only said left and right end portions of said front axle to extrude through said respective aligned openings in said opposing tubular members, substantially constraining said front axial extrusion traversely between said opposing tubular members.

12. The wheeled footboard conveyance of claim 9, further including a hand held control element, said hand held control element providing a mounting structure for at least a brake device controlling element, said brake device controlling element being connected distally to said braking device of said singular rear wheel.

13. The wheeled footboard conveyance of claim 10 wherein said springs are compression springs disposed within internal bores of said opposing tubular members, said compression springs being fixedly anchored to respective tubular members on aft end portions thereof, forward end portions of said compression springs abutting and movably engaging said left and right end portions of said front axial extrusion.

14. The wheeled footboard conveyance of claim 11 further including a plurality of friction reducing components juxtaposed on said left and right end segments of said front axle to simultaneously engage the shouldering elements, the opposing end portions of said front axial extrusion, and the forward surface areas of the opposing elongated tubular frame elements, whereby said opposing end portions of said front axial extrusion can more easily slide forward and rearward within the confines of said respective aligned openings.

15. The wheeled footboard conveyance of claim 14 wherein said plurality of friction reducing elements including a plurality of concave shielding objects interposed between said shouldering elements of said front axial extrusion and forward surface areas of said opposing tubular members common to edges of said aligned horizontal openings, the curvature of said concave shielding objects being substantially congruent to at least a portion of a curved surface profile of said opposing tubular members.

16. The wheeled footboard conveyance of claim 15 wherein said plurality of said friction reducing components including circular bearing elements rotatably mounted on said opposing end portions of said front axial extrusion at locations common to said openings of said opposing tubular members, said circular bearing elements being axially oriented substantially perpendicular to the longitudinal axis of said opposing tubular members.

17. The wheeled footboard conveyance of claim 16 wherein outer surfaces of said circular bearing elements continuously contact portions of said openings of said opposing tubular members as said opposing end portions of said front axial extrusion slide to and fro along and within said aligned horizontal openings, the contact of said internal bores providing a clearance gap between the axial surfaces of said opposing end portions of said front axial extrusion and said edges of said aligned horizontal openings.

18. A wheeled footboard sport conveyance with an elongated and substantially horizontal frame structure that includes a singular inline front wheel, a singular inline rear wheel, a set of opposing side wheels and a corresponding set of side wheel strut elements disposed traversely along the elongated frame structure at a point between the inline front wheel and the inline rear wheel, a set of opposing control line elements linking the side wheel strut elements with the front wheel and the rear wheel, wherein vertical displacement of the opposing side wheels relative to the orientation of said elongated frame structure provide steering forces for said front wheel and said rear wheel, comprising:
  (a) said elongated frame structure having at least one planar surface area for supporting a standing rider, a plurality of opposing and substantially horizontal elongated tubular frame elements disposed substantially parallel to the longitudinal axis of the wheeled footboard, a plurality of crossmember supports interposed traversely between the opposing tubular frame elements, underlying and supporting said planar surface area, the opposing frame elements being further disposed in equidistant manner from the longitudinal center line axis of said elongated frame structure;
  (b) said front wheel being rotatably mounted on a center portion of a front axle that extends traversely between said opposing frame elements substantially near respective forward end portions, said rear wheel being rotatably mounted on a center portion of a rear axle that extends traversely between said opposing frame elements substantially near respective rearward end portions;
  (c) left and right end portions of said front axial extrusion being movably attached to the forward end portions of said opposing frame elements by a first means for independent forward and rearward movement of said left and right end portions of said front axle within a first predetermined range;
  (d) left and right end portions of said rear axial extrusion being movably attached to the rearward end portions of said opposing frame elements by a second means for independent forward and rearward movement of said left and right end portions of said rear axial extrusion within a second predetermined range;
  (e) a first means for biasing being disposed longitudinally within forward segments of said opposing frame elements and bearing against said left and right end portions of said front axle, whereby constant forward pressures uniformly hold said front axle substantially to forward ends of said first predetermined range;
  (f) a second means for biasing being disposed longitudinally within rearward segments of said opposing frame elements and bearing against said left and right end portions of said rear axle, whereby constant rearward pressures uniformly hold said rear axle substantially to rearward ends of said second predetermined range;
  (g) said opposing side wheels being rotatably mounted to said elongated frame structure by the opposing side wheel strut elements in a manner that simultaneously provides a first action of independent vertical displacements of said opposing side wheels relative to said planar surface area of said elongated frame structure, and a second action of maintaining substantial angular coherence between said opposing side wheels and the front and rear wheels, whereby all wheels of said wheeled footboard stay substantially perpendicular to said planar surface area and substantially parallel to each other throughout the full tilting range of said wheeled footboard;
  (h) said set of opposing control line elements link the opposing end portions of said front axial extrusion and the opposing end portions of said rear axial extrusion to said corresponding strut elements in a substantially continuous and consistent manner, wherein vertical displacement of said corresponding strut elements relative to said planar surface area directly results in measured horizontal displacement of the opposing end portions of the front and rear axial extrusions;
  (i) whereby said rider, while standing upright upon and tilting said planar surface area of said wheeled footboard, actuates vertical displacement of said side wheels and said corresponding struts, which further actuates said linear horizontal displacement of said opposing end portions of said front and rear axles, thereby turning said front and rear wheels and vectoring said wheeled footboard in the tilted direction, and conversely, by releasing tilting pressures, the first and second means for biasing impels said front and rear axles substantially towards respective forward most and rearward most positions, actuate the horizontal and vertical displacements in a reverse manner, thus permitting said wheeled footboard to revert to a substantially static straight ahead vector.

19. A wheeled footboard sport conveyance with an elongated and substantially horizontal frame structure that includes a singular inline front wheel, a singular inline rear wheel, a set of opposing side wheels and a corresponding set of side wheel strut elements disposed traversely along the elongated frame structure at a point between the inline front wheel and the inline rear wheel, a set of opposing control line elements linking the side wheel struts with said inline front wheel, wherein vertical displacement of the opposing side wheels relative to the orientation of said elongated frame structure provide steering forces for said inline front wheel, comprising;
  (a) said elongated frame structure having at least one planar surface area for supporting a standing rider, a plurality of opposing and substantially horizontal tubular frame elements disposed substantially parallel to the longitudinal axis of the wheeled footboard, a plurality of crossmember supports interposed traversely between the opposing tubular frame elements underlying and supporting said planar surface areas, said opposing tubular frame elements being further disposed in equidistant manner from the longitudinal center line axis of said elongated frame structure;

(b) said inline front wheel being rotatably mounted on a center portion of a front axle that extends traversely between the opposing frame elements substantially near respective forward end portions, said inline rear wheel being rotatably mounted on a center portion of a rear axle that extends traversely between said opposing frame elements substantially near respective rearward end portions;

(c) left and right end portions of said front axle being movably attached to said forward end portions of said opposing frame elements by a means comprising a plurality of slidable elements, said slidable elements permitting said left and right end portions of said front axle to independently shuttle forward and rearward along said respective forward end portions of said opposing frame elements within predetermined ranges;

(d) a means for urging comprising a plurality of forwardly biased pressure elements being disposed longitudinally within forward segments of said opposing frame elements in a manner that bears forward end surfaces of the pressure elements against said left and right end portions of said front axial extrusion, whereby constant outward pressures uniformly hold said left and right end portions substantially to the forward ends of said predetermined ranges;

(e) said side wheel struts movably connect respective opposing side wheels to said elongated frame structure in opposing manner by a means comprising a plurality of extruded axial strut connecting elements, the strut connecting elements rotatably mounting said side wheel struts to the footboard frame structure in a manner that simultaneously provide a first action of independent vertical displacement of said opposing side wheels relative to said planar surface area of said elongated frame structure, and a second action of maintaining substantial angular coherence between said side wheels and the singular end wheels, whereby all wheels of the footboard conveyance stay substantially perpendicular to said planar surface areas and substantially parallel to each other throughout the full tilting range of said footboard conveyance;

(f) said set of opposing control line elements linking said left and right end portions of said front axle to said side wheel strut elements in a substantially continuous manner, wherein vertical displacement of said side wheel struts relative to said planar surface area directly result in measured horizontal displacement of said left and right end portions of said front axle, (g) whereby said rider, while standing upright and tilting said planar surface area of said wheeled footboard conveyance, actuates vertical displacement of said side wheels and said corresponding struts, which further actuates linear horizontal displacement of said left and right end portions of said front axle, thereby turning said inline front wheel and vectoring said wheeled footboard in the tilted direction, and conversely, by releasing tilting pressures, said means for urging impels both end portions of said front axial extrusion substantially towards said forward ends of said predetermined ranges, to actuate the horizontal and vertical displacements in a reverse manner, thus permitting said wheeled footboard to revert to a static substantially straight ahead vector.

20. The wheeled footboard conveyance of claim 19, wherein;

(a) the independent forward and rearward shuttle movements of said left and right end portions of said front axle are retained against a substantially static and fixedly oriented forward end frame structure;

(b) left and right end segments of said front axle includes a left shouldering element and a right shouldering element adjacently disposed adjacent to respective opposing tubular frame elements, whereby said front axle is movably and laterally constrained therein;

(c) said left and right end portions of said front axle further include a plurality of friction reducing components common to movable attachment points relative to said forward portions of said respective opposing tubular frame elements, and (d) said forwardly biased pressure elements being springs.

* * * * *